(12) United States Patent
Burns et al.

(10) Patent No.: US 7,958,042 B2
(45) Date of Patent: Jun. 7, 2011

(54) SYSTEM AND METHOD FOR AUCTIONING BIDS ON CONSTRUCTION PROJECTS

(75) Inventors: Wesley E Burns, West Palm Beach, FL (US); Blake H. Burns, Miami, FL (US); Charles R. Paris, Nixa, MO (US)

(73) Assignee: Contractpower, LLC, West Palm Beach, FL (US)

( * ) Notice: Subject to any disclaimer, the term of this patent is extended or adjusted under 35 U.S.C. 154(b) by 549 days.

(21) Appl. No.: 12/214,892

(22) Filed: Jun. 23, 2008

(65) Prior Publication Data
US 2009/0030835 A1 Jan. 29, 2009

Related U.S. Application Data

(63) Continuation-in-part of application No. 10/423,858, filed on Apr. 28, 2003, now abandoned.

(60) Provisional application No. 60/377,978, filed on May 7, 2002.

(51) Int. Cl.
G06Q 40/00 (2006.01)
(52) U.S. Cl. .................. 705/37; 705/1; 705/7
(58) Field of Classification Search .......... 705/1, 7, 705/37
See application file for complete search history.

(56) References Cited

U.S. PATENT DOCUMENTS

| | | | |
|---|---|---|---|
| 5,794,219 A | 8/1998 | Brown | |
| 5,920,849 A | 7/1999 | Broughton et al. | |
| 5,950,206 A | 9/1999 | Krause | |
| 6,021,398 A | 2/2000 | Ausubel | |
| 6,038,547 A | 3/2000 | Casto | |
| 6,324,508 B1 | 11/2001 | Finney | |
| 6,345,258 B1 | 2/2002 | Pickens | |
| 6,393,410 B1 * | 5/2002 | Thompson | 705/37 |
| 6,446,053 B1 * | 9/2002 | Elliott | 705/400 |
| 7,225,152 B2 | 5/2007 | Atkinson et al. | |
| 2001/0044768 A1 | 11/2001 | Wares | |

FOREIGN PATENT DOCUMENTS
WO  WO 01/55928  * 8/2001

* cited by examiner

*Primary Examiner* — Richard C Weisberger
(74) *Attorney, Agent, or Firm* — McHale & Slavin, P.A.

(57) ABSTRACT

A computerized multi-stage bidding system and method for bidding on construction projects is disclosed. The system utilizes Internet client-server technology. The system includes input devices for entering into the computerized system and validating member credentials, accessing construction projects, registering to bid on the construction projects, providing information relative to a type of contract the construction projects will have, sorting, accepting and rejecting bids for the construction projects, posting a winning bid in order for an owner to compare it to the project budget, having the winning bid be reviewed by an owner and architect of the construction projects, via a report provided by the system and providing a forum for new contractors to become members.

15 Claims, 89 Drawing Sheets

OWNER CORPORATE PORTAL HOME PAGE MAIN MENU-MEMBER VIEW
300

| HOME | PORTAL | TEMPLATES | PROJECTS | REPORTS | CPMAIL | MY PROFILE | HELP | LOGOUT |

Bill Smith's Homepage

WELCOME RETAIL USA                    ✉ (17) NEW MESSAGES

PORTAL MEMBERS

301 — John Smith

| Project ID | Project Name | Bid Due |
|---|---|---|
| » Drafts - 0 projects | | |
| » Bidding - 0 projects | | |
| » History - 0 projects | | |

302 — New Stores

| Project ID | Project Name | Bid Due |
|---|---|---|
| » Drafts - 0 projects | | |
| » Bidding - 0 projects | | |
| » History - 0 projects | | |
| » Tim Smith | | |
| » John Doe | | |

Remodel Stores

| Project ID | Project Name | Bid Due |
|---|---|---|
| » Drafts - 0 projects | | |
| » Bidding - 0 projects | | |
| » History - 0 projects | | |
| » Joe Friday | | |
| » Sam Kent | | |

303

| Project ID | Project Name | Bid Due |
|---|---|---|
| » Drafts - 18 projects | | |
| » Bidding - 7 projects | | |
| » History - 1 (projects archived) | | |
| » Forrest Doe | | |

FIG. 3

THIS IS MULTISTAGE BIDDING
SETTING THE NUMBER OF STAGES, BID DUE DATE AND TIMES

FIG. 13

SETTING THE MULTISTAGE FILTER

SELECTING PORTAL MEMBERS THAT ARE TO BE NOTIFIED WHEN THE INVITATION TO BID IS SENT OUT.
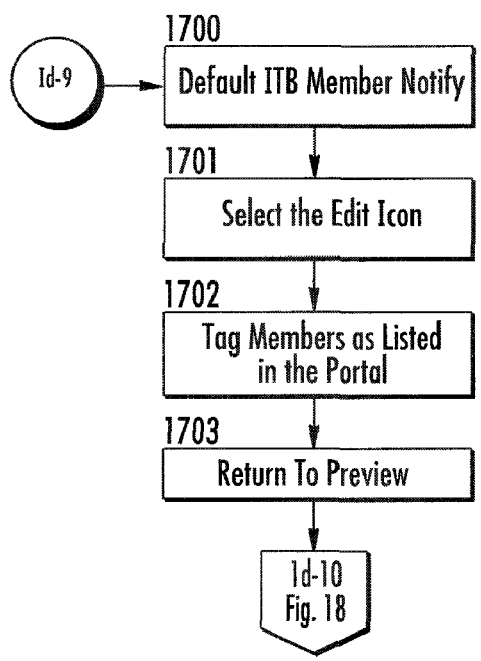
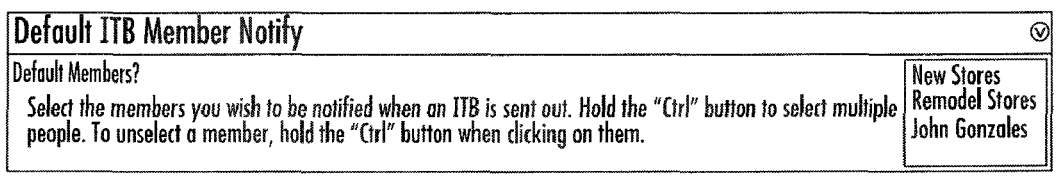
FIG. 17

SELECTING PORTAL MEMBERS THAT ARE AUTHORIZED TO VIEW THE INITIAL BID RESULTS.
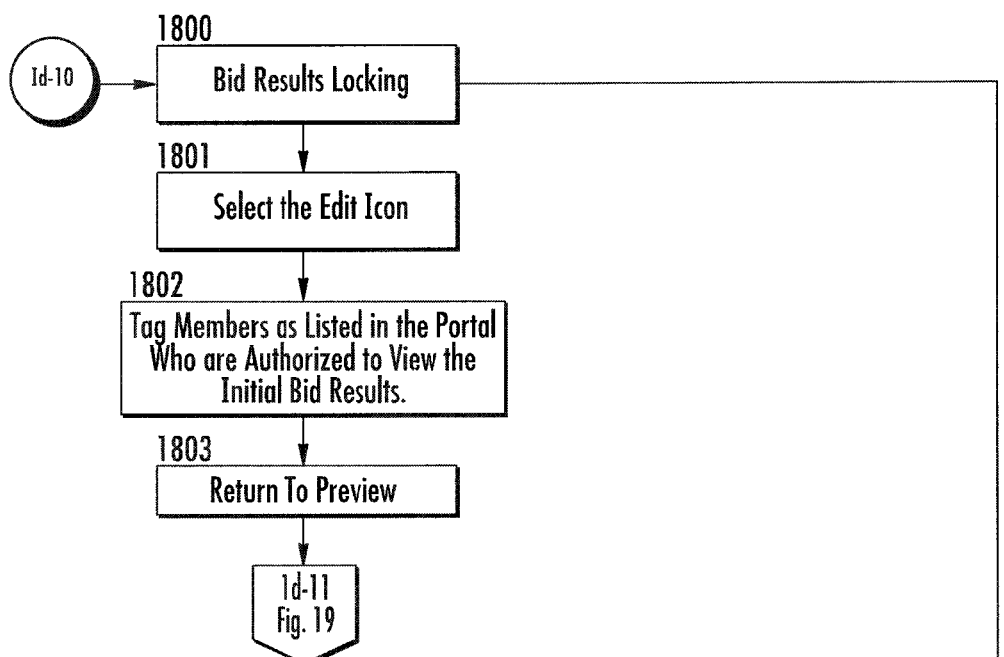
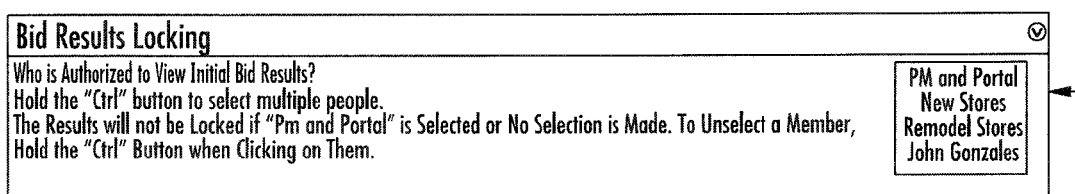
FIG. 18

SELECTING WHAT YOU WANT THE CONTRACTORS TO SEE AT THE END OF THE BID.

COST BREAKDOWN SHEET DETAILS - SELECTING TO VIEW A CONTRACTOR'S BID
BID RESULTS

| CONTRACTOR<br>FOR MORE DETAILED CONTRACTOR INFORMATION; CLICK THEIR NAME BELOW | STAGE 1:<br>OPENING BID | STAGE 2:<br>BEST & FINAL OFFER | SUPPORTING DOCUMENTS |
|---|---|---|---|
| 1 MARCH  CONSTRUCTION | $3,874,800.00 | $3,744,800.00 | N/A |
| 2 A.B. PODY COMPANY | $4,293,000.00 | $4,156,000.00 | ☒ |
| 3 DONE BUILDERS, INC. | $4,340,859.00 | $4,216,020.00 | N/A |
| 4 BUILDERS, INC. | $4,268,377.00 | $4,245,111.00 | ☒ |
| DON CONSTRUCTION | $4,998,320.00 | $4,998,320.00 | N/A |

* EXCEEDED FILTER LIMIT

3100  GENERATE REPORTS

3101  FORMAT
1 SELECT THE REPORT FORMAT
CBS DETAILS ▽

3102  OPTIONS
2. CHOOSE ANY SETUP OPTIONS TO CUSTOMIZE YOUR REPORT

DATA    3104
3. CHOOSE THE DATA YOU WISH TO DISPLAY ON THE REPORT

○ PROJECT BUDGET*
○ LOCKED BUDGET
○ PROJECT TRACKING**
● 1 - MARCH  CONST...
○ 2 - MARCH  CONST...
○ 3 - A-B PODY COMPANY
○ 4 - DCE BUILDERS, INC
○ 5 - BUILDERS, INC
○ 6 - D C N CONSTRUCTION

* CLICK "PROJECT BUDGET" TO ENTER YOUR BUDGET COSTS FOR THIS PROJECT.
** CLICK "PROJECT TRACKING" TO TRACK THIS PROJECT.
L THE BEST & FINAL BID WITH BID LEVELING APPLIED.

SHOW THE FOLLOWING BID RESULTS:
☐ OPENING BID
☒ BEST & FINAL OFFER

ALSO SHOW:
☒ SQ. FT. COST
☐ SHOW SECTION SUMMARIES

3103  CLICK HERE TO EMAIL LEVELED DASHBOARD

3105

3106  GENERATE REPORT

FIG. 31

COST BREAKDOWN SHEET - GENERATED REPORT OF CONTRACTOR'S SUBMITTED BID
3200

☐ COST BREAKDOWN SHEET

PRINT
ⓘ INSTRUCTIONS 🖶 PRINT PAGE ⓧ CLOSE WINDOW
CLOSE

3201

PROJECT NAME: BEACH MALL REMODEL  PROJECT ID: BB166 - D
CONTRACTOR: SMITH DEVELOPMENT  PHONE: 561-777-9999
EXPORT 🖫
CLICK HERE TO VIEW SUPPORTING DOCUMENTATION

3202

SQUARE FOOT COSTS
| SECTION | SECTION SQ.FT. | SECTION COST | BEST & FINAL COST PER SQ. FT. |
|---|---|---|---|
| SITE WORK SQ.FT. | | $145,075.00 | $0.00 |
| BUILDING SQ.FT. | | $402,595.00 | $0.00 |

3203

3204

| | | 3205 | 3206 | 3207 | 3208 | | 3209 |
|---|---|---|---|---|---|---|---|
| | SITE WORK | | | | BEST & FINAL | | |
| LINE | CONSTRUCTION TASK | NOTE | QUANTITY | UNIT | UNIT COST | | TOTAL |
| M0 | ON SITE WORK | | | | | | |
| M1 | DEMOLITION | | 1 | LS | 2,500.00 | | 2,500.00 |
| M2 | LAND CLEARANCE | | 1 | LS | 1,576.00 | | 1,576.00 |
| M3 | EXCAVATION & GRADING | | | | | | |
| M4 | CUT | | 1 | LS | $4,288.00 | | 4,288.00 |
| M5 | FILL | | 1 | LS | 0.00 | | 0.00 |
| M3T | EXCAVATION & GRADING TOTAL | | | | | | 4,288.00 |

FIG. 32

COST BREAKDOWN SHEET COMPARISON - SELECTING CONTRACTOR'S BIDS TO COMPARE

BID RESULTS

| CONTRACTOR<br>FOR MORE DETAILED CONTRACTOR INFORMATION; CLICK THEIR NAME BELOW | STAGE 1:<br>OPENING BID | STAGE 2:<br>BEST & FINAL OFFER | SUPPORTING DOCUMENTS |
|---|---|---|---|
| 1 MARCH/ CONSTRUCTION | $3,874,800.00 | $3,744,800.00 | N/A |
| 2 A.B. PODY COMPANY | $4,293,000.00 | $4,156,000.00 | ☒ |
| 3 DOE BUILDERS, INC. | $4,340,859.00 | $4,216,020.00 | N/A |
| 4 BUILDERS, INC. | $4,268,377.00 | $4,245,111.00 | ☒ |
| DON CONSTRUCTION | $4,998,320.00 | $4,998,320.00 | N/A |

* EXCEEDED FILTER LIMIT

GENERATE REPORTS

FORMAT
1. SELECT THE REPORT FORMAT
   [CBS COMPARISON ▽]

OPTIONS
2. CHOOSE ANY SETUP OPTIONS TO CUSTOMIZE YOUR REPORT

DATA
3. CHOOSE THE DATA YOU WISH TO DISPLAY ON THE REPORT

- ☐ PROJECT BUDGET*
- ☐ LOCKED BUDGET
- ☐ PROJECT TRACKING**
- ☒ 1 - MARCH CONST...
- ☒ 2 - MARCH CONST...1
- ☒ 3 - H.C. PODY COMPANY
- ☒ 4 - KANE BUILDERS, INC
- ☒ 5 - BUILDERS, INC
- ☒ 6 - D O N Y CONSTRUCTION

\* CLICK "PROJECT BUDGET" TO ENTER YOUR BUDGET COSTS FOR THIS PROJECT.
\*\* CLICK "PROJECT TRACKING" TO TRACK THIS PROJECT.
1. THE BEST & FINAL BID WITH BID LEVELING APPLIED.

3302

CLICK HERE TO EMAIL LEVELED DASHBOARD

- ☐ SHOW SECTION SUMMARIES
- ☐ SHOW CONTRACTOR VARIANCE ‡

‡ ONLY AVAILABLE WHEN 2 CONTRACTORS ARE SELECTED

3303

[ GENERAL REPORT ]

CONTRACTOR COMPARISON REPORT - GENERATED

3400

COMBINED CONTRACTOR ANALYSIS

XYZBid

PROJECT NAME: BEACH MALL REMODEL:  PROJECT ID: BB166 - D

EXPORT:

? PRINT INSTRUCTIONS  🖶 PRINT  ✕ CLOSE

SITE WORK

| LINE | CONSTRUCTION TASK | PARIS D... | TOMLIN... | MASEY B... |
|---|---|---|---|---|
| M0 | ON SITE WORK | | | |
| M1 | DEMOLITION | 2,500.00 | 5,388.00 | 4,600.00 |
| M2 | LAND CLEARANCE | 1,576.00 | 1,187.00 | 3,200.00 |
| M3 | EXCAVATION & GRADING | | | |
| M4 | CUT | 4,288.00 | 5,643.00 | 6,700.00 |
| M5 | FILL | 0.00 | 0.00 | 1,200.00 |
| M3T | EXCAVATION & GRADING TOTAL | $4,288.00 | $5,643.00 | $7,900.00 |
| M6 | SUBSURFACE | 3,400.00 | 3,897.00 | 4,500.00 |
| M7 | STAKING | 1,466.00 | 1,277.00 | 2,500.00 |
| M8 | CURB & GUTTER | 6,900.00 | 7,590.00 | 17,600.00 |
| M9 | 16" X 18" CURB | 0.00 | 0.00 | 0.00 |
| M10 | 6" EXTRUDED CURB | 0.00 | 0.00 | 0.00 |
| M11 | CONCRETE PADS | 750.00 | 5,388.00 | 6,790.00 |
| M12 | CONCRETE WALKS | | | |

FIG. 34

DEVIATION ANALYSIS - ASSESSMENT OF HIGH RISK LINE ITEMS

| CONTRACTOR<br>FOR MORE DETAILED CONTRACTOR INFORMATION; CLICK THEIR NAME BELOW | STAGE 1:<br>OPENING BID | STAGE 2:<br>BEST & FINAL OFFER | SUPPORTING DOCUMENTS |
|---|---|---|---|
| 1 MARCH/ CONSTRUCTION | $3,874,800.00 | $3,744,800.00 | N/A |
| 2 A.B. PODY COMPANY | $4,293,000.00 | $4,156,000.00 | ☒ |
| 3 DOE BUILDERS, INC. | $4,340,859.00 | $4,216,020.00 | N/A |
| 4 BUILDERS, INC. | $4,268,377.00 | $4,245,111.00 | ☒ |
| DON CONSTRUCTION | $4,998,320.00 | $4,998,320.00 | N/A |

* EXCEEDED FILTER LIMIT

GENERATE REPORTS

FORMAT
1. SELECT THE REPORT FORMAT  [DEVIATION ANALYSIS ▽]

DATA
3. CHOOSE THE DATE YOU WISH TO DISPLAY ON THE REPORT

| | COLUMN A | | COLUMN B |
|---|---|---|---|
| | ○ PROJECT BUDGET* | | ☐ PROJECT BUDGET* |
| | ○ LOCKED BUDGET | | ☐ LOCKED BUDGET |
| | ◉ PROJECT TRACKING** | | ☐ PROJECT TRACKING** |
| | ○ 1 - MARCH ASSOCIATES CONST...L | | ☒ 1 - MARCH ASSOCIATES CONST...L |
| | ○ 2 - MARCH ASSOCIATES CONST...L | | ☒ 2 - MARCH ASSOCIATES CONST...L |
| | ○ 3 - H.C. PODY COMPANY | | ☒ 3 - H.C. PODY COMPANY |
| | ○ 4 - KANE BUILDERS, INC | | ☒ 4 - KANE BUILDERS, INC |
| | ○ 5 - BUILDERS, INC | | ☒ 5 - BUILDERS, INC |
| | ○ 6 - DONNELLY CONSTRUCTION | | ☒ 6 - DONNELLY CONSTRUCTION |

OPTIONS
2. CHOOSE ANY SETUP OPTIONS TO CUSTOMIZE YOUR REPORT

COMPARE THE BIDDER IN COLUMN A TO...
◉ THE MEAN OF BIDDERS IN COLUMN B
○ THE BIDDER IN COLUMN B

☒ SHOW HIGH RISK LINE ITEMS AS ⚠
   WITH A +/- [20.00] % DEVIATION

☐ SHOW SECTION SUMMARIES

* CLICK "PROJECT BUDGET" TO ENTER YOUR BUDGET COSTS FOR THIS PROJECT.
** CLICK "PROJECT TRACKING" TO TRACK THIS PROJECT.
L THE BEST & FINAL BID WITH BID LEVELING APPLIED.

[CLICK HERE TO EMAIL LEVELED DASHBOARD]

[GENERAL REPORT]  3505

FIG. 35

BUILDING DEVIATION ANALYSIS REPORT

| Line | Construction Task | Quantity | Unit | LEVELED BID Unit Cost | Total | Deviation | |
|---|---|---|---|---|---|---|---|
| M50 | Building | | | | | | |
| M51 | Foundation | | | | | | |
| M52 | Concrete | 1 | LS | 6,200.00 | 6,200.00 | | $60.62 |
| M53 | Block | 1 | LS | 2,400.00 | 2,400.00 | | $60.00 |
| M51T | Foundation Total | | | | 8,600.00 | | ($396.67) |
| M54 | Building Slab | 1 | LS | 12,300.00 | 12,300.00 | | (583.33) |
| M55 | Masonry | 1 | LS | 18,900.00 | 18,900.00 | | (2,200.00) |
| M56 | Structural Steel | 1 | LS | 0.00 | 0.00 | | 0.00 |
| M57 | Rough Carpentry | 1 | LS | 14,300.00 | 14,300.00 | ◁ | (4,200.00) |
| M58 | Finish Carpentry | 1 | LS | 5,200.00 | 5,200.00 | | (163.33) |
| M59 | FRP Paneling | 1 | LS | 4,800.00 | 4,800.00 | | 106.67 |
| M60 | Building Insulation | 1 | LS | 3,200.00 | 3,200.00 | | (166.67) |
| M61 | Roofing | 1 | LS | 16,400.00 | 16,400.00 | ◁ | (4,383.33) |
| M62 | Aluminum Windows | 1 | LS | 17,344.00 | 17,344.00 | | (1,554.00) |
| M63 | Storefront Glazing | 1 | LS | 0.00 | 0.00 | ◁ | (850.00) |
| M64 | Metal Doors, Frames, Hardware | 1 | LS | 2,100.00 | 2,100.00 | ◁ | (941.00) |
| M65 | Wood Doors, Frames, Hardware | 1 | LS | 1,288.00 | 1,288.00 | | 12.33 |
| M66 | Drywall | 1 | LS | 23,765.00 | 23,765.00 | | 243.33 |
| M67 | Ceramic Tile | 1 | LS | 0.00 | 0.00 | | 0.00 |
| M68 | Quarry Tile | 1 | LS | 28,654.00 | 28,654.00 | | 1,819.33 |
| M69 | Decorator Tile | 1 | LS | 1,855.00 | 1,855.00 | | ($6.67) |
| M70 | Toilet Partitions | 1 | LS | 2,400.00 | 2,400.00 | | 0.00 |
| M71 | Carpet | 1 | LS | 1,200.00 | 1,200.00 | ◁ | 350.00 |

FIG. 36

| LOW BID COMPARISON - SELECTING CONTRACTOR TO COMPARE TO ALL LOW BIDS ||||
|---|---|---|---|
| Contractor<br>For more detailed contractor information, click their name below | Stage 1:<br>Opening Bid | Stage 2:<br>Best &Final Offer | Supporting Documents |
| 1 March Construction | $3,874,800.00 | $3,744,800.00 | N/A |
| 2 A.B. Pody Construction | $4,293,000.00 | $4,156,000.00 | ✉ |
| 3 Poe Builders, Inc | $4,340,859.00 | $4,216,020.00 | N/A |
| 4 Builders, Inc | $4,268,377.00 | $4,245,111.00 | ✉ |
| 4 Don Construction | $4,998,320.00 | $4,998,320.00 | N/A |

*Exceeded Filter Limit

Generate Reports

| Format<br>1. Select the Report Format | Data<br>3. Choose the Data you wish to display on the report ||
|---|---|---|
| 3700 Low Bid Comparison ▽ | Column A | Column B |
| | ○ *Project Budget** | ☐ *Project Budget** |
| | ○ *Locked Budget* | ☐ *Locked Budget* |
| Options:<br>2. Choose any setup options to customize your report | ○ *Project Tracking*** | ☐ *Project Tracking*** |
| | ⦿ 1 - *March Associates Const...* | ☑ 1 - *March Associates Const...* |
| | ○ 2 - *March Associates Const...*ᴸ | ☑ 2 - *March Associates Const...*ᴸ |
| Compare the Bidder in Column A to the lowest | ○ 3 - *H.C. Pody Company* | ☑ 3 - *H.C. Pody Company* |
| 3700 Section ▽ of the Bidder(s) in Column B | ○ 4 - *Kane Builders, Inc.* | ☑ 4 - *Kane Builders, Inc.* |
| Section | ○ 5 - *Builders, Inc.* | ☑ 5 - *Builders, Inc.* |
| Division<br>Subdivision  Summaries | ○ 6 - *Donnelly Construction* | ☑ 6 - *Donnelly Construction* |
| Line Item | * Click "Project Budget" to enter your budget costs for this project<br>** Click "Project Tracking" to track this project<br>ᴸ The Best & Final Bid with Bid Leveling Applied ||
| | Click Here to Email Leveled Dashboard ||
| | Generate Report ||

*FIG. 37*

LOW BID COMPARISON LOW REPORT GENERATED

3800

XYZBid

☐ Low Bid Comparison      ⓘ Print Instructions   🖨 Print   ✕ close

Project Name: BEACH a Mall Remodel     Project ID: BB166 - D

Export: ☐

| Line | Construction Task | Paris D... | Low Bid | Contractor |
|------|-------------------|------------|---------|------------|
| M0 | On Site Work | | | |
| M1 | Demolition | 3/3 2,500.00 | 2,500.00 | A. Development L |
| M2 | Land Clearance | 3/3 1,576.00 | 1,187.00 | B. Development... L |
| M3 | Excavation & Grading | | | |
| M4 | Cut | 3/3 4,288.00 | 4,288.00 | A. Development L |
| M5 | Fill | 1/3 0.00 | 1,200.00 | C. Builders L |
| M3T | Excavation & Grading Total | $4,288.00 | $5,488.00 | N/A |
| M6 | Subsurface | 3/3 3,400.00 | 3,400.00 | A. Development L |
| M7 | Staking | 3/3 1,466.00 | 1,277.00 | B. Development... L |
| M8 | Curb & Gutter | 3/3 6,900.00 | 6,900.00 | A. Development L |
| M9 | 16"x18" Curb | 0/3 0.00 | 0.00 | ALL L |
| M10 | 6" Extruded Curb | 0/3 0.00 | 0.00 | ALL L |
| M11 | Concrete Pads | 3/3 750.00 | 750.00 | Paris Development L |
| M12 | Concrete Walks | | | |

CHANGE ORDER SAVED AND SENT TO CONTRACTOR

CHANGE ORDER SAVED

4100

| PROJECT INFORMATION | AWARDED CONTRACTOR |
|---|---|
| CHI Inc. - Robyn Macey<br>HBH Duluth 32<br>The Honeybaked Ham & Cafe<br>9775 Medlock Bridge, Ste.R<br>Duluth, Ga 30097 | National Consulting & Development, Inc.<br>Aaron Parr<br>6091 Rangeline Road<br>Theodore, AL 36582-5201 |
| Award Amount | $299,975.00 |

PROJECT CHANGE ORDERS TO DATE

4101

| C.O.# | | | FM | Description | Date | | Signed<br>C PM CM | | | Status | NTE $ | Cost $ |
|---|---|---|---|---|---|---|---|---|---|---|---|---|
| X | X | 1 | PM | ADA Ramp | 04/10/08 | 11:35 am | X | X | X | Open ▽ | 1,600.00 | 0.00 |

Add Change Order    Save Status Values

Detailed View

CHANGE ORDERS TOTALS

4102

| | |
|---|---|
| Draft Total | 0.00 |
| Pending Total | 0.00 |
| Rejected Total | 0.00 |
| Approved Total | 0.00 |
| Total | 0.00 |
| Revised Amount with Approved Change Orders | $299,975.00 |
| Deviation from Awarded Amount | 0.00% |

1e - 1a,1b
From Fig. 40

FIG. 45

XYZMAIL - INBOX    4800

| | Home | Portal | Templates | Projects | Reports | CPMail | My Profile | Help | Logout |

MailBox

Inbox

[New] [Folders] [AddrBook] [Refresh] [To Trash]   [Trash ▽] [Move]

[Back]

| # | | Date | Sender | Subject | |
|---|---|------|--------|---------|---|
| 1 | | 04/04/2008 01:35:43 PM EST | Retail USA | xyzBid Advisory: Notice of Award for the Market Ave Project | ☐ |
| 2 | ✉ | 04/04/2008 01:35:41 PM EST | Retail USA | xyzBid Advisory: Notice of Award for the Market Ave Project | ☐ |
| 3 | ✉ | 03/21/2008 01:31:08 PM EST | CHI Inc. | xyzBid Advisory: Notice of Award for the 137 Court Street Project | ☐ |
| 4 | ✉ | 03/17/2008 07:58:03 AM EST | CHI Inc. | xyzBid Advisory: Notice of Award for the The HoneyBaked Ham & Cafe Project | ☐ |
| 5 | ✉ | 02/28/2008 04:04:10 PM EST | CHI Inc. | xyzBid Advisory: Notice of Award for the Tampa Mall Remodel Project | ☐ |

1 - 20 of 26 messages (17 unread)

XYZMAIL - CONTACTS

| ⊕ | Home | Portal | Templates | Projects | Reports | CPMail | My Profile | Help | Logout |

MailBox

📧 Address Book

[Back] [New] [Folders] [AddrBook] [Refresh]

⊙ Search Contacts

⊙ Add Contact

What would you like to do? ▷

→ Fig. 52

1-12 of 12 addresses in your address book

| ⦿ Name (Click to Edit) | Phone | Company | City | ST | Zip | Notes | E-Mail Address (Click to Mail) |
|---|---|---|---|---|---|---|---|
| ✎ ○ | | | | | | 030206-445 | cgc@cpbid.com |
| ✎ ○ | | | | | | Test QA | rparis@parisconst.net |
| ✎ ○ | | | | | | Test QA | wes@cpbid.com |
| ✎ ○ | | | | | | S9865-SDCA | zachs@ritewayconstx.org |
| ✎ ○ | | | | | | S9865-SDCA | bh24@langconstruction-22.com |
| ✎ ○ | | | | | | LT2233-6 | cgc@hawkeye_inc.com |
| ✎ ○ | | | | | | LT2233-6 | neal@River_walkbuilders.com |

FIG. 51

GENERAL CONTRACTOR - PROJECTS BIDDING

| ⊕ | Home | Projects | CPMail | My Profile | Help | Logout |

Paris Development's Homepage

✉ Welcome Rusty Kane                                    ✉ (23) New Messages

NOW BIDDING

| | | Bid Due |
|---|---|---|
| What would you like to do? | | |
| What would you like to do? | Addenda: al List: | |
| View Project Details | | |
| Order Plans | | 6 of 8 Viewed |
| Complete Subcontractor List | | 91.7% Complete 05/14/08 02:00PM EDT |
| Request for Information | | $10,665.00 |
| View Project Supporting Docs and Addenda | | |
| Open Cost Breakdown Sheet | ate Addenda: | |
| Upload Supporting Documentation | | 0 of 3 Viewed |
| Go To Bid Room | | $1,234,567.00 05/19/08 12:00PM EDT |
| Invite Subs | | |
| View/Select Sub Bids | | |
| View Bidder Information | | |

"What would you like to do?"

GENERAL CONTRACTOR- VIEW SUPPORTING DOCUMENTS & ADDENDA

6500
View Project Supporting Documents and Addenda 4a-1a.1e

View Project Supporting Docs and Addenda

Town Mall

View Project Supporting Documents and Addenda

? Print Instructions

🖶 Print Page

Supporting Documents

3 - 2/12/10 1:13 AM
Monthly Thermo
Attached Files

2 - 12/28/09 9:03 AM
TEST

1 - 12/6/09 10:34 AM
Minutes to Meeting
Attached Files

Addenda

5 - 4/11/10 10:24 AM
✉ 6501
Click the envelope to open

4 - 3/12/10 4:45 PM
✉
Click the envelope to open

3 - 3/12/10 10:19 PM
The bid date has been changed.
The Best & Final is Due on May 09, 2010  02:00 PM EDT

2 - 12/12/07 8:56 PM
The bid date has been changed.
The Best & Final Due: Mar 18, 2010   02:00 PM EDT

*FIG. 65*

SYSTEM AND METHOD FOR AUCTIONING BIDS ON CONSTRUCTION PROJECTS

CROSS-REFERENCE TO RELATED APPLICATIONS

This application is a continuation-in-part of application Ser. No. 10/423,858, filed Apr. 28, 2003 now abandoned, which in turn claims the benefit of U.S. Provisional Patent Application Ser. No. 60/377,978, filed May 7, 2002, the entirety of both applications are incorporated herein by reference.

FIELD OF THE INVENTION

The present invention relates to a multi-stage system and method for auctioning bids on construction projects. More particularly, the present invention relates to a multi-stage system and method for auctioning bids on available construction projects with a variety of participants.

BACKGROUND OF THE INVENTION

The Internet has dramatically changed the way people do business. The Internet can be used as a central reference for people in a particular industry to use and access. The Internet can also be used as a resource tool for doing specific research. But probably the most popular use of the Internet is for generating new business for a particular business. Showcasing particular goods and services on the Internet is a very powerful business tool. Some clever businesspeople even use the Internet as an auctioning and bidding medium for products and services.

DESCRIPTION OF THE PRIOR ART

The particular use of the Internet as an auctioning and bidding medium is reflected in the related art. U.S. Pat. No. 5,794,219 issued to Brown, outlines a method of con-ducting an on-line auction that permits individual bidders to pool bids during a bidding session. The auction is conducted over a computer network that includes a central computer, a number of remote computers and communication lines connecting the remote computers to the central computer. A number of bidding groups are registered in the central computer, each bidding group having a total bid for the item being auctioned.

U.S. Pat. No. 5,950,206 issued to Krause, outlines the use of a method and an apparatus for searching for and tracking construction projects and includes a mass data storage device for storing a database of project information and document information related to construction projects. A member terminal includes a computer connected to an input device and a display device. A user enters the data for tracking based upon selection of at least one key word contained in the project information stored in the databases, using the input device to mark at least one construction project identification for tracking based upon the key word.

U.S. Pat. No. 5,920,849 issued to Broughton et al., outlines systems and methods which assist a contractor in producing a competitive bid proposal. In one exemplary embodiment, a method is provided for producing a bid from at least one drawing, including various items to be included in the bid. To produce the bid, the method relies upon a computer having a display screen, an entry device and a processor coupled to the display screen and entry device.

U.S. Pat. No. 6,021,398 issued to Ausubel, outlines a computer implemented system and method of executing an auction. The system has at least two intelligent systems, one for the auctioneer and at least one for a user. The auction is conducted by the auctioneers system communicating with the user system. The auctioneer's system receives information from the user's system based on bid information entered by the user. With this information, the auctioneer's system determines whether the auction can be concluded or not, and appropriate messages are transmitted to the user.

U.S. Pat. No. 6,038,547 issued to Casto, outlines a computer-based tracking system and method for coordinating work done on a project and payment therefor. After a project has been partitioned by an architect, jobs are specified in terms of which region or subregion each entry corresponds. The contractors submit monthly application and certificate for payment requests, which are organized by the system to enable all the work in a particular region to be consolidated and listed on a reviewer's card for ease of verification.

U.S. Pat. No. 6,324,508 issued to Finney, outlines a method for performing a construction quantity takeoff estimate of a drawing representative of a construction project having a plurality of items that includes applying first vocal indicia representative of a selected item of the plurality of items to a voice recognition system and producing first electrical signals representative of the first vocal indicia by the voice recognition system. The selected item is first determined by the voice recognition system in accordance with the first electrical signals. Second vocal indicia representative of a quantity of the selected item are applied to the voice recognition system and second electrical systems representative of the quantity of the selected items that are produced.

U.S. Pat. No. 6,345,258 issued to Pickens, outlines an information system for the management of a new home construction process. The system is designed to be used by builders that reuse house plans or product information in the new homes they build. Three distinct steps in the process are used as the basis for the information model: product development, procurement and order fulfillment. The software is divided into three modules based upon three distinct dialects that must be related and communicated efficiently.

U.S. Pat. No. 7,225,152 issued to Atkinson et al. discloses a method of allocating an award in an auction wherein an award for a given auction round is allocated amongst a plurality of highest ranked bidders including at least a first ranked bidder and a second ranked bidder. The method includes incentives to the first and second ranked bidders to each improve their respective bids during the auction.

U.S. Published Application No. 2001/0044768 discloses an on-line system which assist participants in improving cost efficiencies and performance enhancements which traditional manual bidding and construction management systems cannot achieve. The system facilitates management of real estate, development, building and construction industries, including architecture, engineering, and construction project phases, including design, specification, research, financing, procurement construction and maintenance.

Although each of the previously described patents outline novel and useful inventions, what would really be useful is a system and method to implement an auction system to contract for the acquisition and procurement of construction services from qualified contractors through the use of the Internet, an intranet, enabling technology, and/or computer software product. That is what is needed in the marketplace, a system and method for auctioning bids on available construction projects with a variety of participants.

None of the above inventions and patents, taken either singly or in combination, is seen to describe the instant invention as claimed.

SUMMARY OF THE INVENTION

The invention is a computerized multi-stage system, and method for bidding auctions on construction projects. The system utilizes Internet client-server technology. The system includes input means and devices for entering into the computerized system and validating member credentials, accessing construction projects, registering to bid on the construction projects, providing information relative to a type of contract the construction projects will have, sorting, accepting and rejecting bids for the construction projects, posting a winning bid in order for an owner to compare it to the project budget, having the winning bid be reviewed by an owner and architect of the construction projects, via a report provided by the system and providing a forum for new contractors to become members.

Accordingly, it is an objective of the invention to provide a system and method for multi-stage bid auctions on construction projects.

It is another object of the invention to reduce construction costs on biding on construction projects.

It is another object of the invention to bid projects using a customizable, multi-stage bid auction process.

It is another object of the invention to provide contractors with additional time between stages to evaluate their bids and to therefore reduce risk to contractor and owner.

It is another object of the invention to provide an optional pre-bid stage to determine if contractors are within a competitive range.

It is another object of the invention to enable better decision making on behalf of the owner by providing a comprehensive project report that summarizes the savings to the owner and the qualifications of the participating contractors.

It is another object of the invention to provide the owner with a system to select trade-specific contractors for the bid auction process.

It is a further object of the invention to establish new construction project bidding and evaluation standards.

Still another object of the invention is to provide a high visibility vehicle for owners and developers to auction their bids on construction projects on-line.

It is another object of the invention to raise contractor qualification standards for auctioned bids on construction projects.

It is an object of the invention to provide improved elements and arrangements thereof in an apparatus for the purposes described which is inexpensive, dependable and fully effective in accomplishing its intended purposes.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

FIGS. 3-53 provide detailed flow charts and screen shots showing system functionality for the corporate portal owners. Corporate portal owners are given the ability to monitor and if necessary control all bid activity being managed by their construction managers and project managers. The flow charts include all menu selections and their associated functionality to include portal management, creating and viewing/editing templates, creating new projects, viewing projects bidding, in draft and in history, generating reports from historical data, monitoring bidding and project manager statistics, using the XYZMail function, creating and updating a profile and use of the help function;

FIGS. 57-75 include flow charts and screen shots depicting the system functionality made possible for invited general contractors. FIG. 57 is a screen shot of the general contractor's home page at XYZBid.com. From here the general contractor can navigate the full available functionality with in the system which includes the main menu and the "What would you like to do?" selections. Total collaboration is provided from the receipt of the invitation to bid through and including bid submittal, bid leveling and managing change orders;

FIG. 80 is a system overview for auctioning bids on construction projects according to the present invention;

Similar reference characters denote corresponding features consistently throughout the attached drawings.

DETAILED DESCRIPTION OF THE INVENTION

Figure 1:
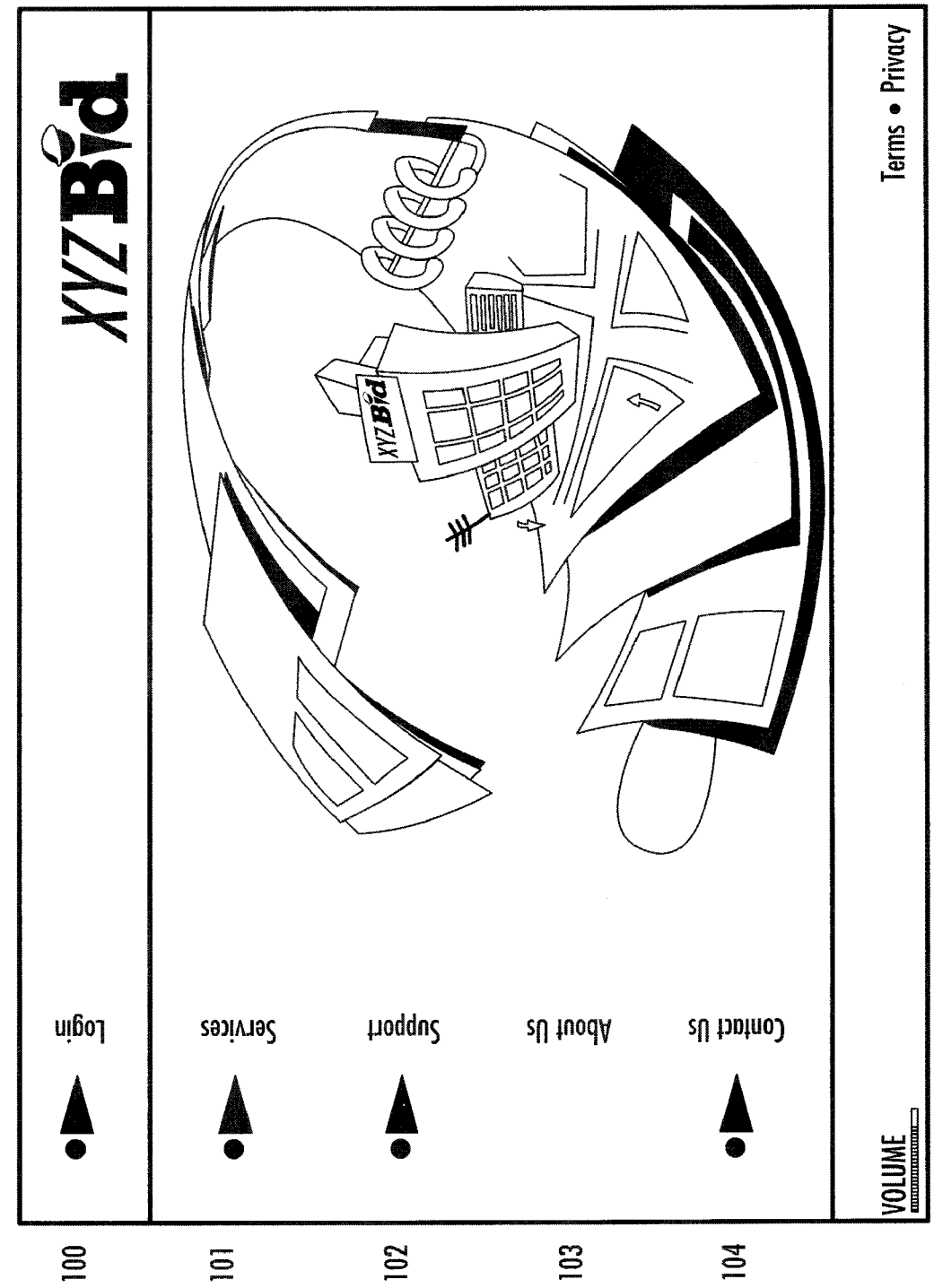
FIG. 1 is a screen shot of the XYZBid.com web page used for bidding auctions.

While the present invention is susceptible of embodiment in various forms, there is shown in the drawings and will hereinafter be described a presently preferred, albeit not limiting, embodiment with the understanding that the present disclosure is to be considered an exemplification of the present invention and is not intended to limit the invention to the specific embodiments illustrated.

FIG. 1 is the home page of the company which operates a multistage bidding system. For example is could be XYZBid.com. From this home page new users can register or login 100 to use the multistage bidding system. Registered and non-registered Users can also view information about the company services 101, support 102, history 103, and access contact information 104.

Figure 2:
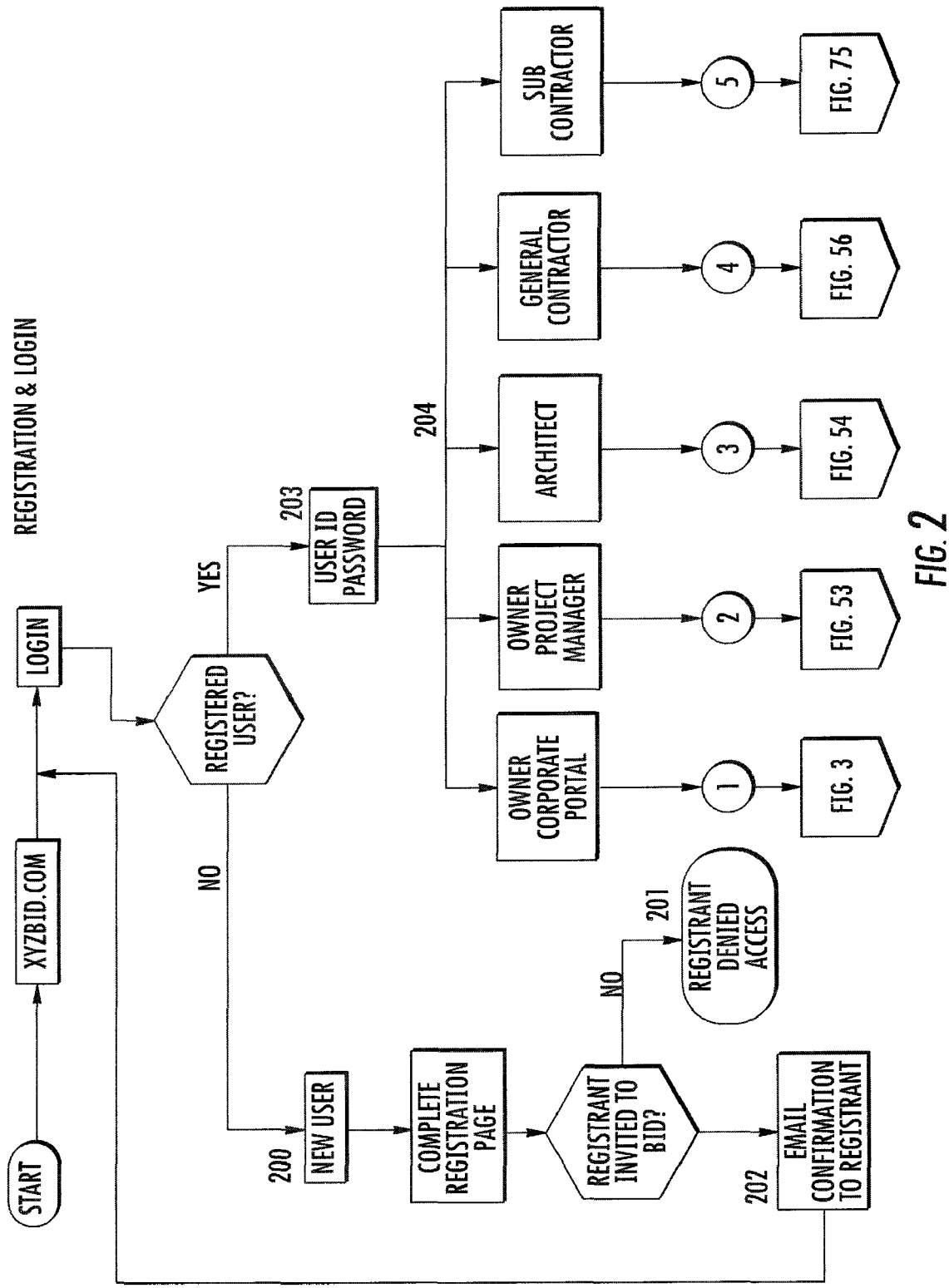
FIG. 2 is a flowchart depicting a user's registration and login. Users can register as Corporate owners, Project Managers, Architects, Developers, General Contractors, or Sub Contractors.

FIG. 2 shows applications for both registered and non-registered bidders logging into the multistage system. Non registered Users are required to register 200 before they are granted access to XYZBid. Those that have not received an invitation to bid are denied access 201. Those that have been invited to bid are sent an e-Mail confirmation and then authorized to login to XYZBid and start using the system 202. Registered Users must enter their User ID (e-Mail address) and password they created when they registered to gain access 203. After login, the system checks registration and routes the User to their home page as either a Corporate Portal Owner, Project Manger, Architect, General Contractor, or Sub-Contractor 204.

FIG. 3 is a screen shot of the Owner's Corporate Portal home page 300. The view that is shown is the Member's View. This allows the Owner to drill down into construction managers or regional managers 301, store types 302 within those regions and then to the project managers 303 where they can access their projects in draft, bidding, and in history. The flow chart associated with this screen shot is shown on FIG. 4.

Figure 4:
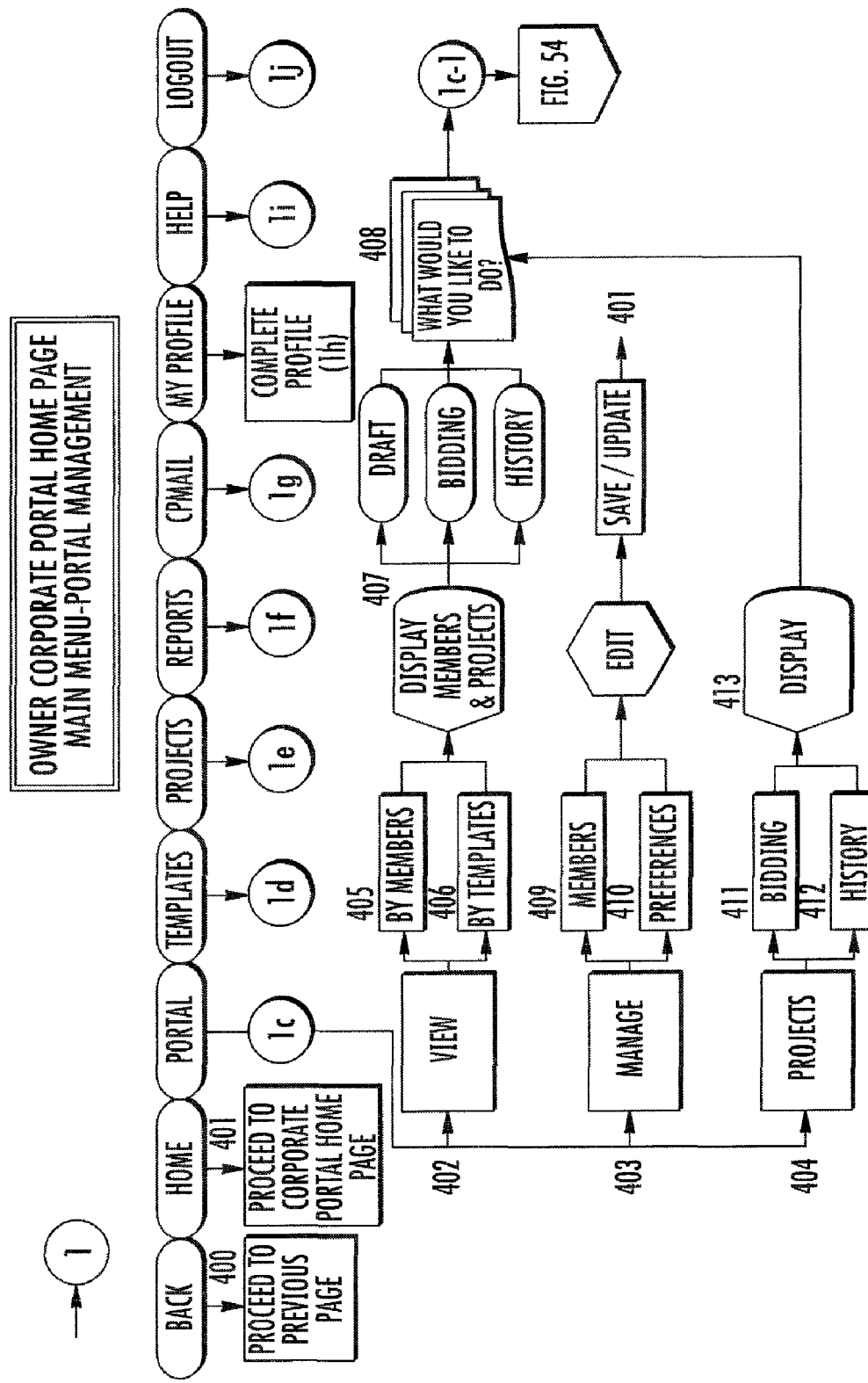

FIG. 4 shows the Corporate Portal Menu and the various selections. The BACK selection 400 allows the User to proceed to the previous page. Clicking on the HOME selection 401 will trigger the system to display the home page. Selection of the PORTAL (lc) provides a drop down with three selections; VIEW 401, MANAGE 403, and PROJECTS 404. Selecting VIEW 402 then shows two more optional selections BY MEMBERS 405 and BY TEMPLATES 406. Selecting BY MEMBERS 405 provides the User with the Member View as displayed in the screen shot on FIG. 3. Selecting the BY TEMPLATE view 406 will display the templates and associated projects in draft, bidding and in history using that template 407. From there, the portal owner can select the "What would you like to do?" drop down list 408 as further described in detail at FIG. 15. Selecting the MANAGE function 403 allows the portal owner to manage members by adding new members, editing existing ones, setting portal hierarchy for viewing rights, or deleting existing members. 409. Selecting PREFERENCES 410 allows the Portal Owner to select the system functionality that they want their project managers to be able to access and use. Selecting PROJECTS 404 provides a drop down with two choices, BIDDING 411 and HISTORY 412. Selecting either of these choices will DISPLAY THE PROJECTS 413 for the portal owner and be given all of the selections in the drop down list 408 as shown in FIG. 5.

Figure 5:
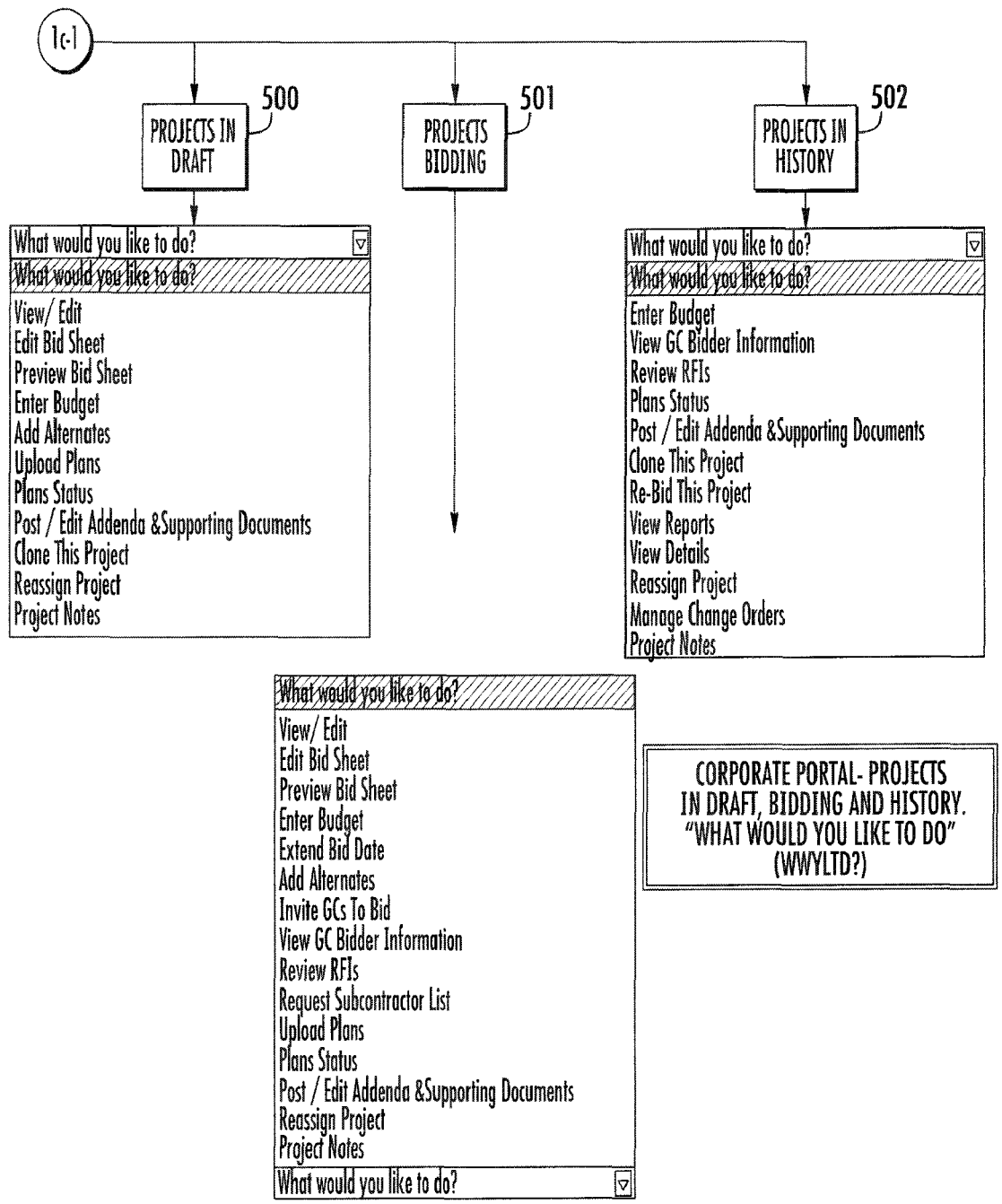

FIG. 5 displays three screen shots showing the "What would you like to do?" drop down list for PROJECTS IN DRAFT 500, PROJECTS BIDDING 501, and PROJECTS IN HISTORY 502. Selection of any item within these drop downs will provide the User with the associated functionality.

Figure 6:
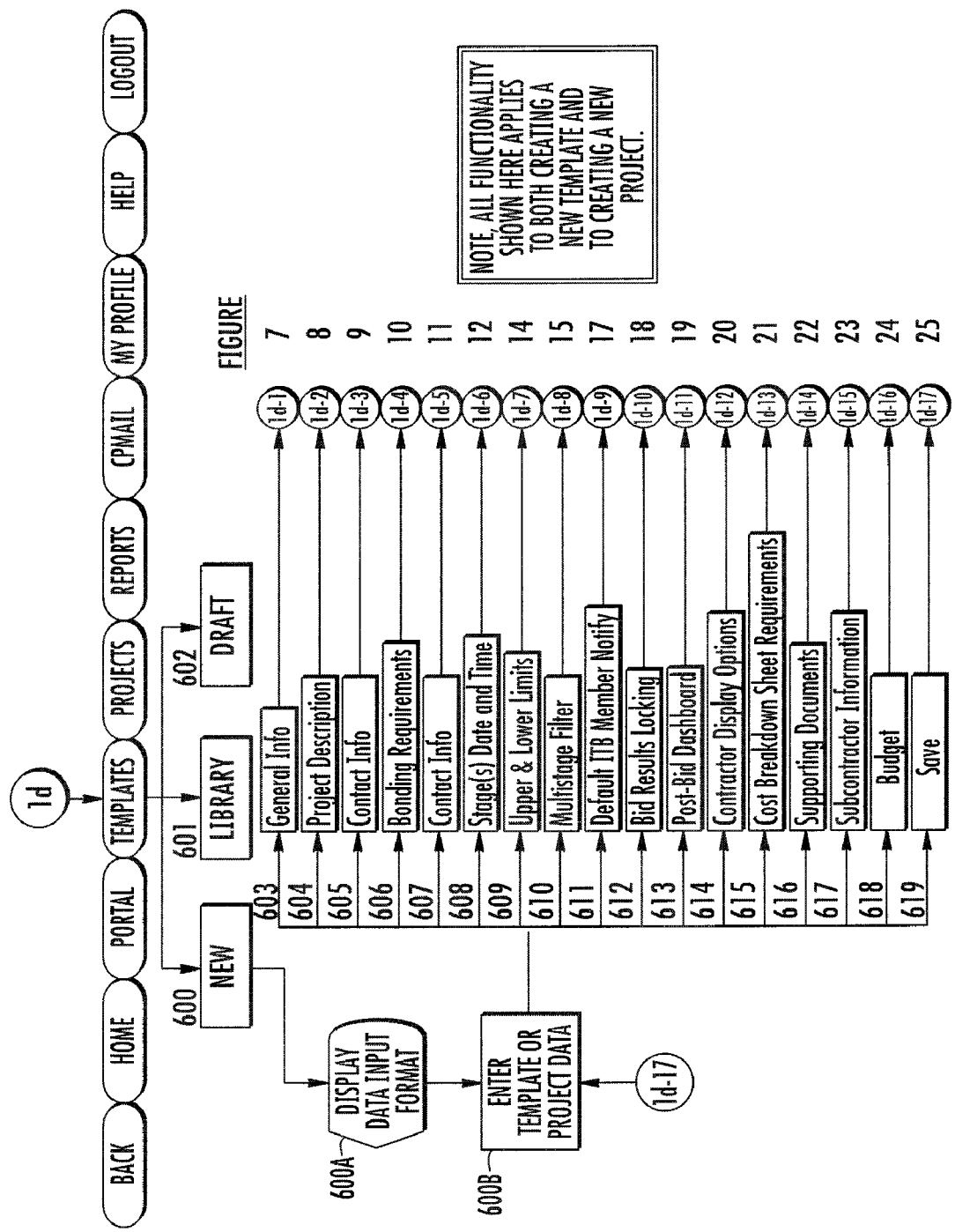

FIG. 6 is a flow chart of the User selecting TEMPLATES from the main menu (Id). Selecting TEMPLATE displays three selections, NEW 600, LIBRARY 6011, and DRAFT 602. Selecting NEW 600 displays the DATA INPUT FORMAT 600A where the User ENTERS TEMPLATE or PROJECT DATA 600B information relative to the project; GENERAL INFORMATION 603, PROJECT DESCRIPTION 604, CONTRACT INFORMATION 605, BONDING REQUIREMENTS 606, CONTACT INFORMATION 607, STAGE(S) DATE AND TIME 608] UPPER & LOWER LIMITS 609, MULTISTAGE FILTER 610, DEFAULT ITB MEMBER NOTIFICATION 611, BID RESULTS LOCKING 612 POST-BID DASHBOARD 613, CONTRACTOR DISPLAY OPTIONS 614, COST BREAKDOWN SHEET REQUIREMENTS 615 SUPPORTING DOCUMENTS 616, SUBCONTRACTOR INFORMATION 617, BUDGET 618, and the SAVE function 619. Note the sequencing and code used for template creation is the same code used for new project creation by a project manager.

Figure 7:
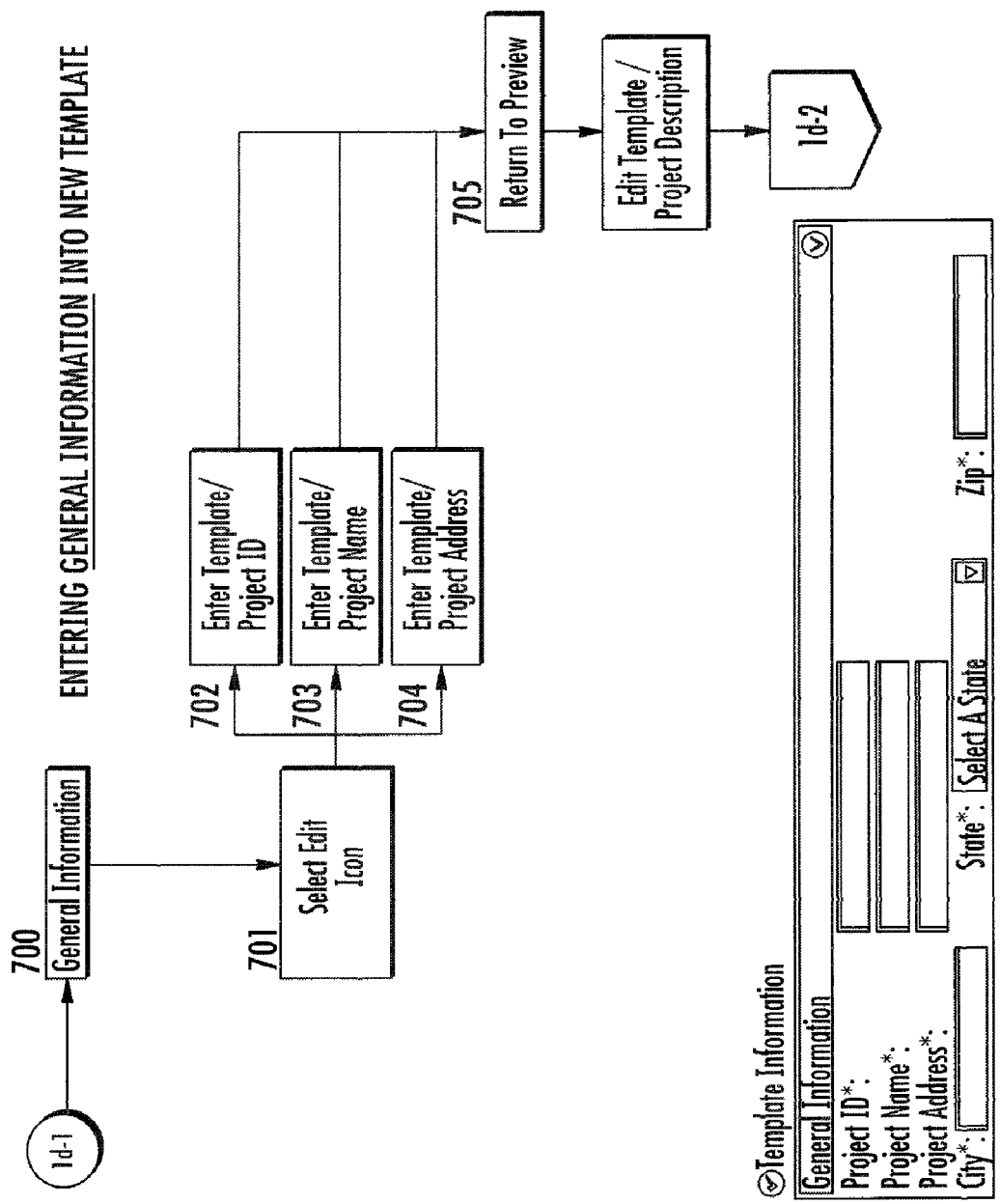

FIG. 7 shows the sequence for entering GENERAL INFORMATION 700 into the new template or new project. The same format is used for both. To open the GENERAL INFORMATION section, the User selects the EDIT ICON 701. When the EDIT ICON 701 is selected, the section opens and allows the User to enter the TEMPLATE/PROJECT ID 702, TEMPLATE/PROJECT NAME 703 and the TEMPLATE/PROJECT ADDRESS 704. When finished with the GENERAL INFORMATION section 700 the User selects the RETURN TO PREVIEW button 705 to load and save the data for that section. The system then takes you to the PROJECT DESCRIPTION section as shown in FIG. 8.

Figure 8:
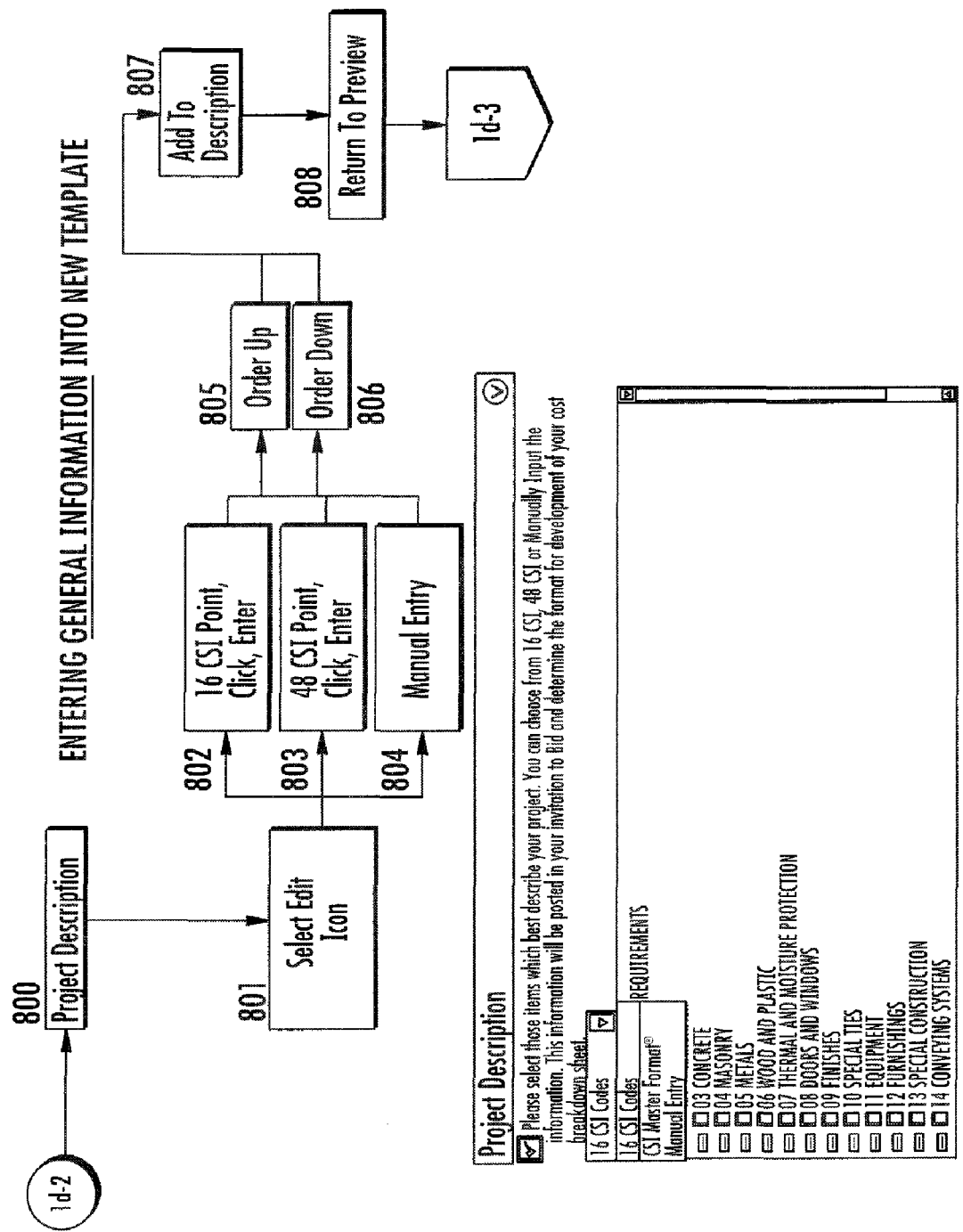

FIG. 8 shows the TEMPLATE PROJECT DESCRIPTION 800 being entered. To open this section the User will SELECT EDIT ICON 801. The section will open allowing the User to enter the description using the 16 CSI quick pick list 802, the Master Format 48 CSI quick pick list 803, or Manual entry option 804. The Manual entry option can be combined with either CSI selection or be used stand alone. Once the selections or manual entry is made, items can be ORDERED UP 8050R ORDERED DOWN 806. The ADD button 807 is clicked to combine manual and pick list items. When finished the User selects the RETURN TO PREVIEW button 808. The system then takes the User to FIG. 9.

Figure 9:
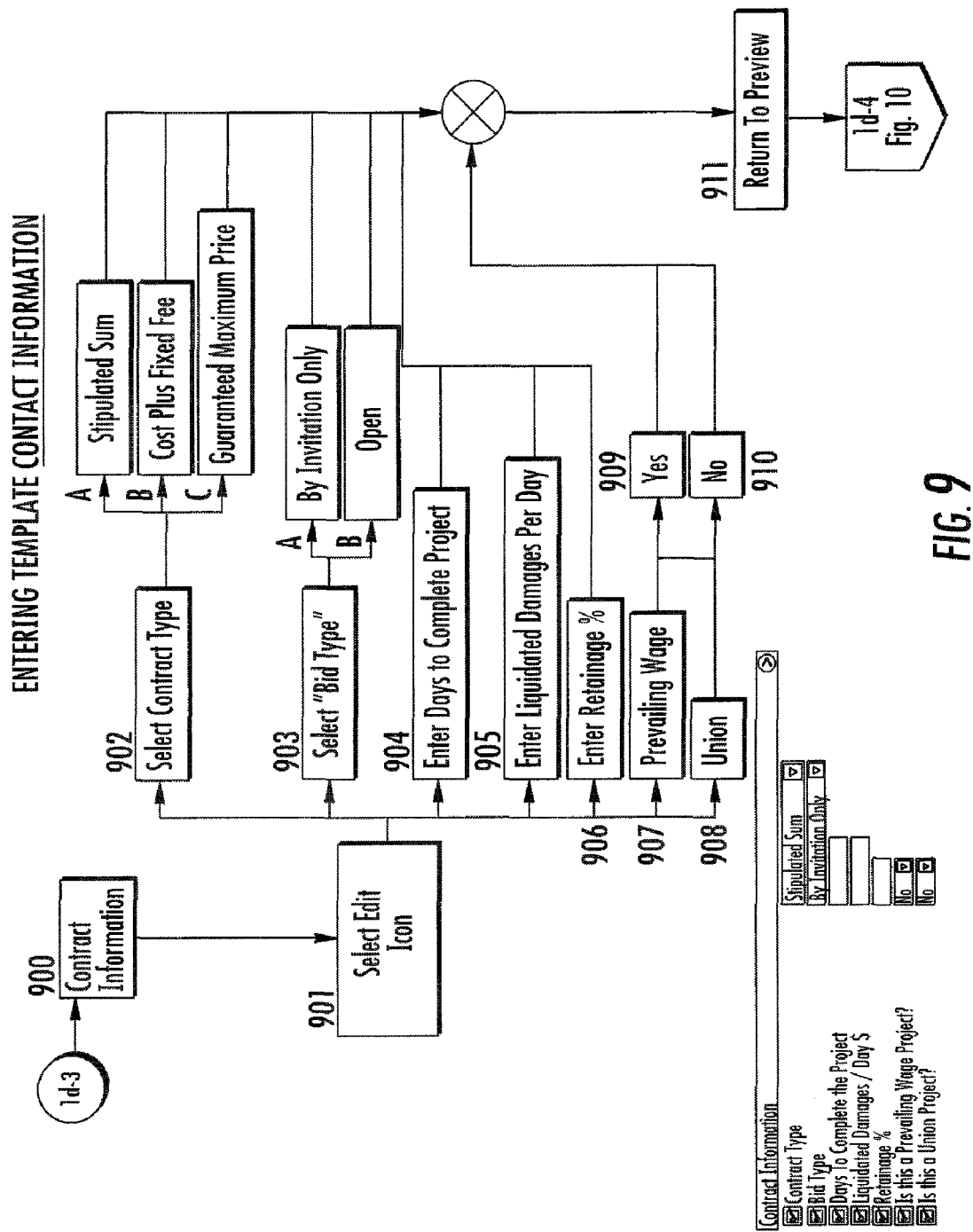

FIG. 9 is the CONTRACT INFORMATION 900 section of the template. Upon selecting the EDIT ICON 901 the section opens and allows the User to select the CONTRACT TYPE 902—STIPULATED SUM 900A, COST PLUS FIXED FEE 900B, or GUARANTEED MAXIMUM PRICE 900C. The User will then select the BID TYPE 903 BY INVITATION ONLY 903A or OPEN 903B. The User will then enter the DAYS TO COMPLETE THE PROJECT 904 LIQUIDATED DAMAGES 905, RETAINAGE 906 in the amount of a percent, and select YES 909 or NO 910 if the project is a PREVAILING WAGE 907 or UNION PROJECT 908. When finished with the entries and selections in this section, the User will click the RETURN TO PREVIEW 911 button. The system then takes the User to the Bonding Requirements section as shown on FIG. 10.

Figure 10:
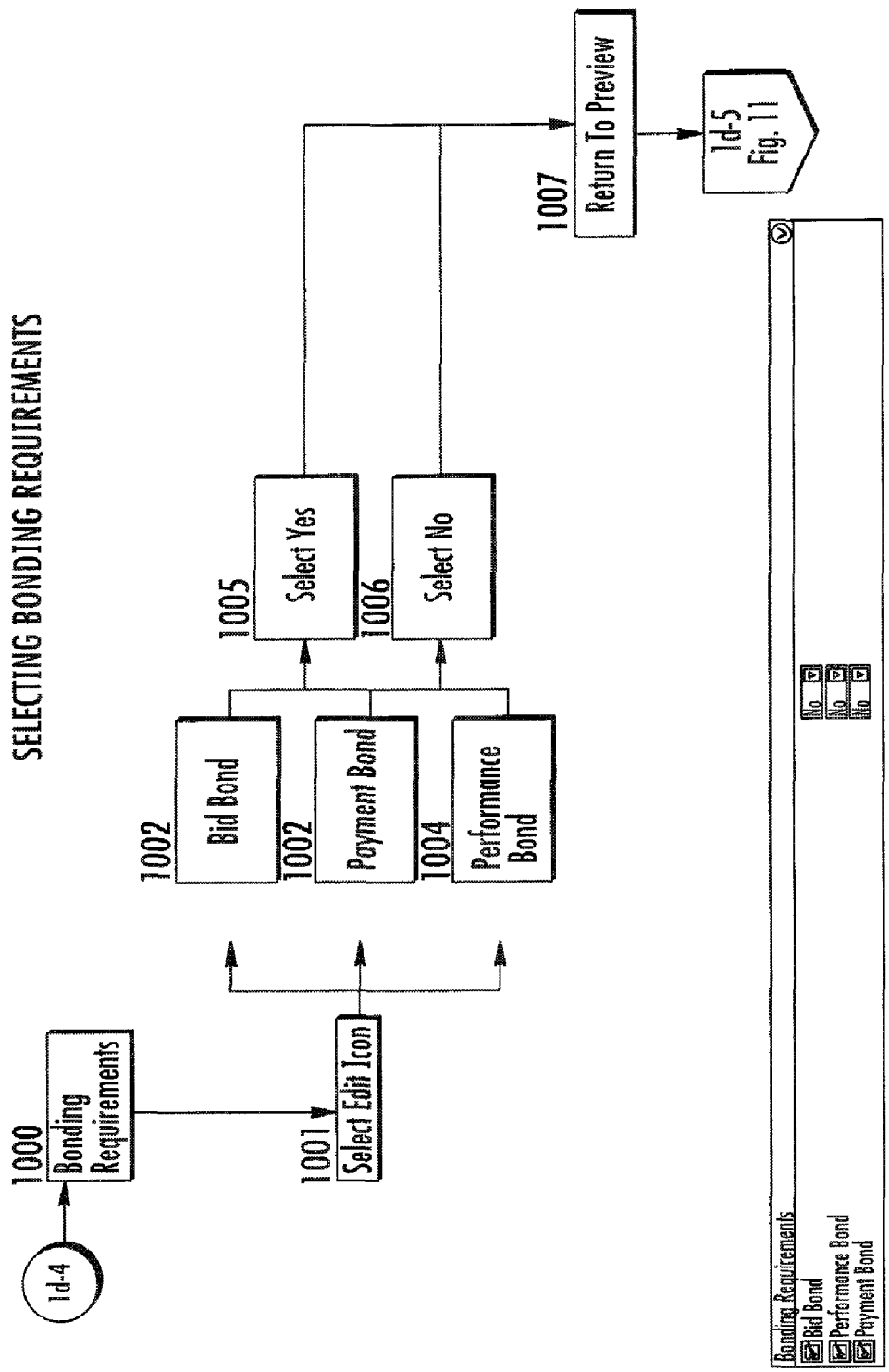

FIG. 10 is the BONDING REQUIREMENTS 1000 section. Once the EDIT ICON 1001 is selected, the User can select the type of bond BID BOND 1002, PAYMENT BOND 1003, or PERFORMANCE BOND 1004 and then select YES 1005 or NO 1006 from the drop downs as shown in the screen shot. The User will then select the RETURN TO PREVIEW button 1007 to load the data into the template/project. The system will then take the User to the Contact Information sections as shown in FIG. 11.

Figure 11:
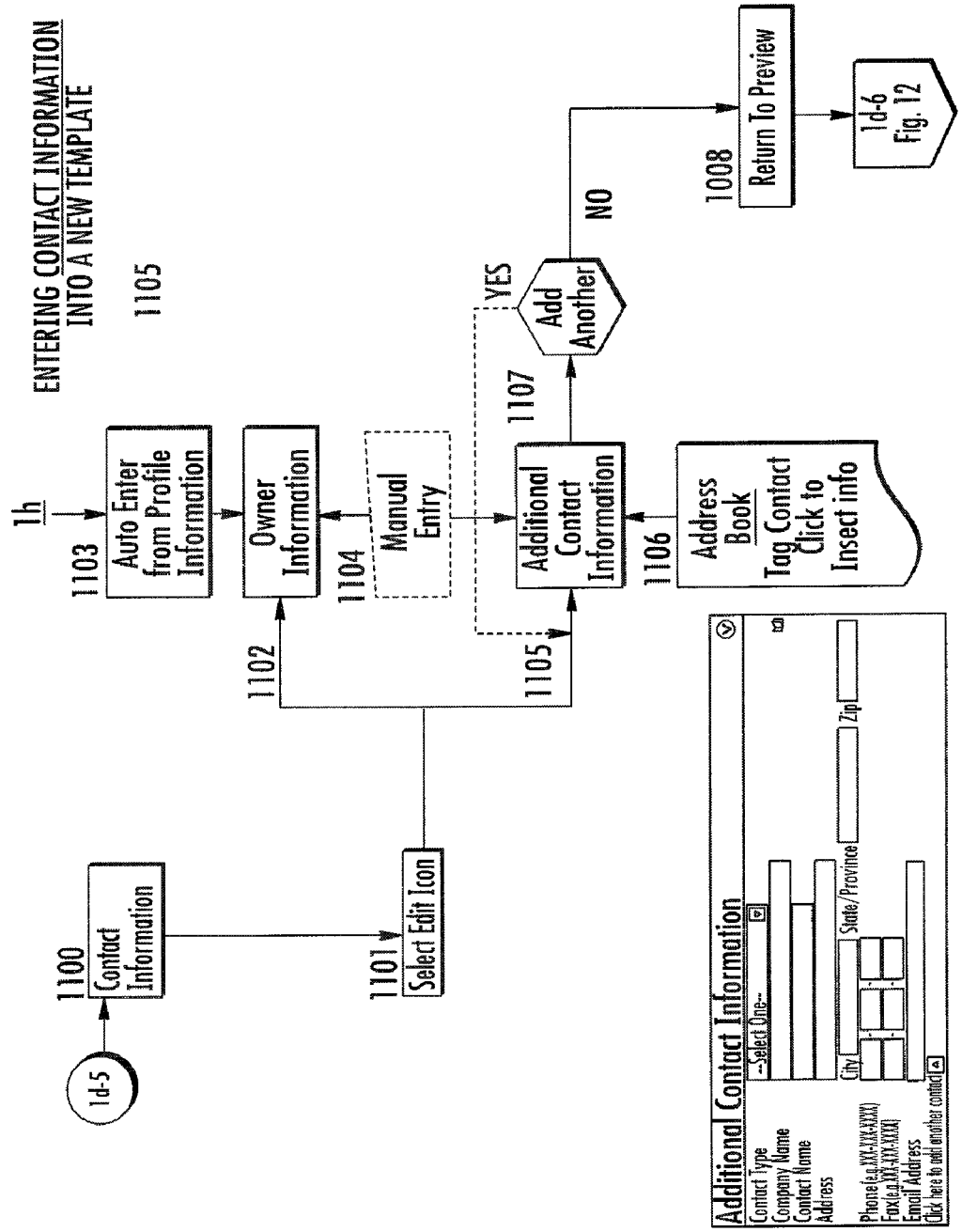

FIG. 11 is the CONTACT INFORMATION section 1100. All entries entered into this section will receive notifications on Requests for Information (RFI) and when new Addenda is posted to the project. The section will open when the EDIT ICON 1101 is selected. The OWNER INFORMATION 1102 will automatically populate if the User has completed their PROFILE INFORMATION 1103 at the main menu. If they have not completed their profile information, they have the option of entering it through MANUAL ENTRY 1104. The User also has the option to add ADDITIONAL CONTACT INFORMATION 1105 to this section. As many additional contacts can be added to this section as needed 1107. When finished, the User selects the RETURN TO PREVIEW 1108 button to load the data into the Contact Information Section of the Template/Project. The system takes the User to the Stage (s) Date and Time section of the Template/Project as shown in FIG. 12.

Figure 12:
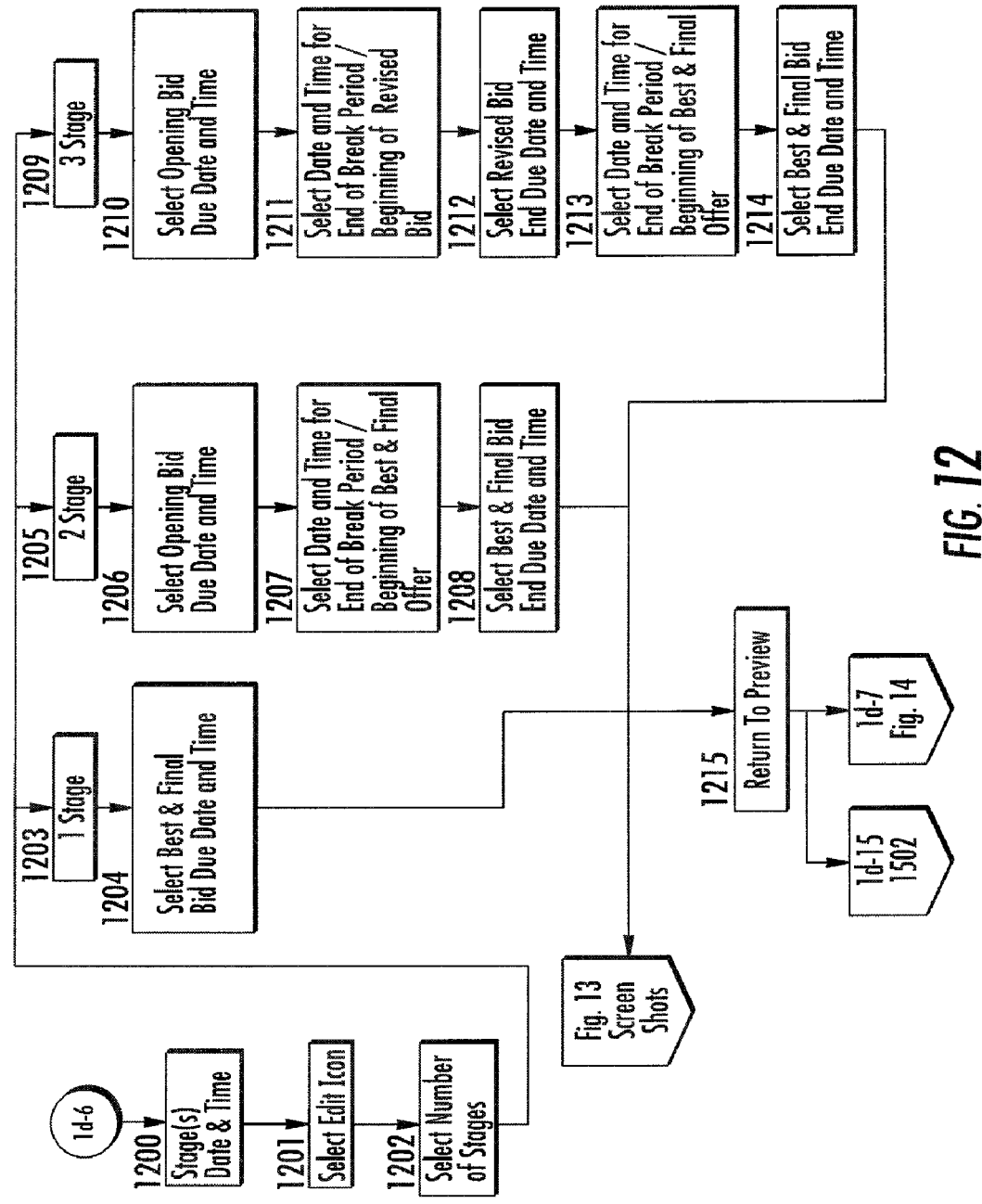

FIG. 12 is the STAGE(S), DATE, AND TIME 1200 section. This is where the User defines the number of stages that are to be used in the bidding process. To edit this section the User will select the EDIT ICON 1201 and the section will open. The User will then select THE NUMBER OF STAGES 1202 either 1 STAGE 1203, 2 STAGE 1205 or 3 STAGE 1209 from the drop down list.

If 1 Stage of bidding is selected, the User will input the BEST AND FINAL OFFER BID DUE DATE AND TIME 1204 and select the RETURN TO PREVIEW 1215 button.

If the User selects 2 STAGE 1205 he will then be prompted to enter the OPENING BID DUE DATE AND TIME 1206, then the BEGINNING OF THE BEST AND FINAL OFFER BID DUE DATE AND TIME 1207 and to follow, the BEST AND FINAL OFFER END DUE DATE AND TIME 1208. The time lapse between the end of the Opening Bid and the beginning of the Best and Final Offer is know as the BREAK PERIOD 1206A.

If the User selects 3 STAGE 1209 he will then be prompted to enter the OPENING BID DUE DATE AND TIME 1206, then the REVISED BID OPENING DUE DATE AND TIME 1211 and to follow, the REVISED BID END DUE DATE AND TIME 1212. The next step is to enter the BEGINNING OF THE BEST AND FINAL OFFER BID DUE DATE AND TIME 1213 and then the BEST AND FINAL OFFER END DUE DATE AND TIME 1214.

After all selections are complete, the User will click the RETURN TO PREVIEW button 1215 to load the data into the template/project. The setting of the 1, 2, or 3 stages of bidding can be seen in the screen shots shown in FIG. 13. The system then prompts the User to complete the Setting of the Upper and Lower Limits, if the setting is required as shown in FIG. 14.

Figure 13:
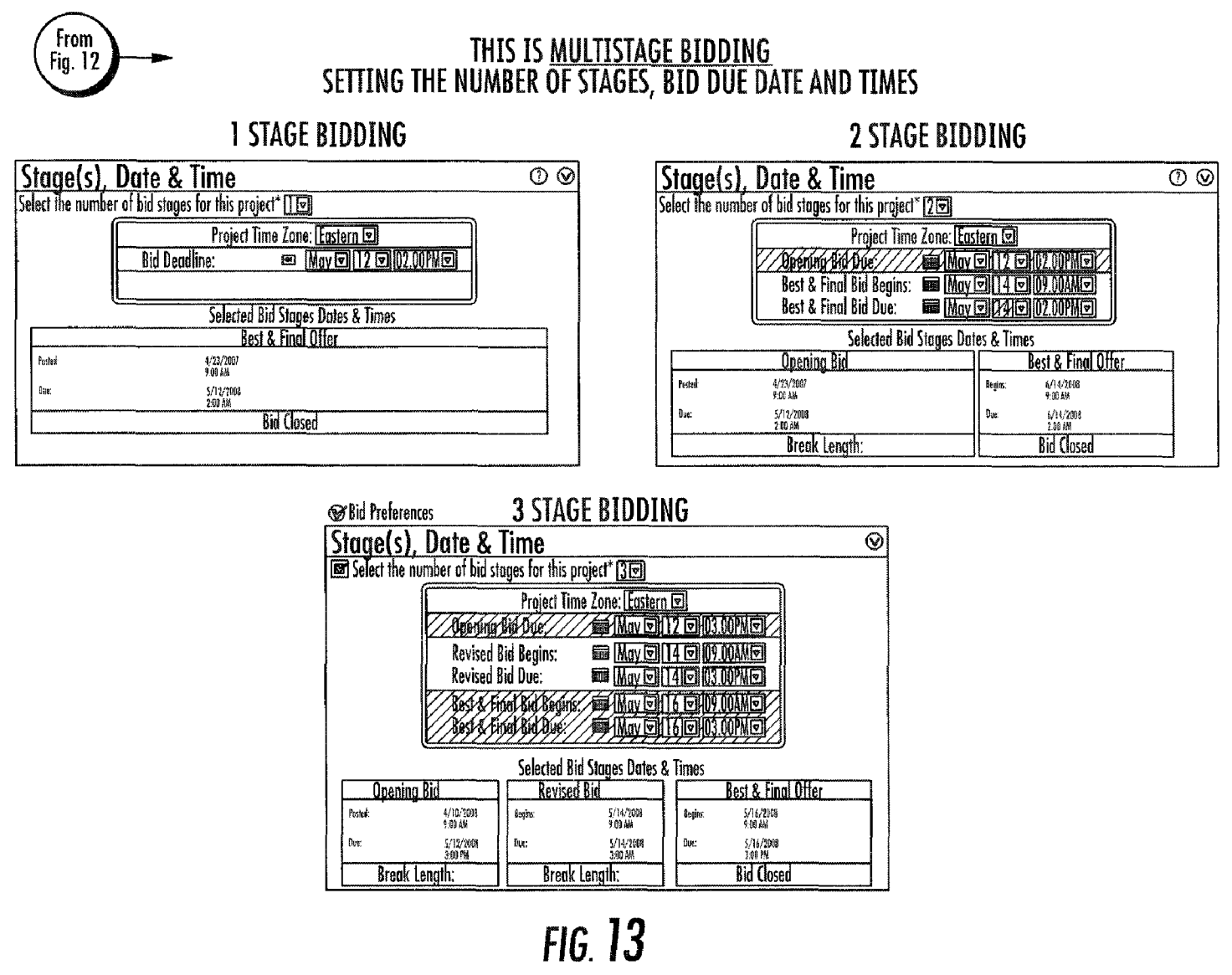

FIG. 13 provides screen shots of the setting of the multi-stages of bidding; 1 Stage, 2 Stage, and 3 Stage.

Figure 14:
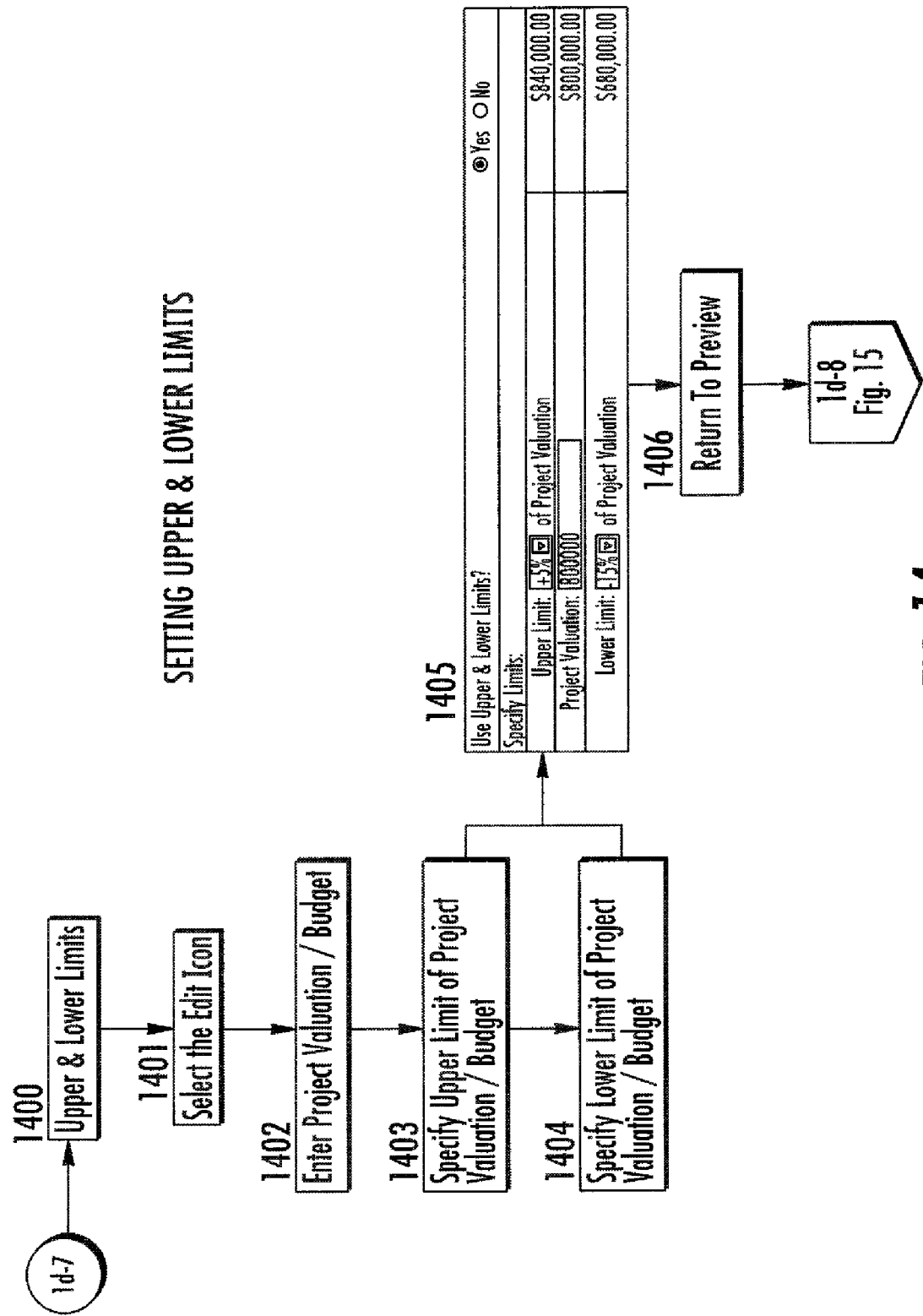

FIG. 14 shows the sequence for setting the UPPER & LOWER LIMITS 1400 section when creating a template or a new project. The User selects the EDIT ICON 1401, enters the PROJECT VALUATION/BUDGET 1402, selects the UPPER LIMIT 1403 from the drop down in the form of a percentage, and then selects the LOWER LIMIT 1404 from the drop down in the form of a percentage. The upper deviation is generally set to not exceed the budget and the lower limit is set to a PARAMETER 1405 where the User knows that a bid received under this amount would put the owner and contractor at risk. The User then selects the RETURN TO PREVIEW 1406 and the system prompts the User to FIG. 15, Setting the Bid Filter when using multistage bidding.

Figure 15:
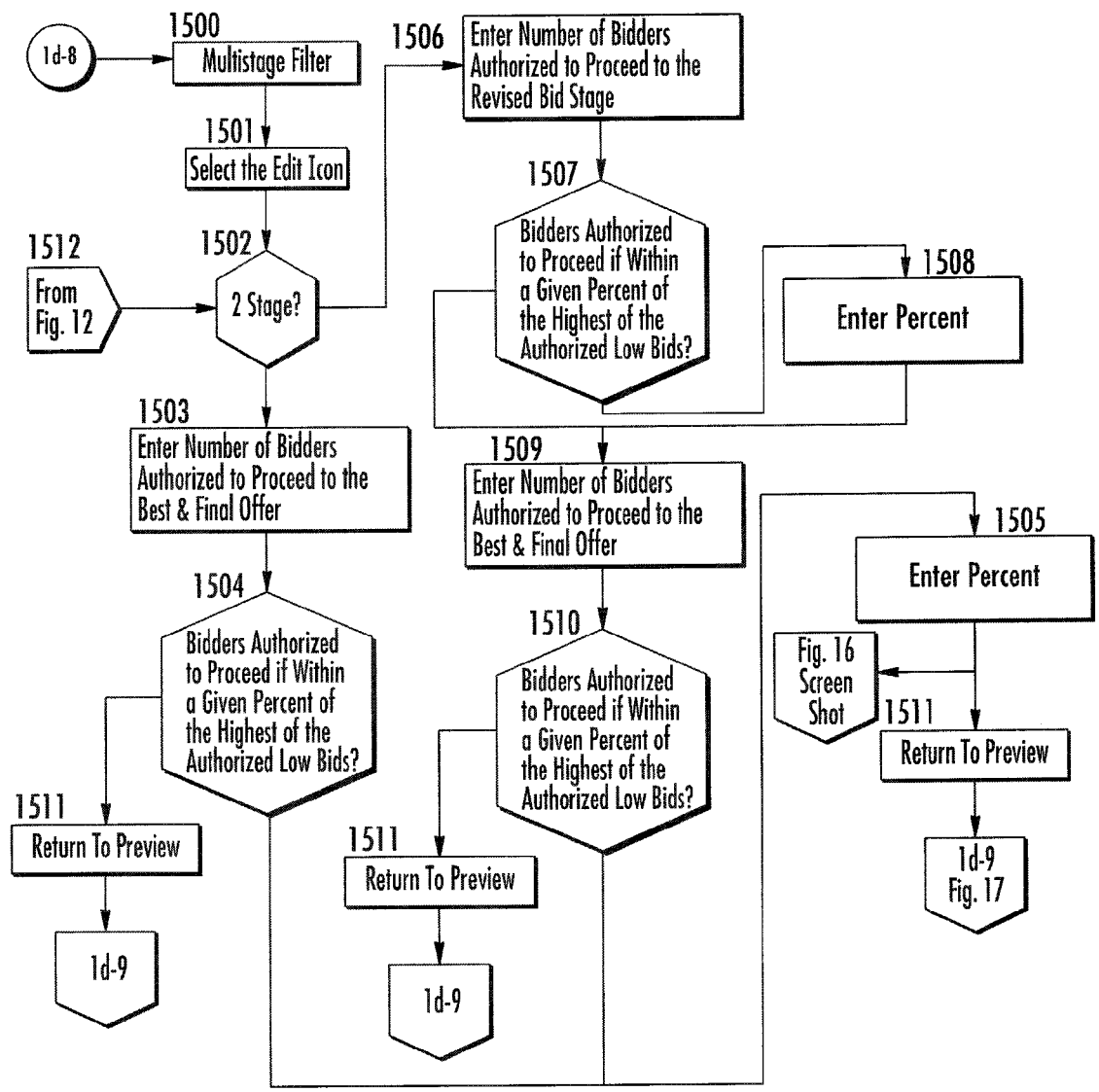

FIG. 15 shows the sequence for setting the MULTISTAGE FILTER 1500. The User selects the EDIT ICON 1501. In FIG. 12 the number of stages was set and then the system enabled the bid filter processing FIG. 12 1512 setting the number of stages to either 2 or 3 for multistage bidding. If 2 Stages were selected the User enters the NUMBER OF BIDDERS AUTHORIZED TO PROCEED TO THE BEST AND FINAL OFFER 1503 and if the User wants to allow additional bidders to proceed to the Best and Final Offer he can ENTER A PERCENTAGE 1505 that when added to the highest of the low bidders will also be authorized to proceed to the Best and Final Offer—BIDDERS AUTHORIZED TO PROCEED IF WITHIN A SET PERCENTAGE OF THE HIGHEST OF THE AUTHORIZED LOW BIDS 1504. If 3 Stage bidding is selected, the User enters the number of BIDDERS AUTHORIZED TO PROCEED TO THE REVISED BID STAGE 1506, enters BIDDERS AUTHORIZED TO PROCEED IF WITHIN A GIVEN PERCENT 15080F THE HIGHEST OF THE AUTHORIZED LOW BIDS 1507, ENTERS THE NUMBER OF BIDDERS AUTHORIZED TO PROCEED. TO THE BEST AND FINAL OFFER 1509 and those BIDDERS AUTHORIZED TO PROCEED IF WITHIN A GIVEN PERCENT OF THE HIGHEST OF THE AUTHORIZED LOW BIDS 1510. An example of this for a 3 Stage bid would be 3/5-2/5. This means that the 3 lowest bidders and anyone within 5 percent of the highest of the 3 low bidders are authorized to pass to the Revised Bid Stage and the 2 lowest bidders and anyone within 5 percent of the higher of the 2 low bids are authorized to proceed to the Best and Final Offer. The system then prompts the User to select portal members that are to be notified when the invitation to bid is sent out, FIG. 17. The User then selects the RETURN TO PREVIEW 1511 button to populate the data.

Figure 16:
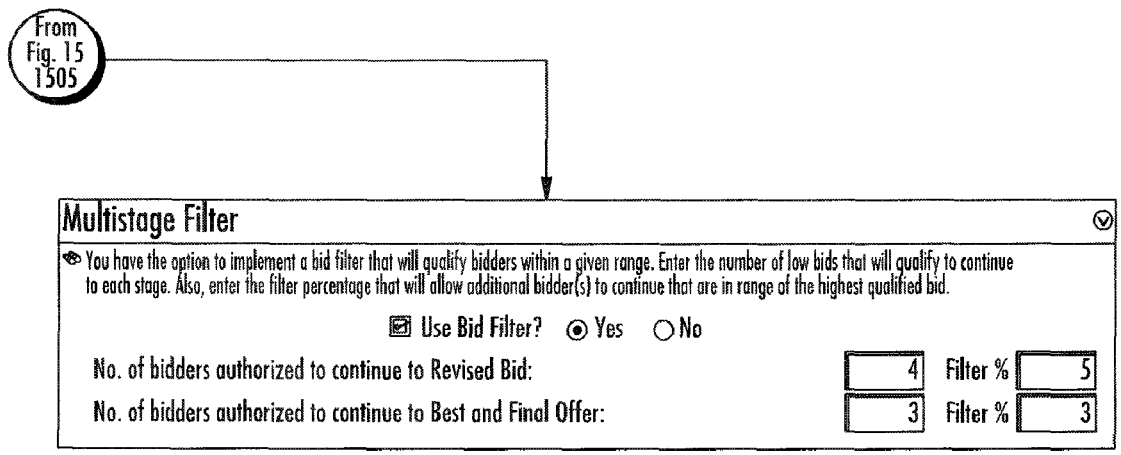

FIG. 16 is a screen shot showing how the Multistage Filter is set. An explanation is provided.

FIG. 17 THE DEFAULT ITB MEMBER NOTIFY section 1700 allowing the User to specify who should receive notification when an invitation to bid is sent out. The User selects the EDIT ICON 1701, TAGS THE DESIRED MEMBERS AS LISTED IN THE PORTAL 1702 and then selects the RETURN TO PREVIEW button 1703 to load the data. A screen shot is provided to show the functionality. The system then prompts the User to select the portal members that are authorized to view the initial bid results as shown in FIG. 18.

FIG. 18 shows how the User can select portal members that will be authorized to view the initial bid results. This is the BID RESULTS LOCKING 1800 section. The User selects the EDIT ICON 1801 then TAGS MEMBERS 1802 listed in the portal who will be authorized to view the reports. When finished, the User will select the RETURN TO PREVIEW button 1803. A screen shot is provided that shows the system functionality. The system now prompts the User to select if the PM or PM & Management can receive the dashboard summary at the end of the bid as shown in FIG. 19.

Figure 19:
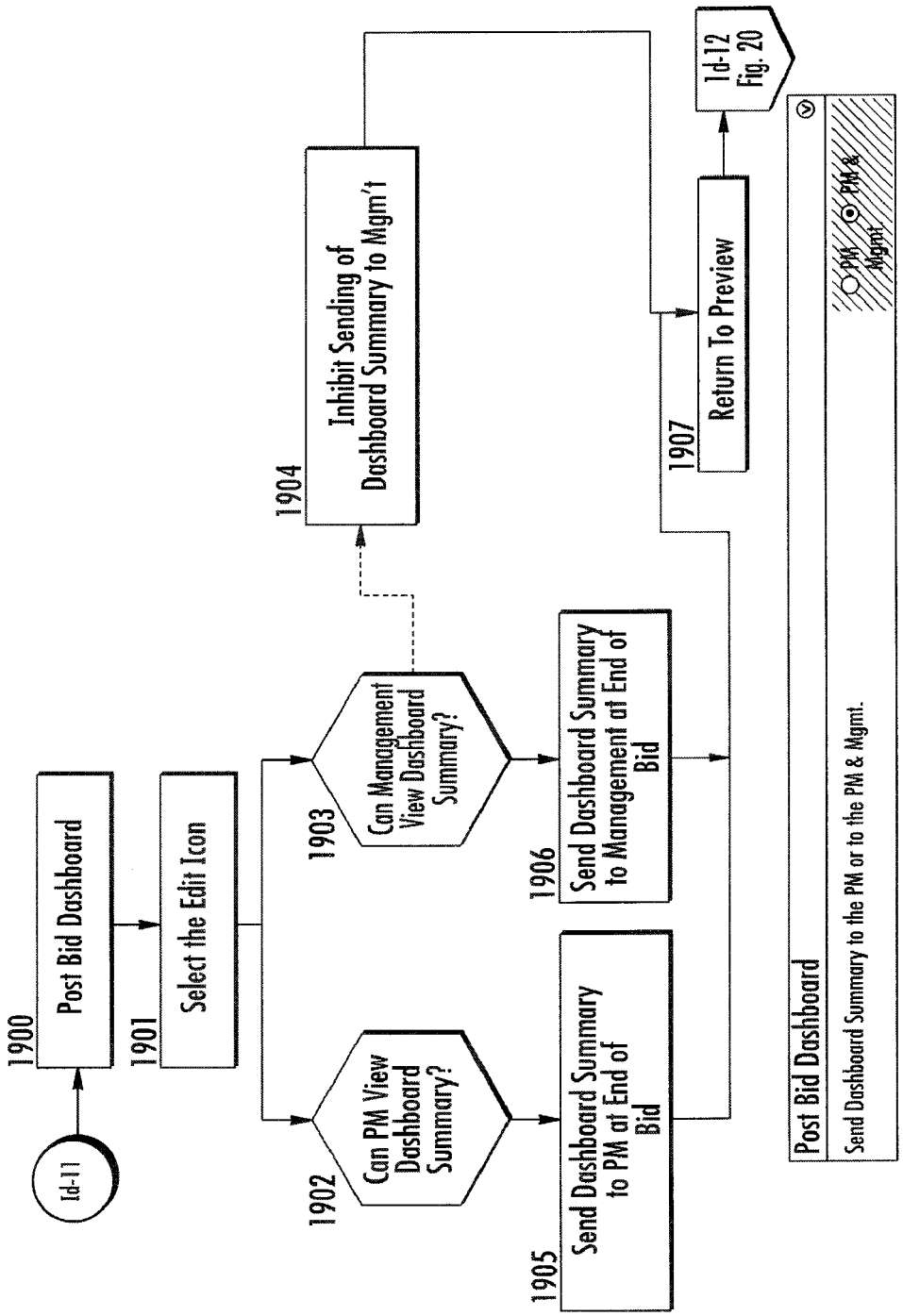

FIG. 19 depicts the sequence of designating who is authorized to view the dashboard summary that is sent out immediately after the Best & Final Offer bid due date and time. This is the POST BID DASHBOARD 1900 section. The User selects the EDIT ICON 1901 then has the option of two selections for receipt of the Dashboard Summary; 1) PM or 2) PM & Mgt as shown in the associated screen shot. If the User selects the PM 1902 it inhibits sending of the Dashboard Summary to MANAGEMENT 1904 and only the PM will receive the Dashboard Summary 1905. If the User selects PM & Mgmt, then both will receive the Dashboard Summary 1905 & 1906. The User will select the RETURN TO PREVIEW button 1907 to load the data into the template/project. The system now prompts the User to select what the contractors should see at the Bid Room at the end of the bid as shown in FIG. 20.

Figure 20:
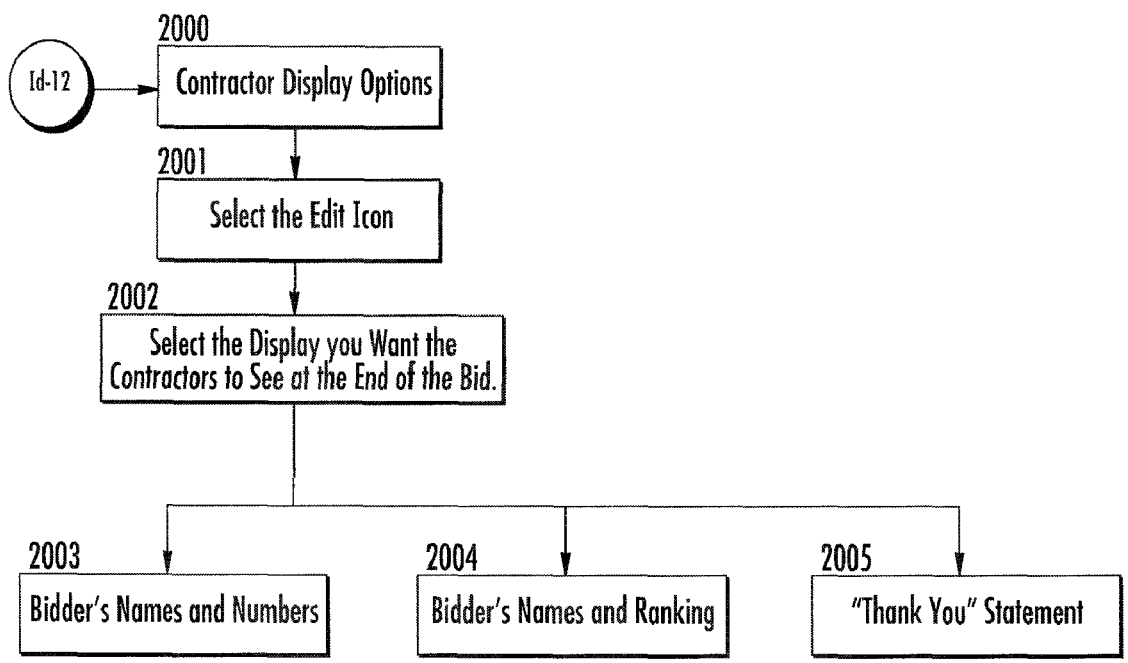

FIG. 20 provides the User with three CONTRACTOR DISPLAY OPTIONS [2000] the selection will be displayed at the contractors Bid Room at the end of the bid. The User selects the EDIT ICON 2001 and then has the option to select BIDDERS NAMES AND NUMBERS 2003, BIDDERS NAMES AND RANKING 2004 or "THANK YOU FOR PARTICIPATING IN THIS BID, THE OWNER WILL BE IN CONTACT WITH YOU SOON" 2005. The User then selects the RETURN TO PREVIEW button 2006 to load the data. The User is then prompted to develop their Cost Breakdown Sheet, if creating a template, and to edit the Cost Breakdown Sheet if creating a project as shown in FIG. 21.

Figure 21:
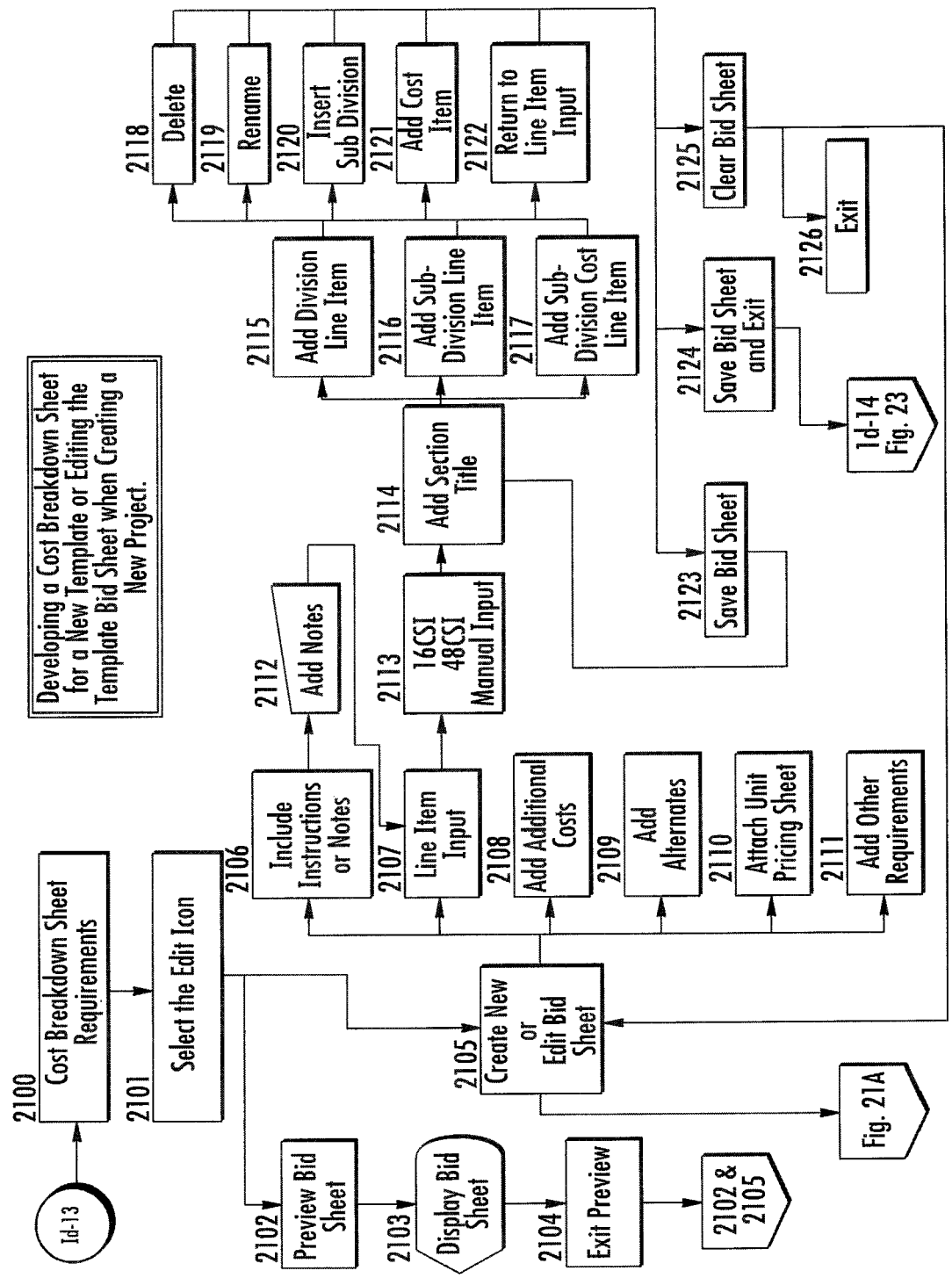
Figure 23:
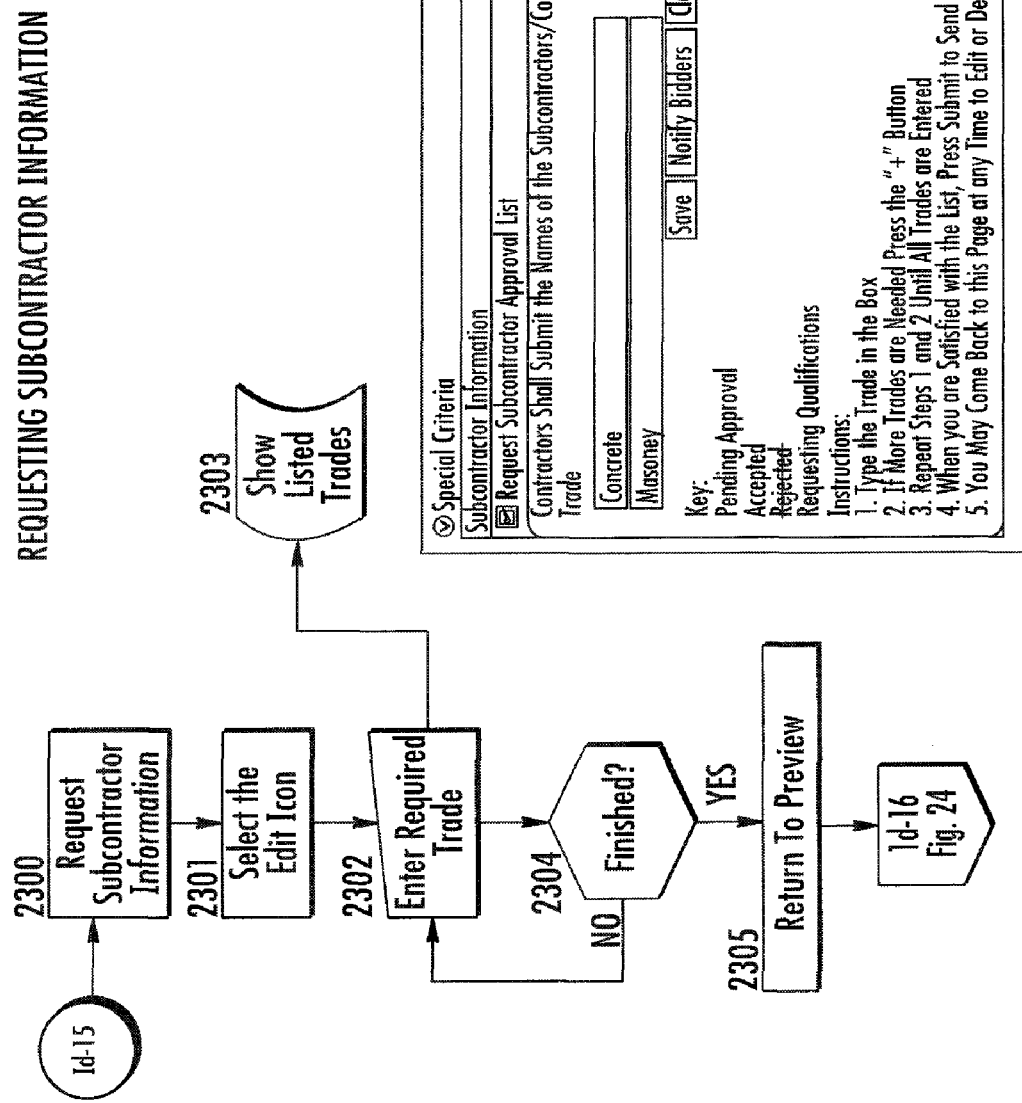

FIG. 21 shows a flow chart depicting the User developing a cost breakdown sheet for a new template or editing an existing template bid sheet when creating a new project. This section is named COST BREAKDOWN SHEET REQUIREMENTS 2100. The User selects the EDIT ICON 2101 then has the choice of PREVIEWING 2102 the bid sheet or CREATING A NEW or EDITING AN EXISTING BID SHEET 2105. If the PREVIEW BID SHEET 2102 is selected, the system DISPLAYS THE BID SHEET 2103. The User then selects the EXIT PREVIEW 2104 button and is returned to the template to either continue working with the COST BREAKDOWN SHEET REQUIREMENTS 2100 or the Supporting Documents section as seen in FIG. 23. If the User selects the CREATE NEW or EDIT BID SHEET option 2105 the system displays the Cost Breakdown Sheet development/edit page as shown in FIG. 21A and provides the User with the following input options:

INCLUDE INSTRUCTIONS OR NOTES 2106 at the top of the bid sheet. The User will type in any special instructions or notes as needed and click the ADD NOTES 2112 button. The User then can continue with the development of the Cost Breakdown Sheet 2107 thru 2111.

LINE ITEM INPUT 2113 is a sophisticated process that allows the User to select the method of inputting line items into the Cost Breakdown Sheet. Selection which can be 16CSI, 48CSI or MANUAL INPUT 2113. Selecting either the 16CSI or 48CSI provides the User with a drill down pick list from which he can quickly and efficiently insert line items into the bid sheet. The first step is to ADD A SECTION TITLE 2114 for example Site Work or Building. Next the User will add the line item as a DIVISION TITLE 2115 such as concrete or masonry, as a SUB DIVISION LINE ITEM 2116, or as a SUB DIVISION COST ITEM 2117 such as sidewalk or curbing.

Line items that have been entered into the bid sheet can be edited by clicking on the line item. A tabular menu appears allowing the User to DELETE 2118, RENAME 2119, INSERT A SUB DIVISION 2120, ADD A COST ITEM 2121, or RETURN TO LINE ITEM INPUT 2122. At any time during the bid sheet development/edit, the User has the option to SAVE THE BID SHEET 2123 and continue working, SAVE THE BID SHEET AND EXIT 2124, or CLEAR THE BID SHEET 2125 and return to EDIT THE BID SHEET 2105. Saving the Bid Sheet and Exiting will prompt the User to upload and attach any supporting documents that may be required in support of the project and needed for the bidders to view or print as seen on FIG. 23.

Figure 22:
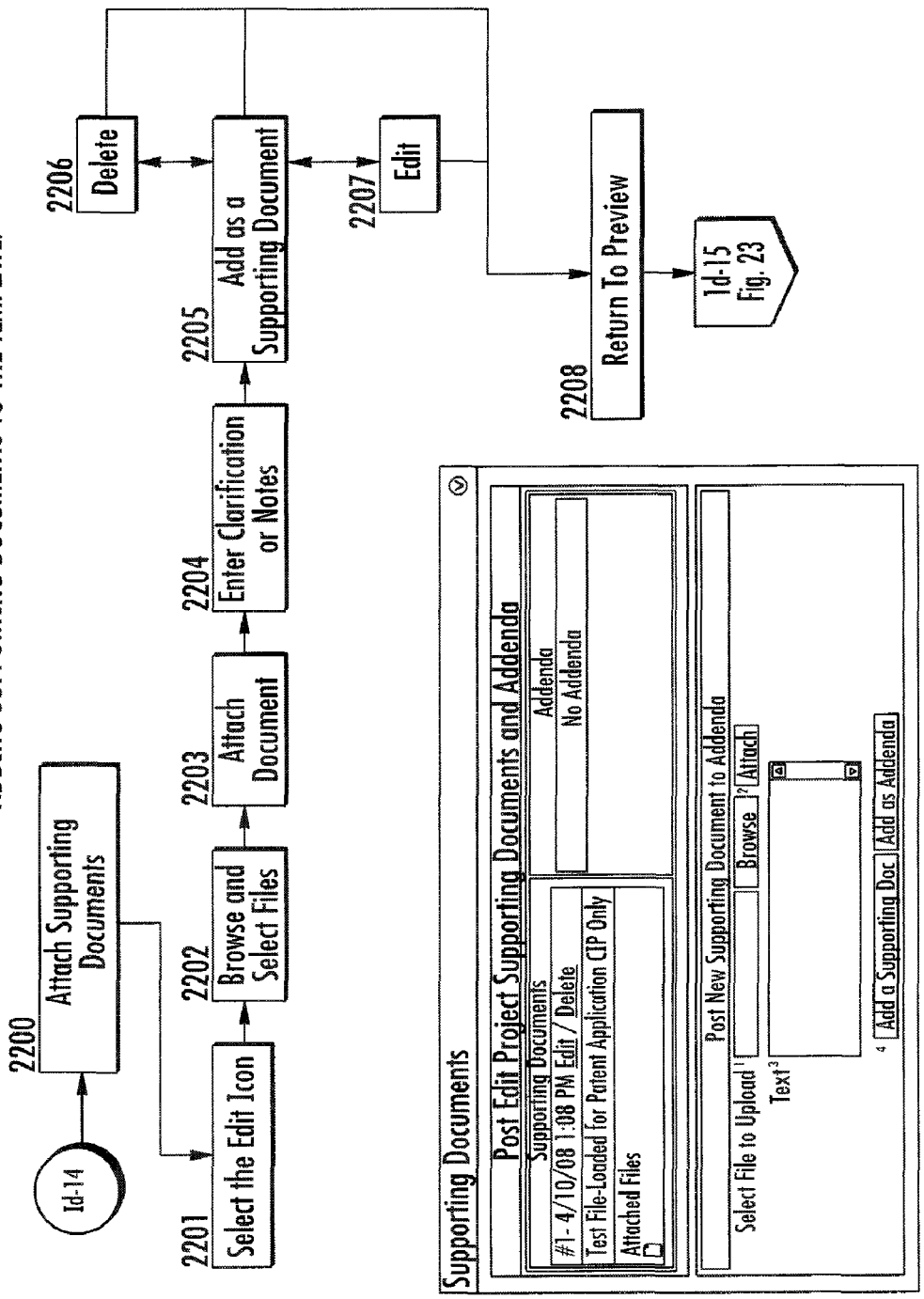

FIG. 22 allows the User to ATTACH SUPPORTING DOCUMENTS 2200 to the template or new project. The User selects the EDIT ICON 2201, selects the BROWSE AND SELECT FILES button 2202, clicks on the ATTACH DOCUMENT button 2203, ENTERS CLARIFICATION or NOTES 2204 and then clicks on the ADD AS SUPPORTING DOCUMENT button 2205. The User can DELETE 2206 or EDIT 2207 all supporting documents that have been attached to the template or to the new project. The User selects the RETURN TO PREVIEW button 2208 to load the data into the template or new project. A screen shot shows this functionality. The system prompts the User to complete the Subcontractor Information section of the template or new project as shown in FIG. 23.

FIG. 23 allows the User to REQUEST SUBCONTRACTOR INFORMATION 2300. This information is generally requested to find out who the general contractor intends on receiving bids from. The Owner User can then screen those subcontractors that he does not want to receive bids from. The User selects the EDIT ICON 2301, ENTERS THE REQUIRED TRADE 2302, CLICKS THE + BUTTON 2304 if another trade needs to be listed and when finished selects the RETURN TO PREVIEW button 2305. When the User enters the different trades, they are DISPLAYED 2303 in the order they were entered. The data is loaded into the template/new project. A screen shot is provided showing the actual functionality. The User is now prompted to enter the project budget as shown on FIG. 24.

Figure 24:
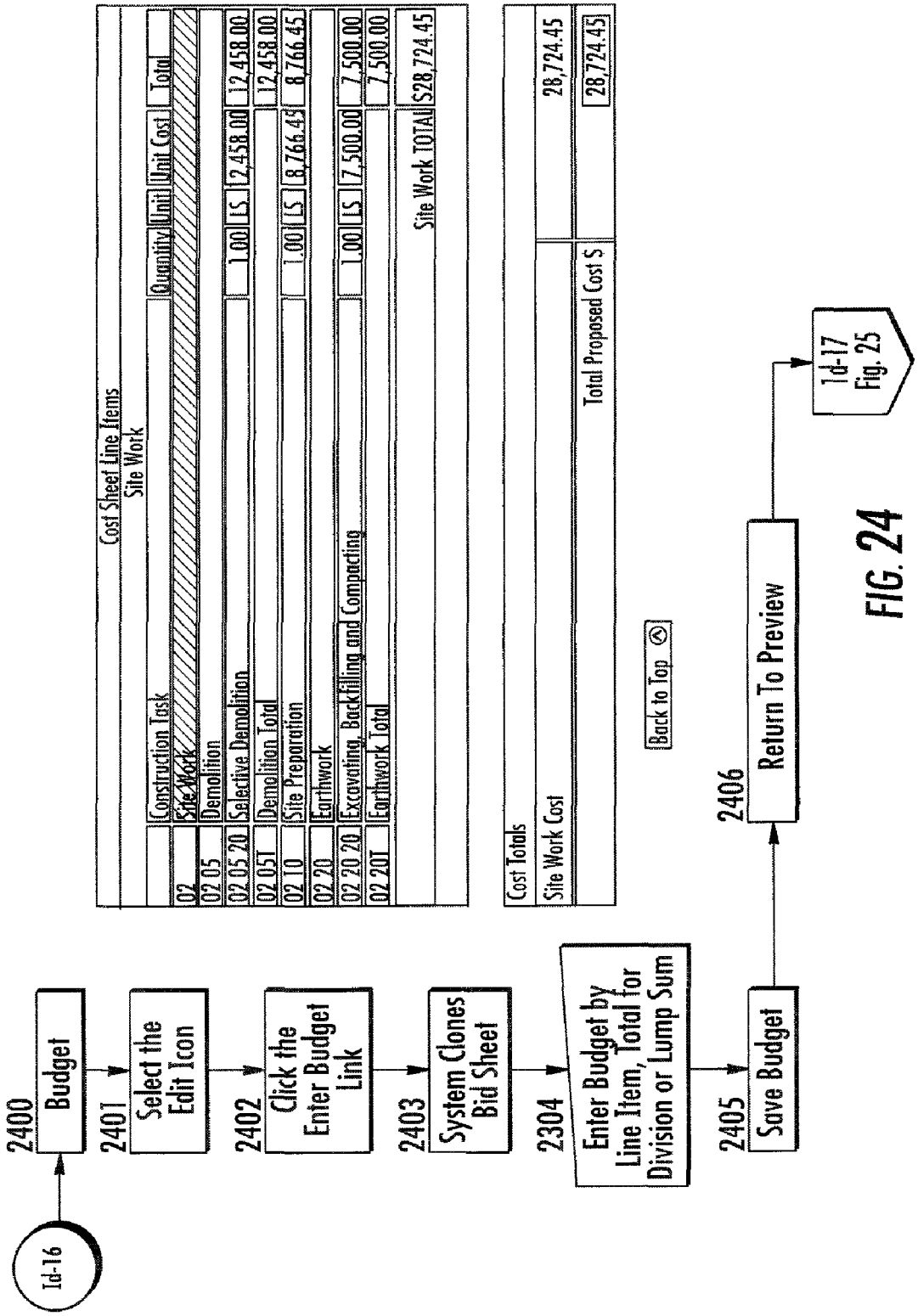

FIG. 24 provides a flow chart depicting the User entering the BUDGET 2400. The User selects the EDIT ICON 2401, selects the ENTER BUDGET link 2402 and the system CLONES THE BID SHEET 2403 previously created as shown in FIG. 21A. The User then ENTERS THE BUDGET 2404 by individual line item, with a total for each Division, or enters one lump number anywhere in the bid sheet representing the budget total. When the User has completed the entry of the budget items he clicks the SAVE BUDGET button 2405 and then selects the RETURN TO PREVIEW button 2406 to load the data into the template/new project. The system now prompts the User to save the template as shown in FIG. 25.

Figure 25:
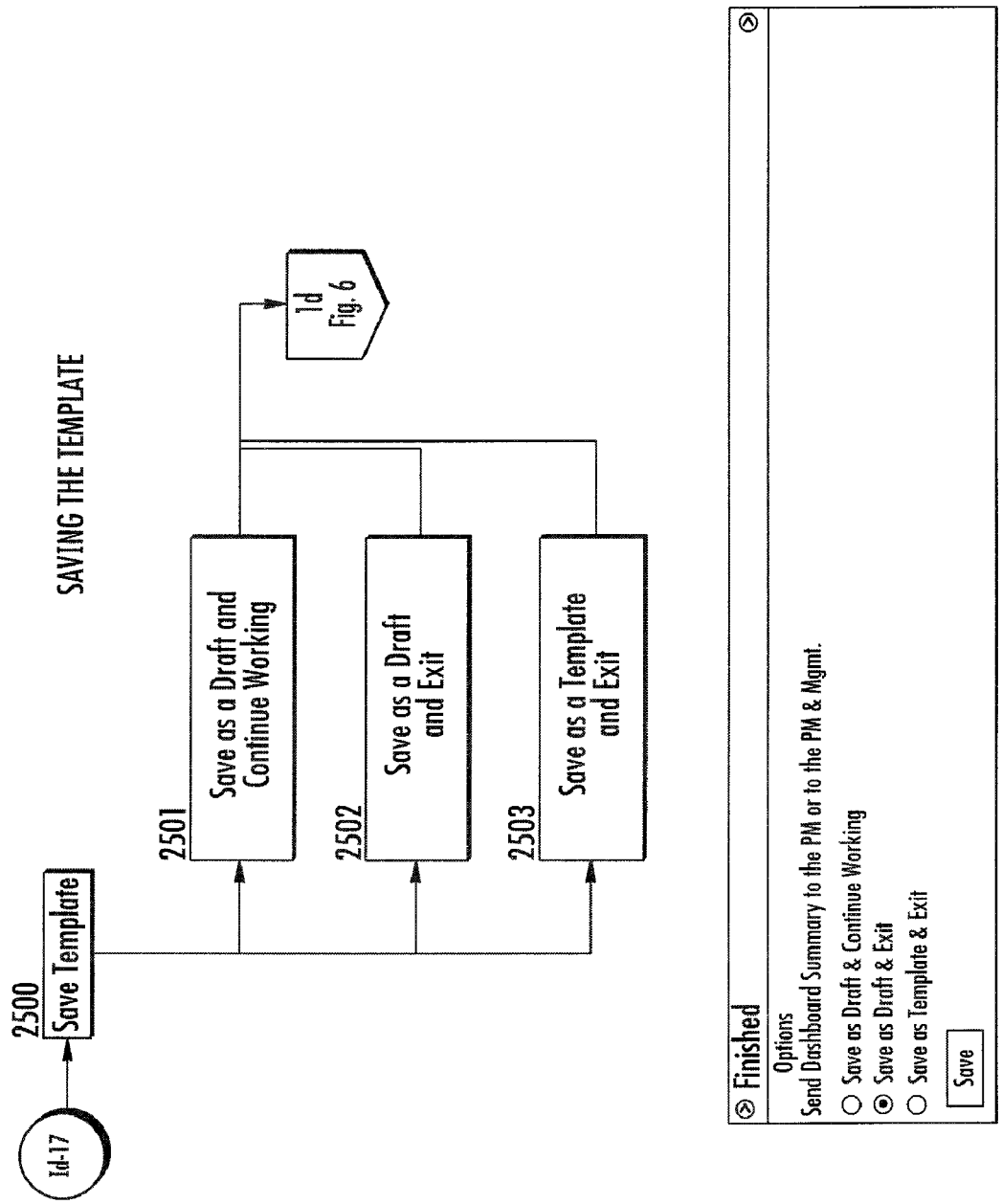

FIG. 25 shows the process for SAVING THE TEMPLATE 2500. The save process for a new project provides different options. When saving the template the User has the option to SAVE AS A DRAFT AND CONTINUE WORKING 2501, SAVE AS A DRAFT AND EXIT 2502 or SAVE AS A TEMPLATE AND EXIT 2503. A screen shot of the actual User functionality is provided with this figure. If the User selects SAVE AS A TEMPLATE AND EXIT 2503 the template is posted to the template library and can be accessed at the portal home page menu. When a project manager creates a new project he will select the desired template, edit it to make it project specific, and then send out the invitations to bid. The User is directed to the portal home page.

Figure 26:
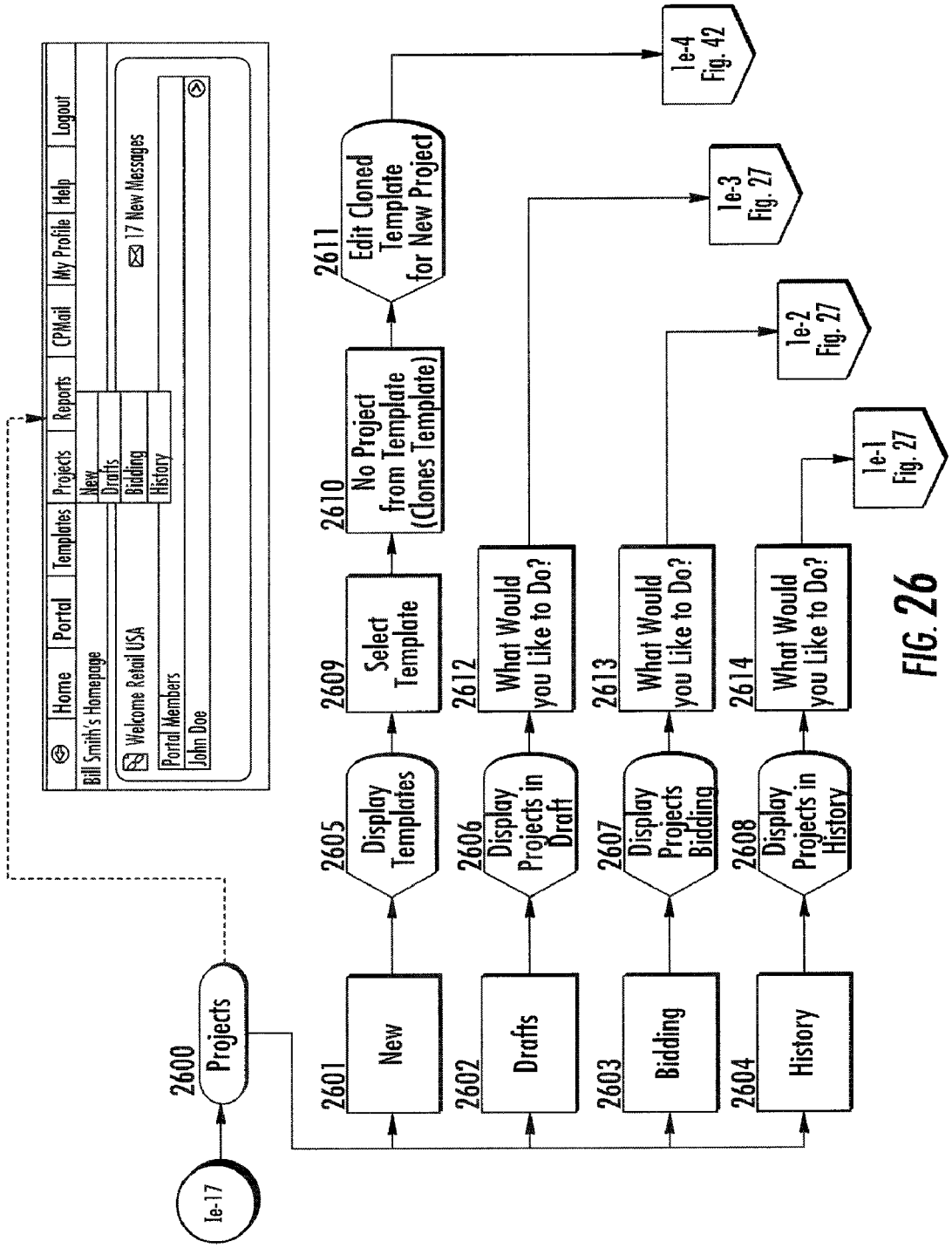
Figure 42:
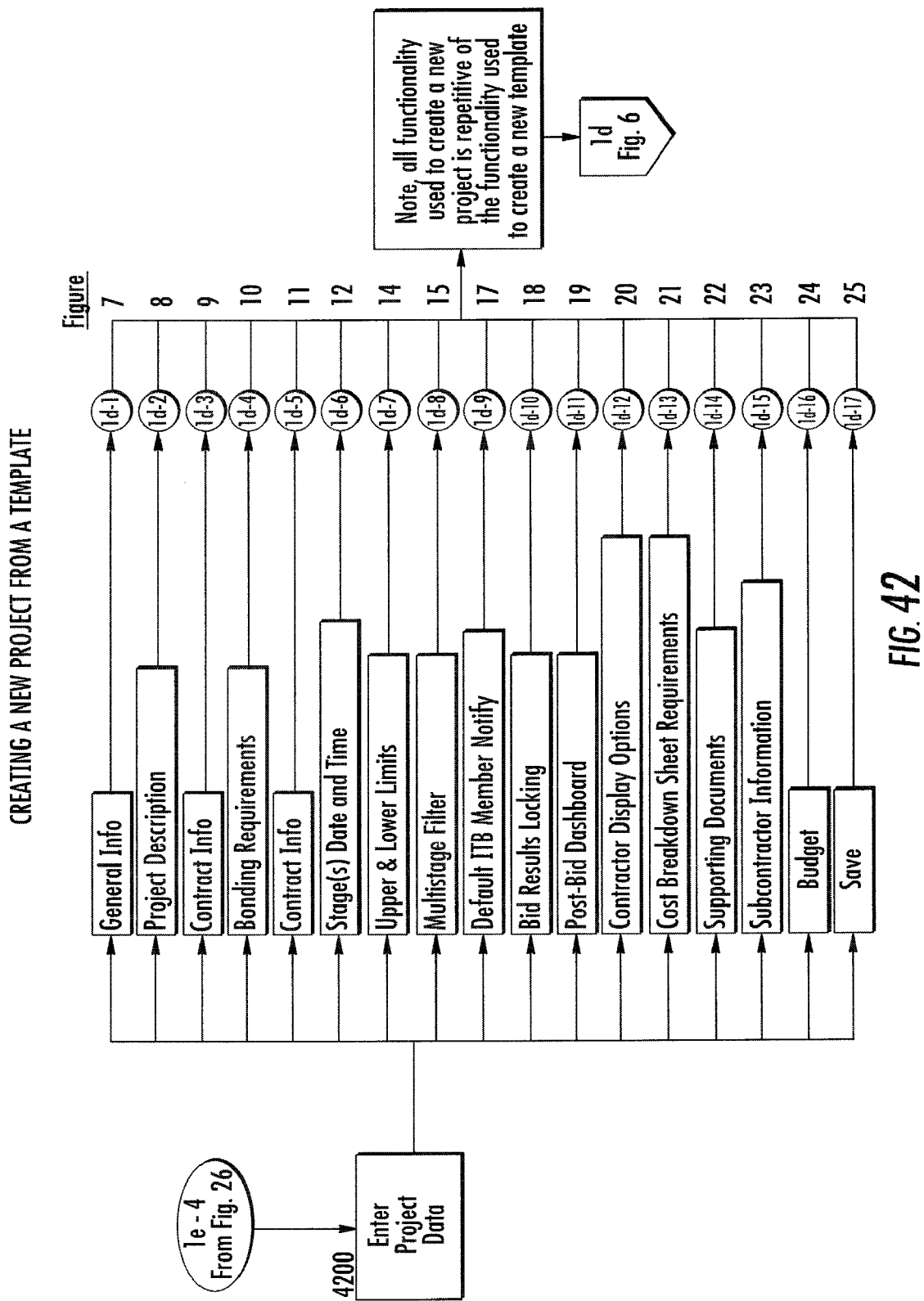

FIG. 26 brings us back to the corporate portal home page where we will discuss the Corporate Portal Manager working with his personal PROJECTS 2600. When the User places his cursor over PROJECTS 2600 at the main menu, a drop down displays four selections; 1) NEW 2601, 2) DRAFTS 2602, 3) BIDDING 2603, and 4) HISTORY 2604. Selecting NEW 2601 DISPLAYS TEMPLATES 2605 located in the portal library. The User then SELECTS THE TEMPLATE 2609 of choice and selects NEW PROJECT FROM TEMPLATE 2610. The system then CLONES THE TEMPLATE 2611 and the User can now create a new project as seen in FIG. 42. If DRAFTS 2602 is selected, all projects in DRAFT ARE DISPLAYED 2606 and the User is provided with a "What would you like to do?" 2612 drop down list with further selections as seen in le—3 FIG. 27. If BIDDING 2603 is selected, all projects that are currently bidding are DISPLAYED 2607 and is provided with a "What would you like to do?" 2613 drop down list with further selections as seen in le—2 FIG. 27. If HISTORY 2604 is selected all projects that have bid are DISPLAYED 2608 and the User is provided with a "What would you like to do?" 2614 drop down list as can be seen in FIG. 27.

Figure 27:

FIG. 27 shows screen shots for the functions made available to the User under three different conditions. Once a project has bid it is stored in the history folder. Project information can be accessed for an unlimited time. The "What would you like to do?" functionality for projects in HISTORY 2700 allow the User to enter a budget if he wants to compare the budget to the submitted bids. The User can view bidder registration information to include registration information and the dates and times they viewed supporting documents and addenda. The history of Requests for Information can be viewed and a printable view is provided. The User can view the entire set of plans and specifications for the project and all of the supporting documents and addenda that were posted to the project. If the User wants to create a new project that was similar to the one in history, they have the option to Clone the project, rename it, and put it out for bid. All reports are made available by selecting the View Reports item. The complete details of the project can be viewed by selecting View Details. If the User needs to reassign a project in history they will select Reassign Project. If the User wants to manage change order he would select the Manage Change Order function.

Projects in DRAFT 2701 are also provided with a "What would you like to do?" drop down list. The difference in the selections from the HISTORY 2700 drop down is a few other options to include the capability to View/Edit the project, Edit the Bid Sheet, Add Alternates to the Bid Sheet, and Upload Plans.

Projects that are BIDDING 2702 have a more robust drop down that includes, in addition to the similar Draft and History drop downs, Extend the Bid Date, Invite GCs to Bid, and Requesting a Subcontractor List.

Figure 28:
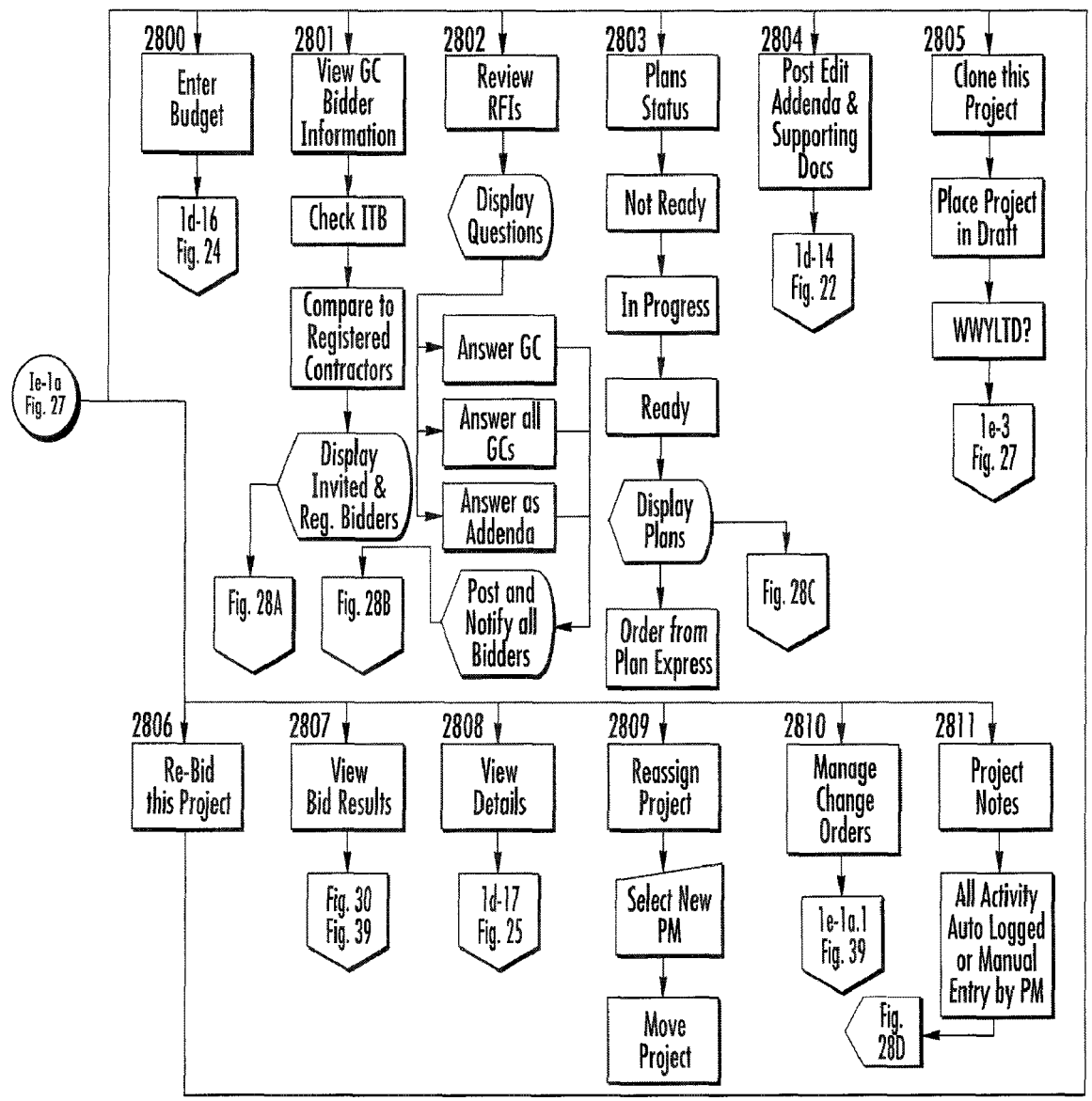

A flow chart is provided on FIG. 28 that shows the functionality of the Projects in History "What would you like to do?" drop down list.

FIG. 28 is the flow chart representing the Projects in History "What would you like to do?" drop down list. The options in the drop down include ENTER BUDGET 2800, VIEW GC BIDDER INFORMATION 2801, REVIEW RFI'S 2802, PLANS STATUS 2803, POST/EDIT SUPPORTING DOCUMENTS AND ADDENDA 2804, CLONE PROJECT 2805, RE-BID PROJECT 2806, VIEW BID RESULTS 2807, VIEW DETAILS 2808, REASSIGN PROJECT 2809, MANAGE CHANGE ORDERS 2810, and PROJECT NOTES 2811. The output of the View Bid Results is seen in FIGS. 29 thru 38.

Figure 29:
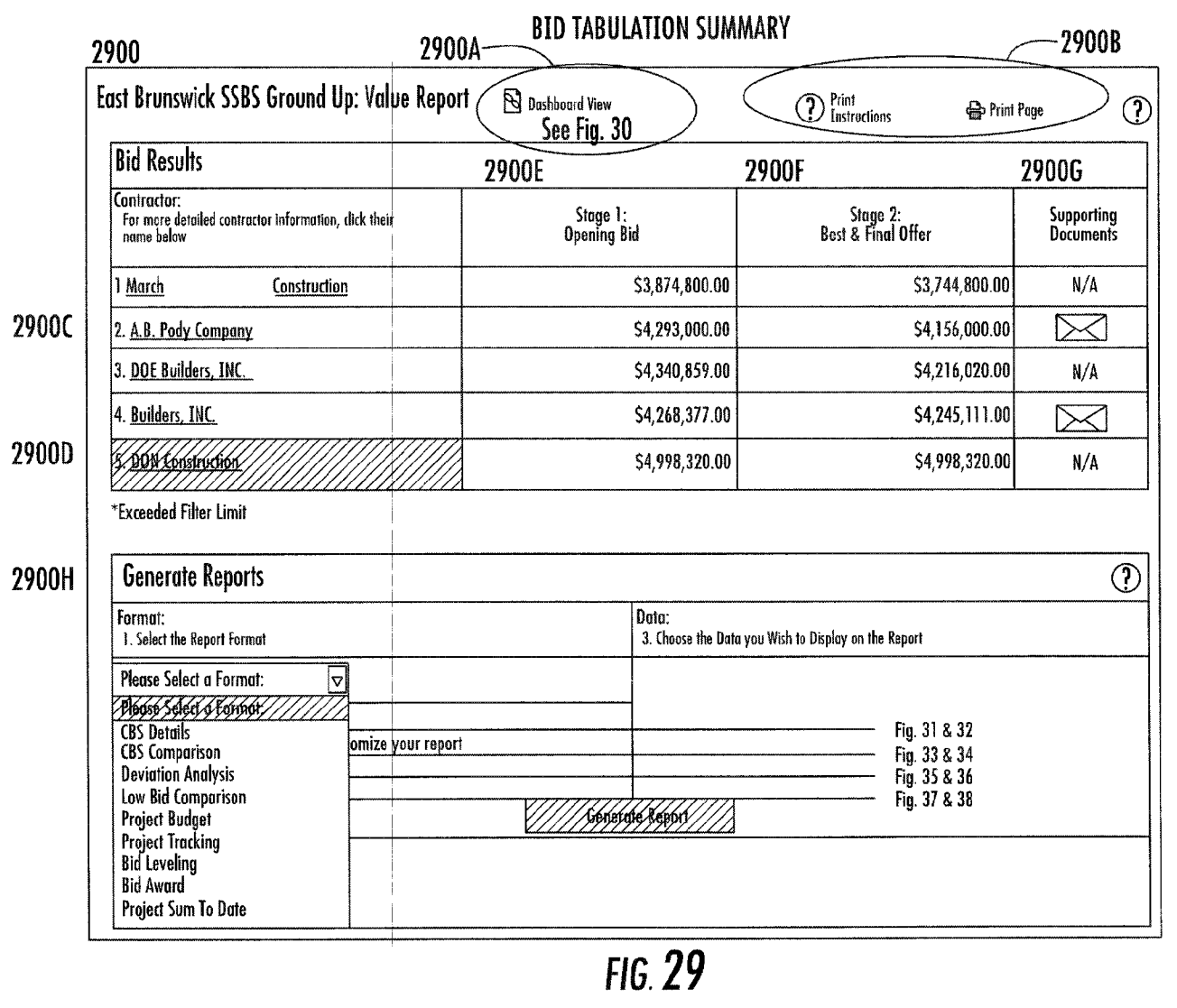

FIG. 29 is a screen shot of the BID TABULATION SUMMARY 2900. This is the view that is presented when the User selects View Bid Results from the "What would you like to do?" drop down list associated with projects in History. The BID TABULATION SUMMARY 2900 is an interactive screen that allows the User to perform many functions. Note this shows a Multistage Bid with bid filters set in place. Functions include:

2900A—DASHBOARD VIEW 2900A—Clicking on the Dashboard View will provide the User with an interactive dashboard as shown on FIG. 30. This dashboard is also sent to the User's email address immediately at the end of every bid. The dashboard functionality will be discussed in detail on FIG. 30.

2900B—PRINT PAGE 2900B—Allows the User to print the Bid Tabulation Summary Page. Instructions are provide for Printer Setup by clicking on Print Instructions. Clicking on the question mark will activate an on-demand tutorial of that section.

2900C CONTRACTOR NAMES 2900C—The Company names of the bidders is presented from the lowest bid (1) to the highest bid (5). Clicking on any of the contactor's names will open their registration page for viewing.

900D—DISQUALIFIED CONTRACTOR 2900D—When bid filters are set in place and a contractor's bid is outside the filter limits, they are disqualified from participating in the Best & Final offer. Their Opening Bid is provided to the User for information purposes only. Note the disqualified bidder is highlighted in a light red transparent color.

2900E & 2900F—shows the OPENING BID 2900E results with the low bid displayed in red, circled on the screen shot. The BEST & FINAL OFFER 2900F shows the results of the submitted bids with the low bid again shown in red and circled on the screen shot. Note the cost reduction between the Opening Bid and the Best & Final Offer from $3,874,800 and $3,744,800 a savings of $130,000.00 using multistage bidding.

2900G—If a bidder submits SUPPORTING DOCUMENTS 2900G a yellow envelope is displayed to the right of their Best & Final Offer bid. Clicking on the envelope will open the document for viewing or printing.

2900H—The GENERATE REPORTS 2900H section provides the User with nine (9) different choices that are explained at the listed and associated figures.

FIG. 30 The DASHBOARD SUMMARY 3000 is a representation of the submitted bids for a 2 Stage Multistage Bid. It is an interactive dashboard providing a multitude of reports and information. This dashboard is sent to the project manager and corporate portal management. The Dashboard Summary is divided into 10 sections:

1. 3001—The PROJECT INFORMATION section 3001 shows the Project Name, Project ID, Bid Date, and Project Manager Contact Information.

2. 3002—The BAR GRAPH 3002 shows two bars for each bidder. The first bar represents the Contractor's Opening Bid and the second represents the Best & Final Offer. Placing your cursor over any of the bars will identify the bidder with a pop-up displaying his name and total bid amount. Clicking on any of the bars will open and display the bidder's Cost Breakdown Sheet (CBS) for viewing, printing, or exporting. The bar graph shows each bidder's Opening Bid in red and their Best & Final Offer in blue. Disqualified bidders are shown with a translucent red bar, in this case above Donnell Construction. The budget is also shown along side all bidders for ease of comparison.

3. 3003—The CONTRACTOR COMPARISON REPORT 3003 icon can be selected to view a side-by-side comparison of all contractors and their line item costs compared to each other and the budget.

4. 3004—Clicking on a CONTRACTOR'S NAME 3004 opens the contractor's registration page where the User can view company history and contact information.

5. 3005—This section displays the cost totals for each contractor relative to the number of stages bid, in this case 2 Stages the OPENING BID and BEST & FINAL OFFER 3005.

6. 3006—DOCUMENTS VIEWED 3006 alerts the User to how many supporting documents the bidder viewed in comparison to how many were posted by the User.

7. 3007—SUPPORTING DOCUMENTS 3007 shows how many supporting documents the bidder uploaded with the bid submittal. Clicking on the yellow envelope will allow for the document(s) to be viewed or printed.

8. 3008—provides a BID SHEET ANALYSIS in three separate areas:
   A. 25%> The Mean—There is a numbered bar that represents each contractor. Placing your cursor over a bar will show you how many line items the bidder submitted that were 25% greater than the mean. Clicking on a bar will extract the line items out of the bid sheet and display them with the associated proposed cost per line item.
   B. 25%< The Mean—Clicking on any of the bars will extract these line items out of the subject bidders bid sheet and display them with their associated line item costs.
   C. Blank Line Items—Clicking on any of the bars will extract all of blank line items that do not include a dollar amount.

9. 3009—The DOWNWARD PRICING 3009 or cost reduction graph shows the low bid submitted in the Opening Bid stage and the low bid that was submitted in the Best & Final Offer. It also displays the cost reduction amount in dollars and in percent.

10. 3010—The BIDDER STATS 3010 shows how many bidders were invited, how many registered to bid, how many actually bid, and how many were disqualified.

FIG. 31 shows the GENERATE REPORTS 3100 section of the Bid Tabulation Summary. The User selects CBS Details (Cost Breakdown Sheet Details) from the FORMAT section 3101. The User then has the option to select to view the Opening Bid or Best & Final Offer from the OPTIONS section 3102. The User can select to ALSO SHOW 3103 Square Foot Cost and/or Section Summaries of all cost items within the Cost Breakdown Sheet. From the DATA section 3104 the User selects the bidder and clicks the GENERATE REPORT button 3106. The report is then displayed as shown in FIG. 32. If the User levels a bid, the option is given to EMAIL THE LEVELED DASHBOARD 3105 to management.

FIG. 32 shows the COST BREAKDOWN SHEET (CBS) 3200 submitted by a bidder. All reports can be PRINTED 3201 or EXPORTED 3202 by selecting the appropriate icon link. The User can enter the square footage of the site or building into the appropriate section of the SQUARE FOOT COSTS section 3203 and the cost per square foot will be displayed to the far right of the section. The DETAILED BREAKDOWN 3204 of the Cost Breakdown Sheet is displayed to show any NOTES 3205 the bidder may have included, the QUANTITY 3206, UNIT OF MEASURE 3207, UNIT COSTS 3208, and the TOTAL COSTS 3209 per line item.

FIG. 33 shows the User selecting the CBS COMPARISON report. This report places the bidders side-by-side along with the Budget, if the Budget is populated and selected. The User also has the option to SHOW SECTION SUMMARIES and/or SHOW CONTRACTOR VARIANCE 3301. The Section Summaries displays the total cost per Section whereas the Show Contractor Variance shows the difference between any two selected bidders or comparing a selected bidder to the budget. The User selects the bidders to be compared as shown in the DATA 3302 section. The User then clicks the GENERATE REPORT button 3303 to generate the Comparison Report as shown in FIG. 34.

FIG. 34 is the COMBINED CONTRACTOR ANALYSIS 3400 also known as the CBS Comparison. This report places the contractors side-by-side so the User can view their line item cost and compare in an effort to select the lowest responsible bid.

FIG. 35 Shows the User selecting the DEVIATION ANALYSIS REPORT 3500. This report provides the User with the option to compare the selected bidder in Column A to THE MEAN OF BIDDERS IN COLUMN B or to THE BIDDER IN COLUMN B 3502. The User can also elect to SHOW HIGH RISK LINE ITEMS 3503 with a Warning Sign with a +/−percent deviation. The percentage can be typed in by the User. The system will then will process the bid sheet showing the deviation per line item and provide a warning sign at all line items that deviate from the mean more than the preset percentage. The User can also elect to SHOW SECTION SUMMARIES 3504 as discussed in FIG. 33.

FIG. 36 shows the selection of the DEVIATION ANALYSIS 3600 report. Line items in red indicate the bidder was lower than the mean by the listed dollar amount and those in gray indicate the amount the bidder was higher than the mean. Line items with a warning sign indicate the bidder exceeded the mean by an amount greater than the preset deviation percentage. This report is extremely helpful in selecting the lowest responsible bidder. It also plays a big part in reducing the number of change orders generated during the construction phase.

FIG. 37 shows selecting the LOW BID COMPARISON 3700 report. This report compares the selected bidders line item costs to the lowest line item bid submitted from all contractors. If the selected bidder is the low bidder for that line item it shows his name to the left of the line item, if not, it shows the name and number of the bidder that was low.

FIG. 38 is the LOW BID COMPARISON 3800 report. In addition to displaying the low bid and bidder's name for each line item cost, the report also show how many bidders participated in the bid and how many included a cost on said line item i.e. 1/3 indicates there was 1 of 3 bidders that proposed a cost for that line item. This report is another method of screening bidders to ensure the lowest responsible bid is selected.

Figure 39:
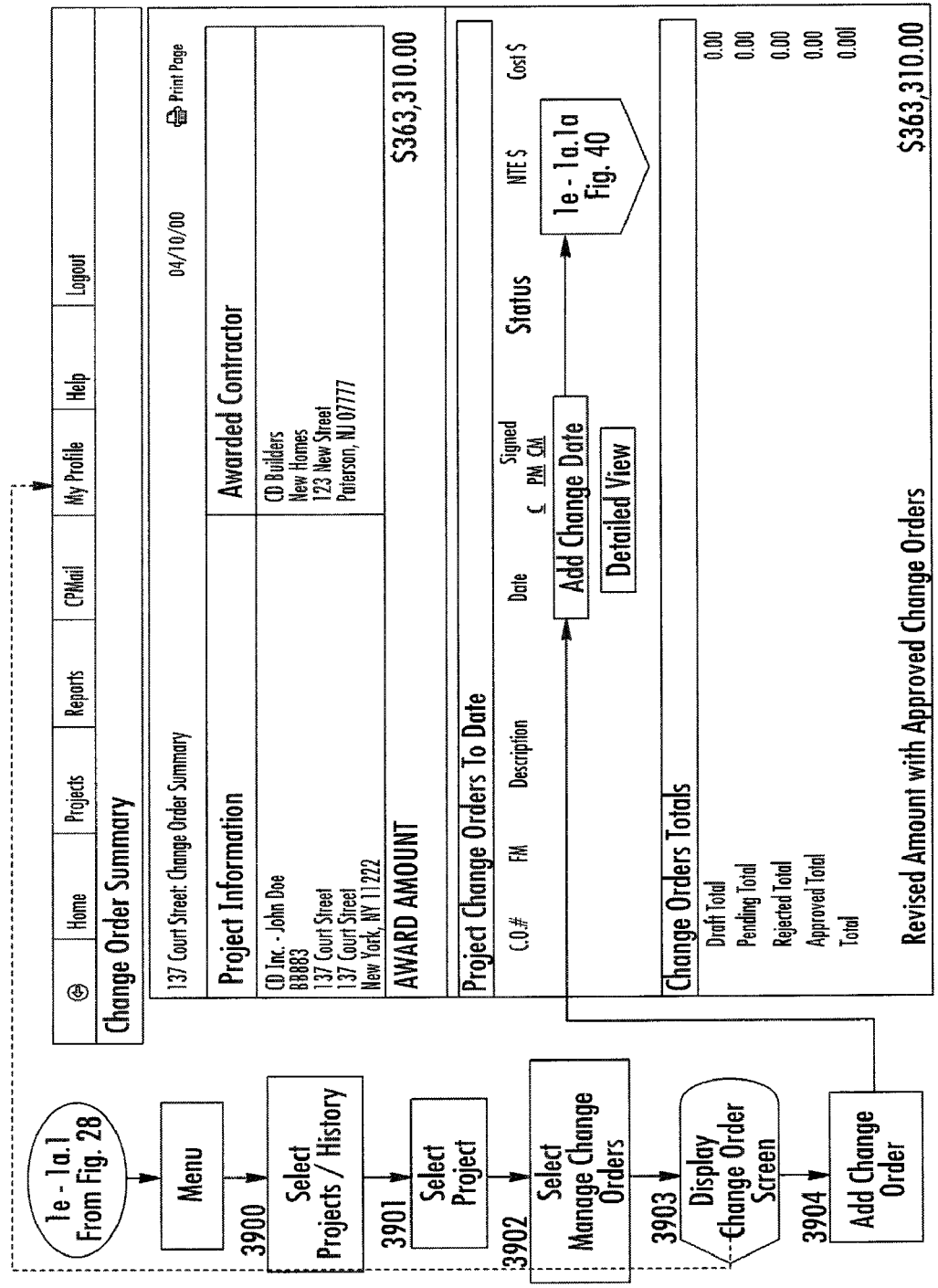

FIG. 39 shows a flow chart and screen shot for managing Change Orders at XYZBid. Once the project is awarded, the select contractor and User/project manager can collaborate during the change order process. As shown in FIG. 28 at the drop down menu, the User can select MANAGE CHANGE ORDERS 2810. When the User selects PROJECTS/HISTORY 3900 at the main menu, all projects in history are displayed. The User SELECTS THE PROJECT 3901 and then SELECTS MANAGE CHANGE ORDERS 3902 from the "What would you like to do?" drop down list. The CHANGE ORDER interactive format screen is then displayed 3903 which will allow the User to ADD A CHANGE ORDER 3904. The User selects the Add Change Order button and the Change Order Details Page is displayed as shown in FIG. 40.

Figure 40:
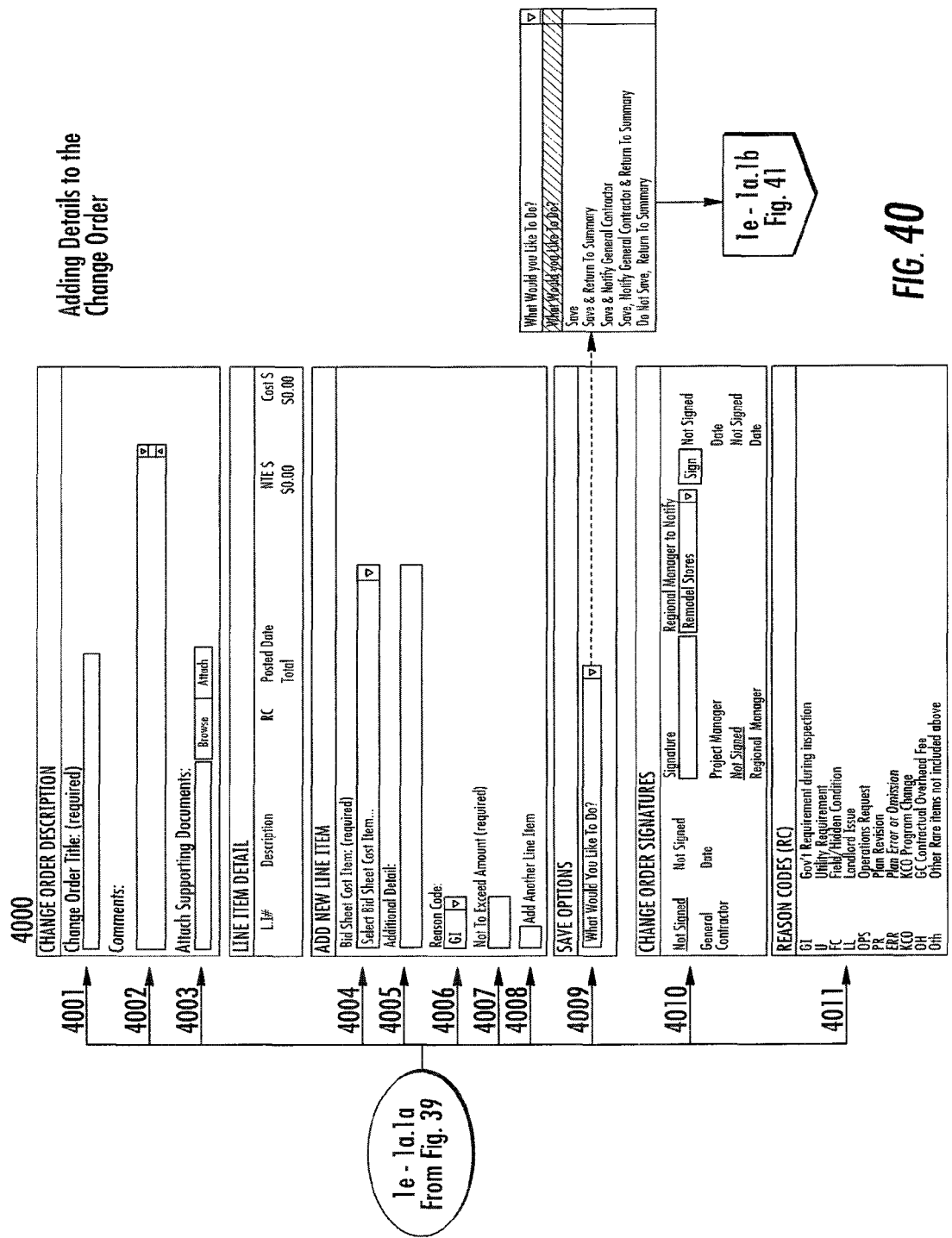

FIG. 40 shows a screen shot of the CHANGE ORDER DETAILS page 4000. The user follows the format from top to bottom to create the new Change Order. The first entry is the CHANGE ORDER TITLE 4001. This is a brief title that identifies the change order by name. The second entry is the COMMENTS section 4002. The User can enter any specifics as needed in this section. The User can then ATTACH SUPPORTING DOCUMENTS 4003 to support the change order. The ADD NEW LINE ITEM section 4004 provides a pick list from the bid sheet line items. The User selects the line item that the change order applies to. The selection is then posted to the ADDITIONAL DETAILS section 4005 where the User can add additional clarification. Next the User selects the REASON CODE 4006 that best describes why the change order was initiated. Descriptions of the Reason Codes are listed in the REASON CODES description section 4011. The User then enters a NOT TO EXCEED amount 4007 and in the case of a contractor initiating the Change Order, he would enter the proposed cost to complete the change order work. If an additional line item cost in support of the Change Order is needed, the User would select the +ADD ANOTHER LINE ITEM button 4008. The User can then select from the "What would you like to do?" 4009 drop down to either Save and continue working, Save and Return To Summary page, Save and Notify Contractor, Save Notify Contractor & Return to Summary, or Do Not Save—Return to Summary page. The User also has the option to sign the Change Order with a digital signature as seen in the CHANGE ORDER SIGNATURE section 4010. When finished and returning to the Change Order Summary page the User will see the screen shot as shown in FIG. 41.

FIG. 41 is a screen shot of the PROJECT CHANGE ORDER SUMMARY PAGE 4100. This summary page allows the User to very quickly view all PROJECT CHANGE ORDERS TO DATE 4101. Within this section the User can view the Change Order Number, who created the Change Order, in this case the PM, a short Description of the Change Order, the Date the Change Order was created, who has Signed the Change Order (Contractor, Project Manager, Construction Manger), the Status of the Change Order (Draft, Open, Pending, Approved, Rejected), the Not to Exceed Cost, and the Total Cost. The CHANGE ORDER TOTAL SECTION 4102 displays the cost totals for Change Orders in Draft, Pending, Rejected, and Approved. Also shown is the Revised Amount with Approved Change Orders and the Deviation from Awarded Amount in the form of a percentage.

FIG. 42 shows how the User creates NEW PROJECT FROM A TEMPLATE 4200. The sequence is the same as creating a project with the exception that when creating a new project from a template the User can invite bidders and a new 'What would you like to do?" drop down list is created with new functionality that applies to projects out for bid.

Figure 43:
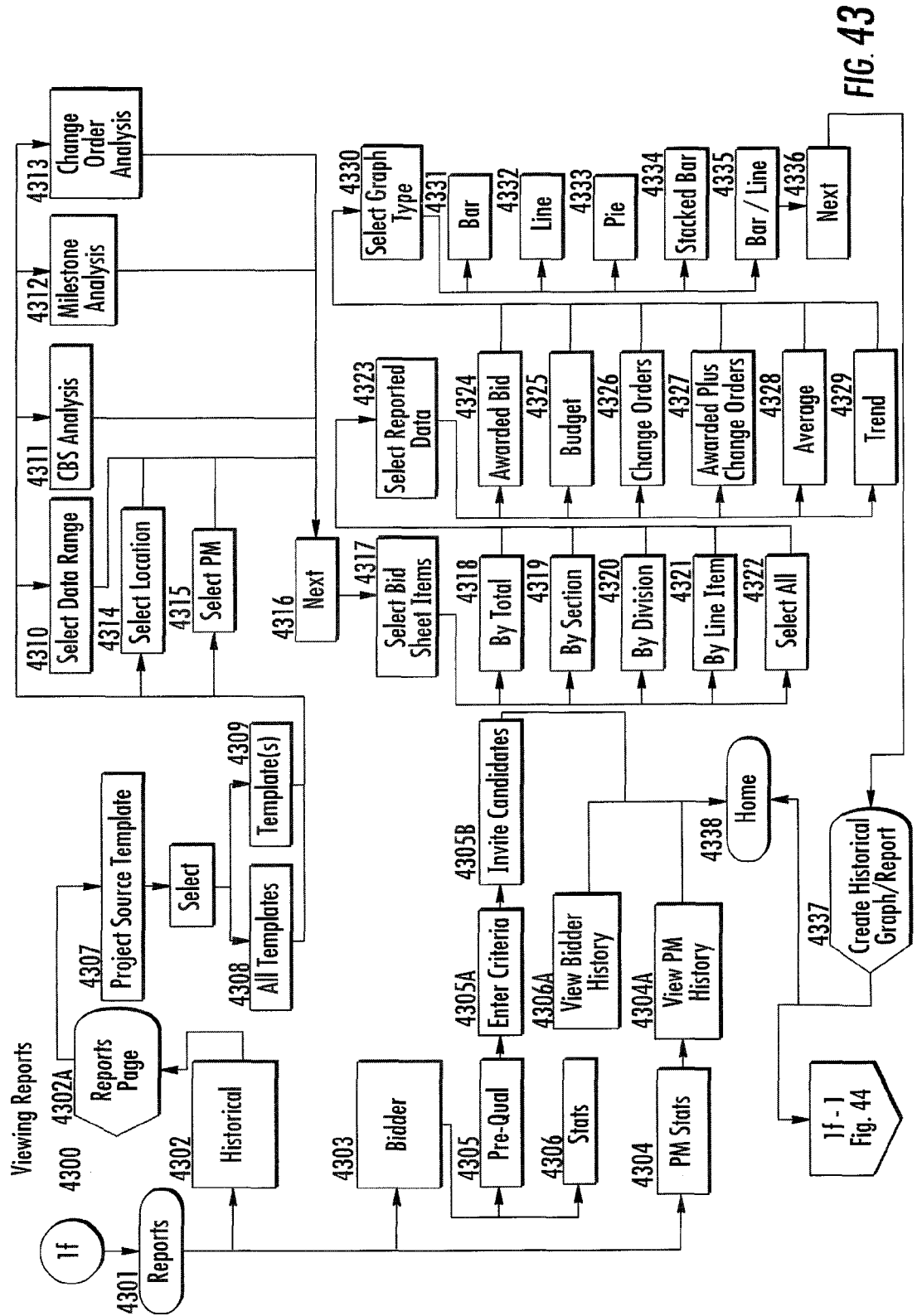

FIG. 43 shows the flow chart for VIEWING REPORTS 4300. This can be selected at the main menu as show in FIG. 3. When the User places the cursor over REPORTS 4301 at the main menu three selections are shown in dropdowns, 1) HISTORICAL 4302, 2) BIDDER 4303, and PM Stats 4304. Placing the cursor over Bidder will display PRE-QUAL 4305 and STATS 4306.

HISTORICAL 4302—Selecting Historical displays the REPORTS 4302A page where the User selects pertinent information for performing a desired analysis.

The first section of the Reports page is the PROJECT SOURCE TEMPLATE 4307. This section allows the User to select ALL TEMPLATES 4308 or a specific or group of TEMPLATE(s) 4309 that the report analysis will be taken from.

The User then has the option to select projects over a specific SELECTED DATE RANGE 4310, or select projects within a range of a SPECIFIC LOCATION 4314 such as Chicago with a zip code of 62002.

The User can also, as an option, select to perform:

A CBS ANALYSIS 4311 of select projects,

Perform a MILESTONE ANALYSIS 4312 that will provide details on all selected projects such as Project Name, ID, Location, Posted Date, Bid Due Date, RFIs, Addenda, Supporting Documents, Notes, Bid List, Drawings Posted Date, Revisions to Drawings Dates, and PM Contact Information.

Perform a CHANGE ORDER ANALYSIS 4313 over a select number or group of projects. The information provided includes Project ID, Project Name, Contract Award Date, Change Order Dollar Amounts referenced to the Reason Codes, Contract Sum to Date, and the percentage of the project costs that equates to a percentage.

The User can also, as an option, perform an analysis of select projects that are related to a specific SELECTED PM 4315. Once the PM is selected or any of the above options are selected, the User will select the NEXT 4316 button.

After selecting the NEXT button 4316 the User selects how the report should be displayed:

BY TOTAL 4318 will only provide the User with a number that represents the Cost Breakdown Sheet total for the selected template(s) and projects.

BY SECTION 4319 will provide the User with the totals from different sections of the Cost Breakdown Sheet (CBS) such as Site Work and Building totals.

BY DIVISION 4320 will provide the User with the totals from the selected divisions within the Cost Breakdown Sheet such as Concrete, Masonry, Steel, etc.

BY LINE ITEM 4321 will provide the User with the total for each line item selected in the Cost Breakdown Sheet.

SELECT ALL 4322 allows the User to select all Sections, Divisions, or Line Items the analysis will represent.

The next section is where the User can further customize the report. This is the SELECT REPORTED DATA section 4323. The User can choose to select bids that have been AWARDED 4324, analyze only the BUDGET 4325 for the selected projects, to analyze just CHANGE ORDERS 4326 over a select number of projects or analyze those with AWARDED PLUS CHANGE ORDERS 4327.

The User can analyze the AVERAGE 4328 or perform a TREND 4329 analysis of select division trades or line items.

Next is the SELECT THE GRAPH TYPE 4330 to be generated. The options include the simple BAR chart 4331, the LINE chart 4332, the PIE chart 4333, the STACKED BAR cart 4334, or the combination BAR & LINE chart. Only single projects can be used for the Pie chart.

Figure 44:
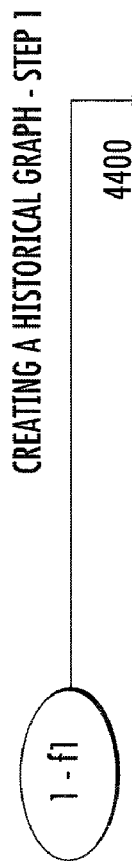
Figure 45:
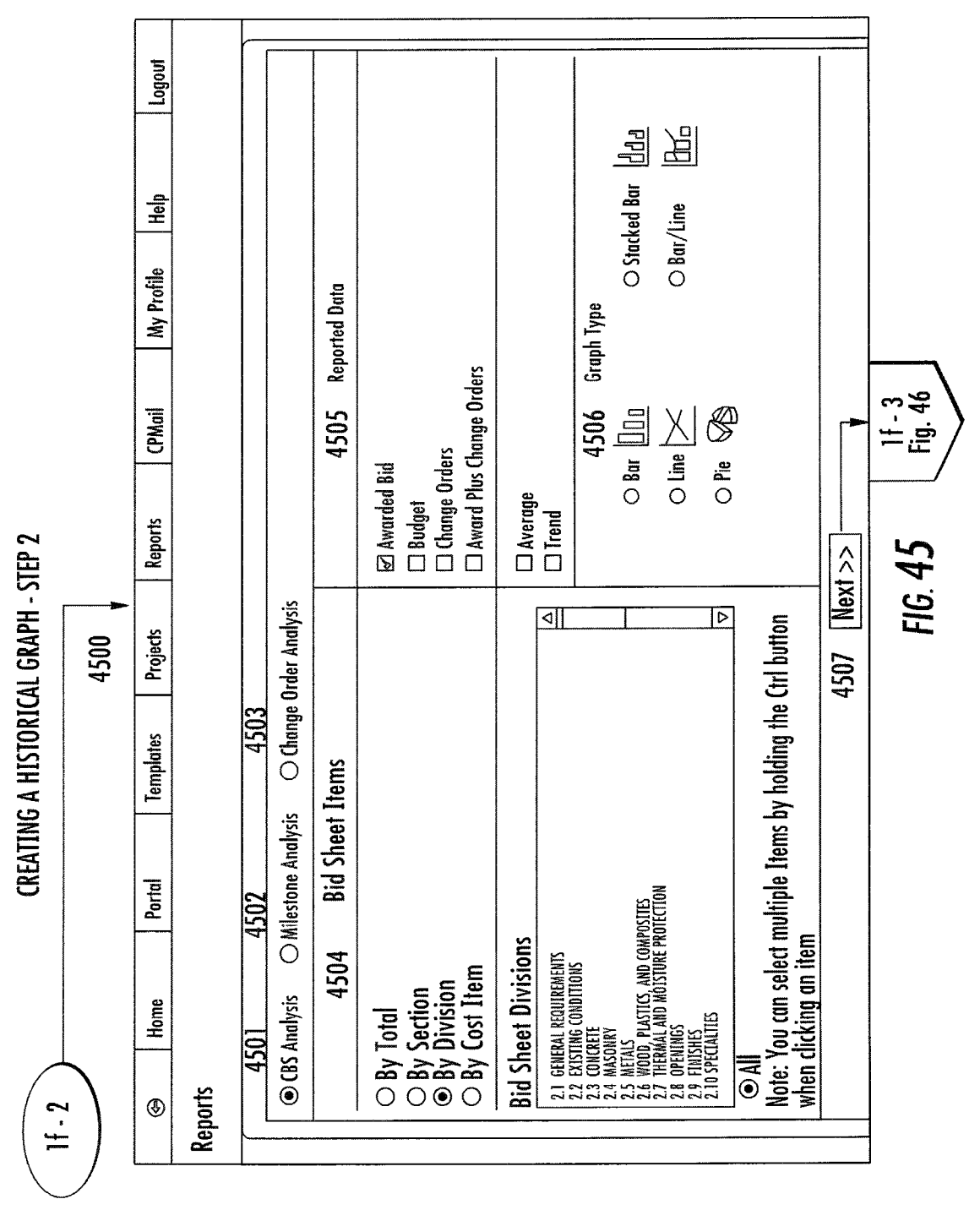
Figure 46:
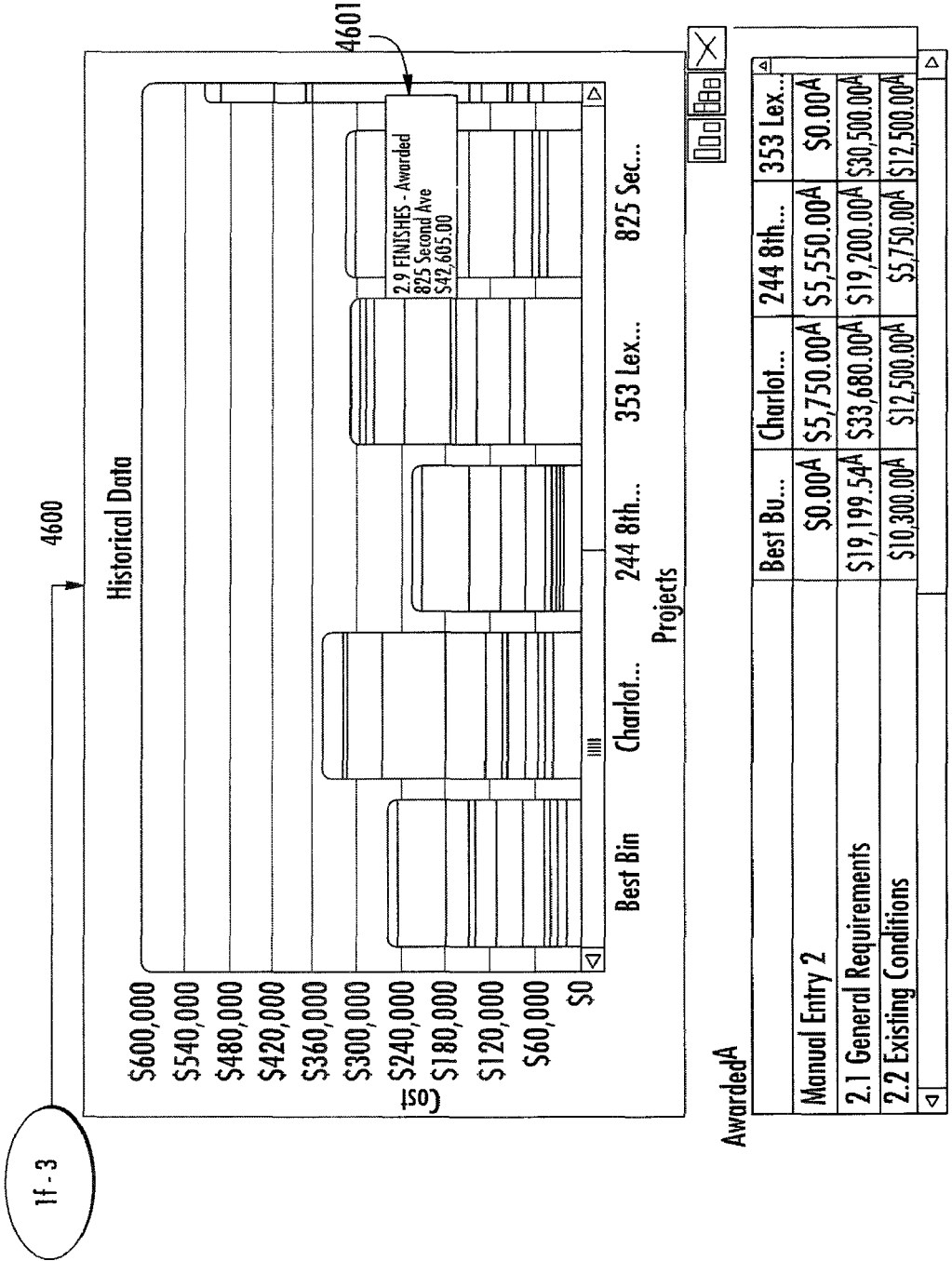

The User now selects the NEXT button 4336 and the system CREATS and DISPLAYS THE HISTORICAL GRAPH/REPORT 4337. An example of creating a Stacked Bar Chart is shown in FIGS. 44 through 46.

If the User selects BIDDER 4303 at the Reports section, two options are given, PRE-QUAL 4305 and STATS 4306:

Selecting the PRE-QUAL feature 4305 allows the User to ENTER CRITERIA 4305A into the Pre-Qual template. The User can also enter numerical weights for each question. The User then INVITES CANDIDATES 4305B and the candidates are notified via email. The candidates register, login to the system and complete the Pre-qual questions. When the qualification information is returned to the User the system ranks the bidders according to their scores.

Selecting the STATS 4306 option allows the User to view projects that the contractor has been invited to bid, is currently bidding, and projects that he has bid. The User can also warehouse information related to the contractor by selecting the edit icon.

FIG. 44 Shows the REPORTS MANAGEMENT PAGE 4400 where the User selects the PROJECT SOURCE TEMPLATE 4401, can query by DATE RANGE 4402OR LOCATION 4403 and select the PROJECT MANAGER(S) 4404 specific to the query. When the User clicks the NEXT 4405 button he is taken to the second page of the REPORTS MANAGEMENT SECTION 4500 as shown on FIG. 45.

FIG. 45 is where the User can perform a CBS ANALYSIS 4501, MILESTONE ANALYSIS 4502, or CHANGE ORDER ANALYSIS 4503 over a select group or range of projects. When the CBS ANALYSIS 4501 is selected, the User then selects the BID SHEET ITEMS 4504 options as discussed in FIG. 43. The REPORTED DATA 4505 is selected and the GRAPH TYPE 4506 chosen, the User clicks the NEXT 4507 button and the Stacked bar chart is displayed as shown in FIG. 46.

FIG. 46 is a screen shot showing the STACKED BAR CHART 4600. The bar chart is a representation of the Cost Breakdown Sheet line items for each project. The stacked bars represent individual projects with the colored segments representing a specific line item cost within the Cost Breakdown Sheet. When the User places the cursor over any of the stacked bar segments, a pop-up (as shown) appears that displays the line item name, project name, and the cost for that line item 4601. As per the screen shot, the trade division Finishes is shown.

Figure 47:
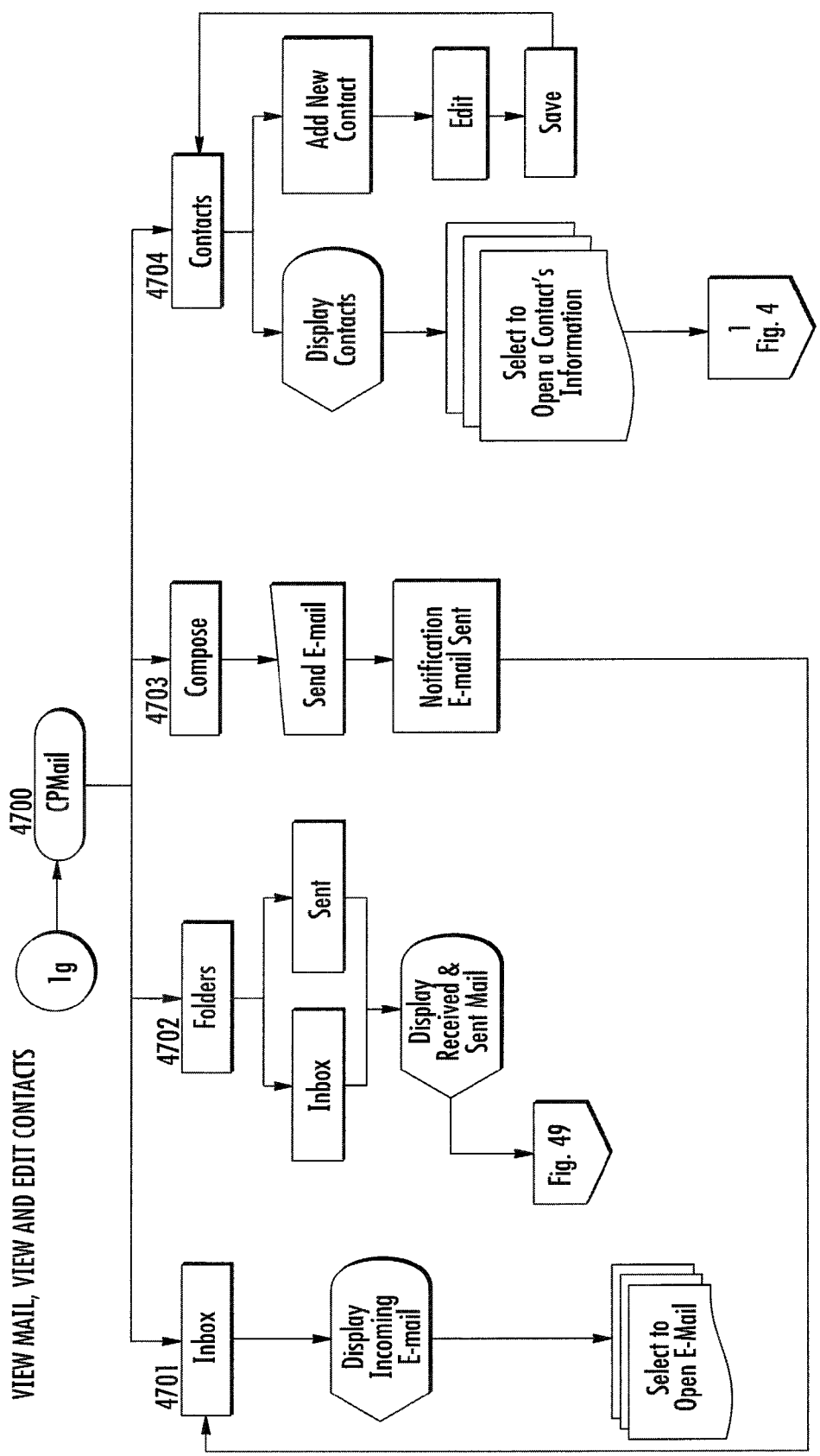

FIG. 47 At the Main Menu FIG. 4.1g, the User selects XYZMail. This system's email functionality is typical of most email systems with an INBOX 4701, FOLDERS section 4702, COMPOSE section 4703, and CONTACTS section 4704. Screen shots of the XYZMail sections are shown in FIGS. 48 thru 51.

FIG. 48 is a screen shot of the systems XYZMail Inbox 4800. Here incoming mail is sorted in chronological order. Mail that has not been opened has a yellow envelope placed beside the mail number. The Sender is shown in the column next to the mail Date. Next to the date is the Subject column. Clicking on any of the subjects will open the email.

Figure 49:
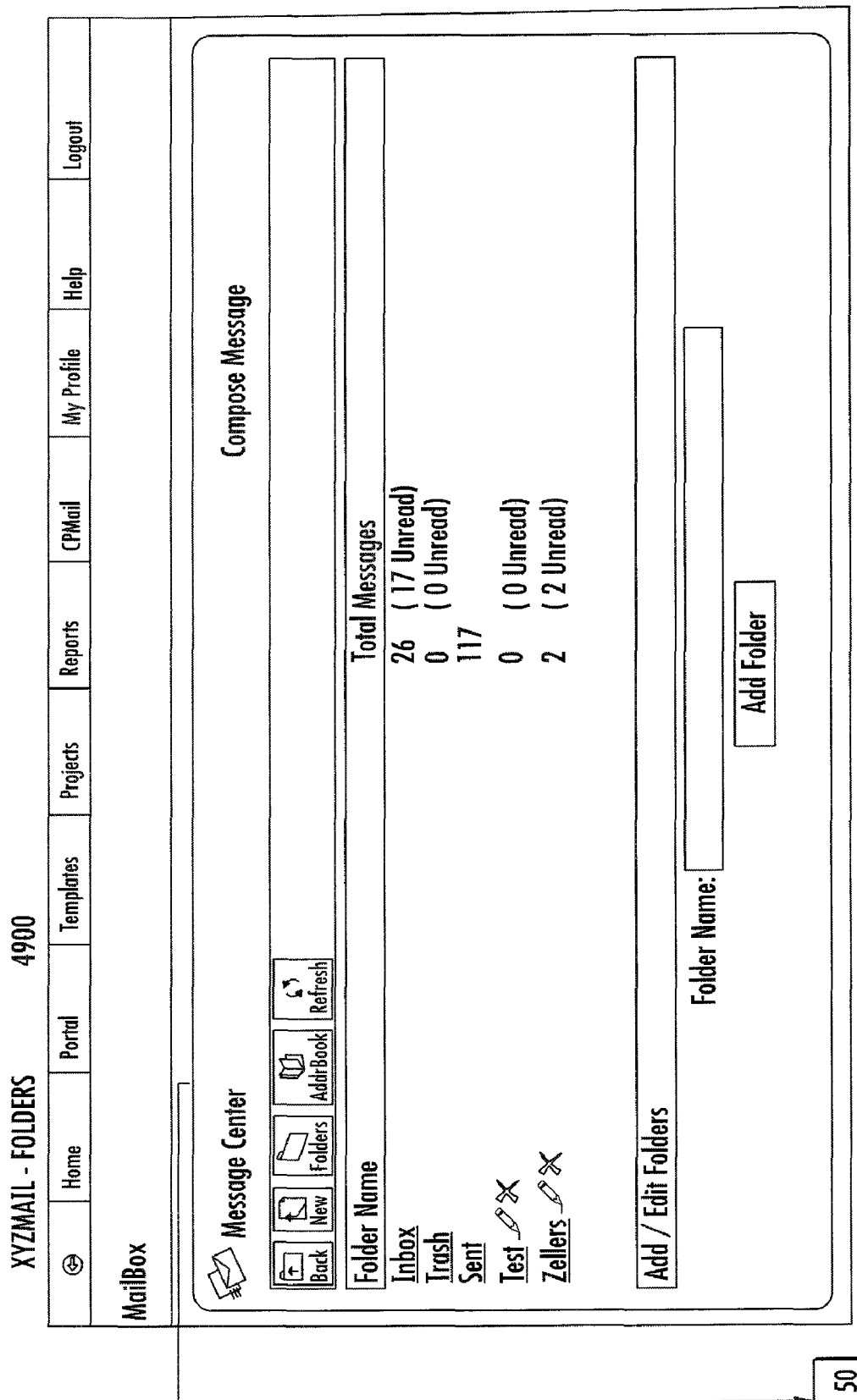

FIG. 49 is the FOLDERS 4900 section of the systems XYZMail. The default folders are the Inbox, Trash, and Sent. The User can add or edit folders as needed.

Figure 50:
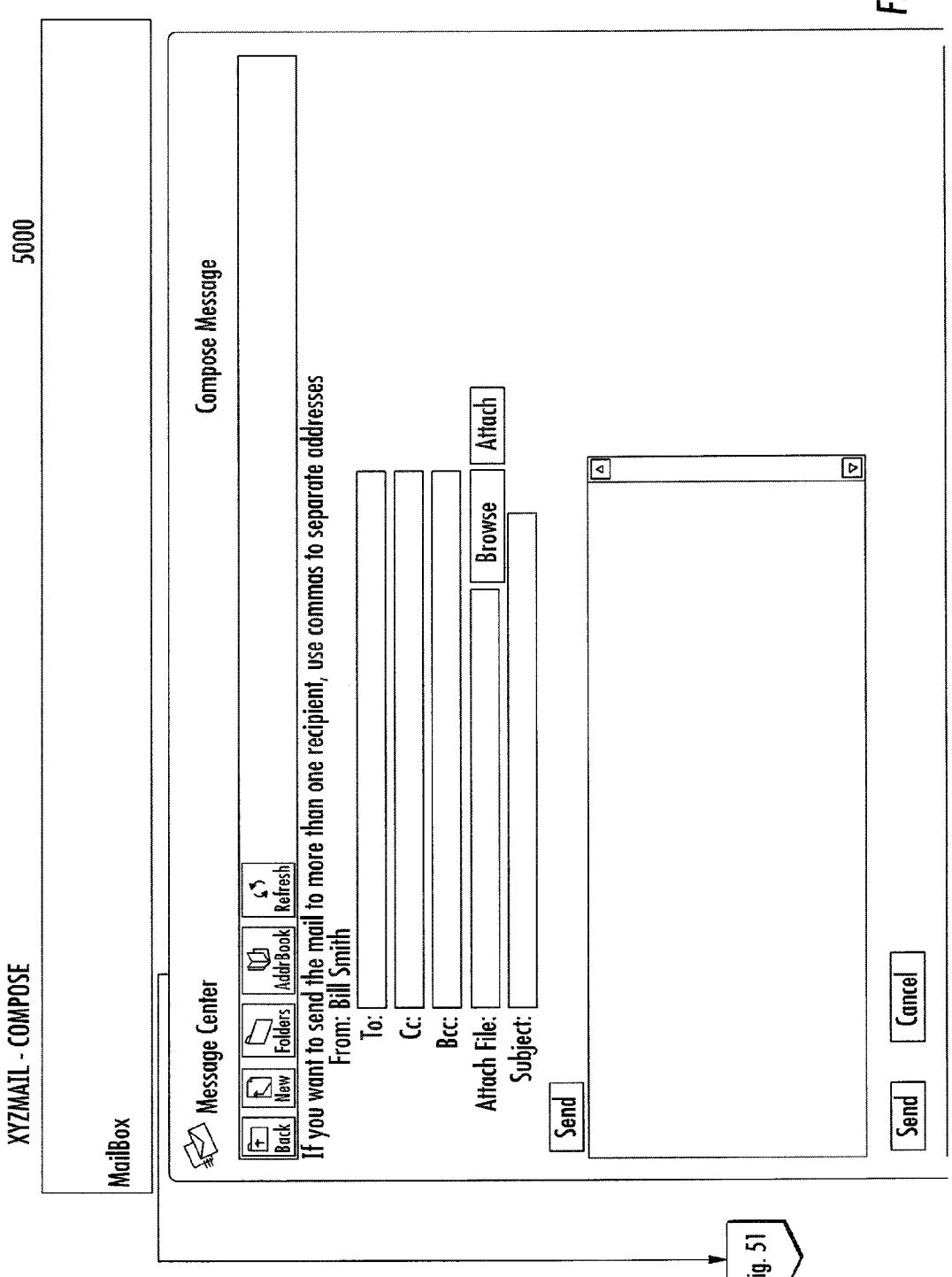

FIG. 50 is a screen shot of the Compose 5000 section of the system.

FIG. 51 is the CONTACTS 5100 section where the User can Search, Add or Edit contacts. This is also known as the Address Book. The User can make quick picks from the address book and insert their contact information into the Contact Information section when creating a new project or inviting bidders through the Invitation to Bid.

Figure 52:
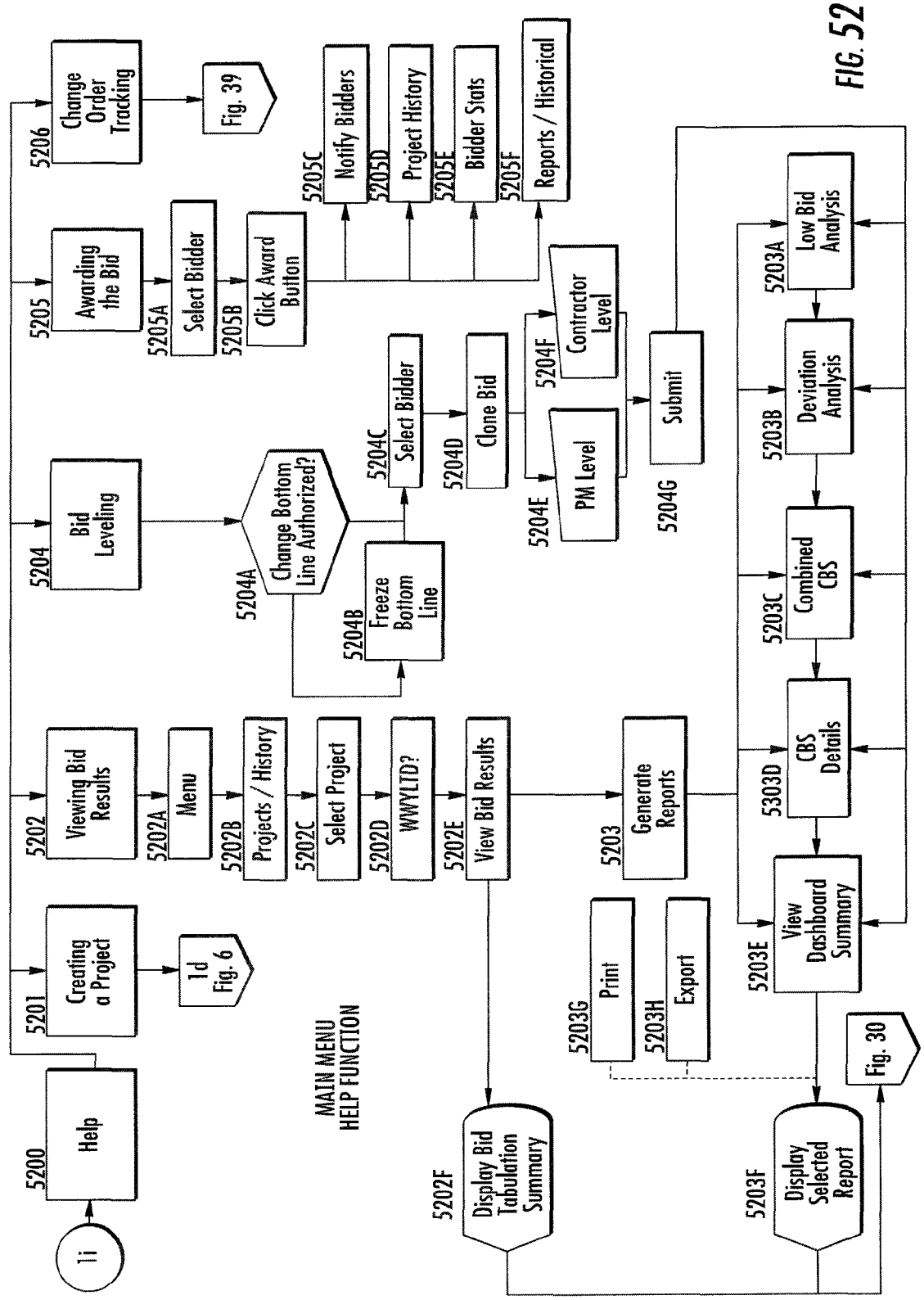

FIG. 52 shows the User selecting the HELP function 5200. All options for viewing Help functions are done with Adobe Captivate and present a realistic presentation of a User pointing and clicking while viewing any of the following options:

CREATING A PROJECT 5201—See FIG. 1d, FIG. 6 (same as creating a template.

VIEWING BID RESULTS 5202—Depicts the User select from the MENU 5202A PROJECTS/HISTORY 5202B, then selecting the desired PROJECT 5202C, then from the WHAT WOULD YOU LIKE TO DO? drop down list 5202D selecting VIEW BID RESULTS 5202E. The BID TABULATION SUMMARY IS DISPLAYED 5202F. The tutorial then shows the User going to the GENERATE REPORTS section 5203 and viewing the various reports that are generated within the system to include the LOW BID ANALYSIS 5203A, DEVIATION ANALYSIS 5203B, COMBINED CBS 5203C, and CBS DETAILS 5203D. All report data is also routed to the DASHBOARD SUMMARY 5203E and DISPLAYED 5203F for the User to view and as shown in FIG. 30. The tutorial also shows the User having the option to PRINT 5203G or EXPORT 5203H any of the selected reports.

The BID LEVELING 5204 tutorial simulates the User performing the Bid Leveling Function. If the manager authorizes the User to CHANGE THE BOTTOM LINE 5204A in the Cost Breakdown Sheet (CBS) the preferences are set to allow that function. If not, the function is set to FREEZE THE BOTTOM LINE 5204B. The tutorial then show the User SELECTING THE BIDDER 5204C and clicking on the Level Bid button which CLONES 5204D the selected bidder's Cost Breakdown Sheet. The User/PM then has the option for the PM TO LEVEL 5204E the bid or the CONTRACTOR TO LEVEL 5204F the bid. The tutorial then demonstrates how the leveled bid is saved and SUBMITTED 5204G and further analysis can then be performed using the leveled bids.

The User can select the AWARD BID 5205 function to view this tutorial. This shows the User SELECTING A BIDDER 5205A and CLICKING THE AWARD BUTTON 5205B. When the Bid Award button is selected the system NOTIFIES BIDDERS 5205C of the award, posts the award in the PROJECT HISTORY 5400D section, in the BIDDER STATS 5205E section, and in the REPORTS/HISTORICAL 5205F section.

Viewing the CHANGE ORDER TRACKING 5206 tutorial displays a view as seen in FIGS. 39 and 40. It also shows the User completing all the required sections of the Change Order and submitting it to the recipient.

Figure 53:
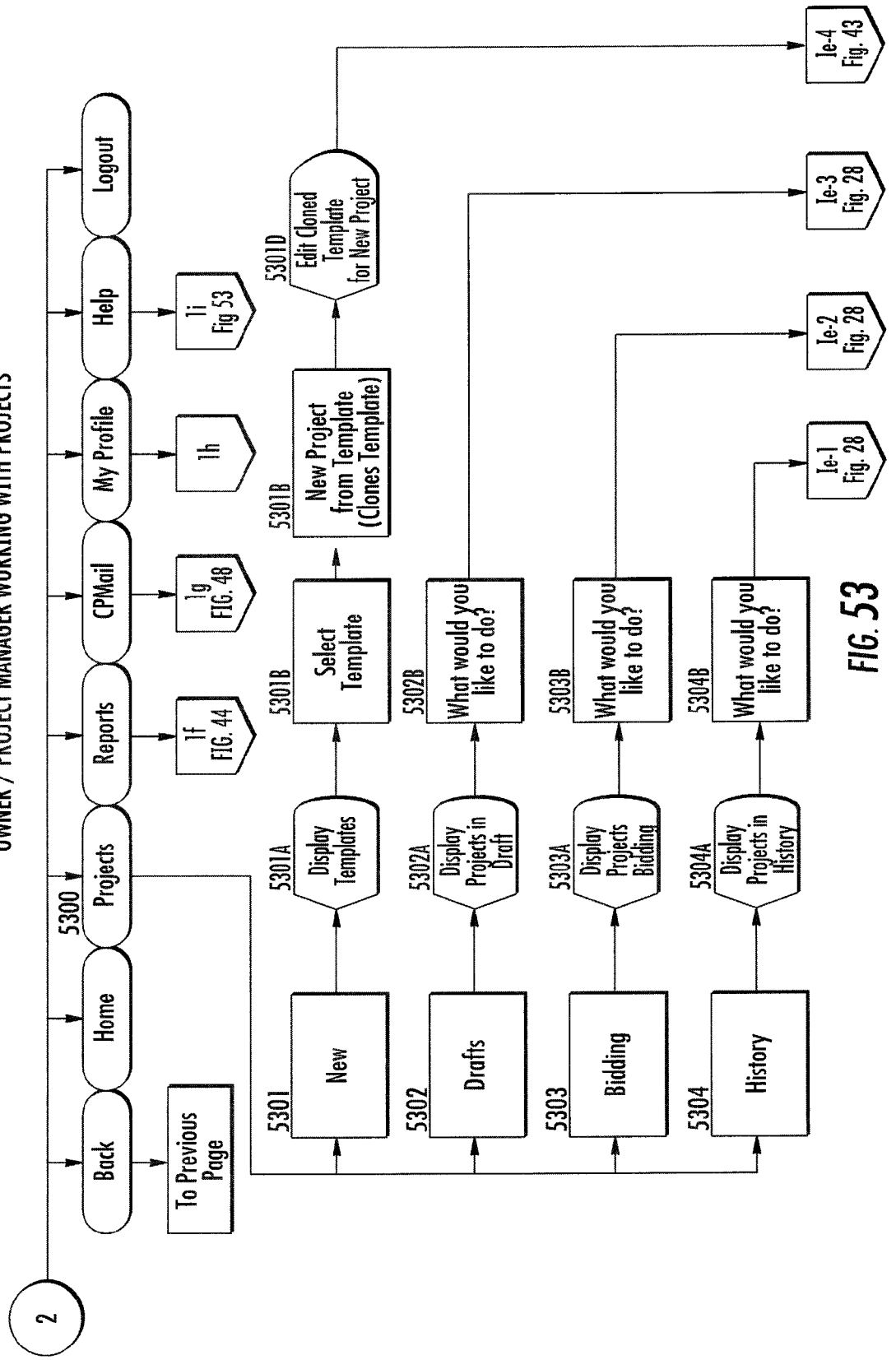

FIG. 53 is a flow chart showing the Owner or Project Manager working with their own PROJECTS 5300. When placing the cursor over Projects there are four options displayed in the drop down, NEW 5301, DRAFTS 5302, BIDDING 5303 and HISTORY 5304.

NEW 5301—selecting NEW 5301 DISPLAYS TEMPLATES 5301A for the User. The User then selects the appropriate template SELECT TEMPLATE 5301B and clicks on the NEW PROJECT FROM TEMPLATE 5301C selection. The User then EDITS THE CLONED TEMPLATE 5301D as shown on FIG. 43.

DRAFTS 5302—selecting DRAFTS 5302 DISPLAYS PROJECTS IN DRAFT 5302A. The User then can select from the WHAT WOULD YOU LIKE TO DO? 5302B drop down list as shown in FIG. 28.

BIDDING 5303—When the User selects BIDDING 5303, all PROJECTS BIDDING ARE DISPLAYED 5303A and then the User can select from the WHAT WOULD YOU LIKE TO DO? 5303B drop down list the option desired as shown in FIG. 28.

HISTORY 5304—When the User selects HISTORY 5304 all PROJECTS IN HISTORY ARE DISPLAYED 5304A. The User selects a project and then from the WHAT WOULD YOU LIKE TO DO? 5304B drop down list selects the option desired as shown in FIG. 28.

Figure 54:
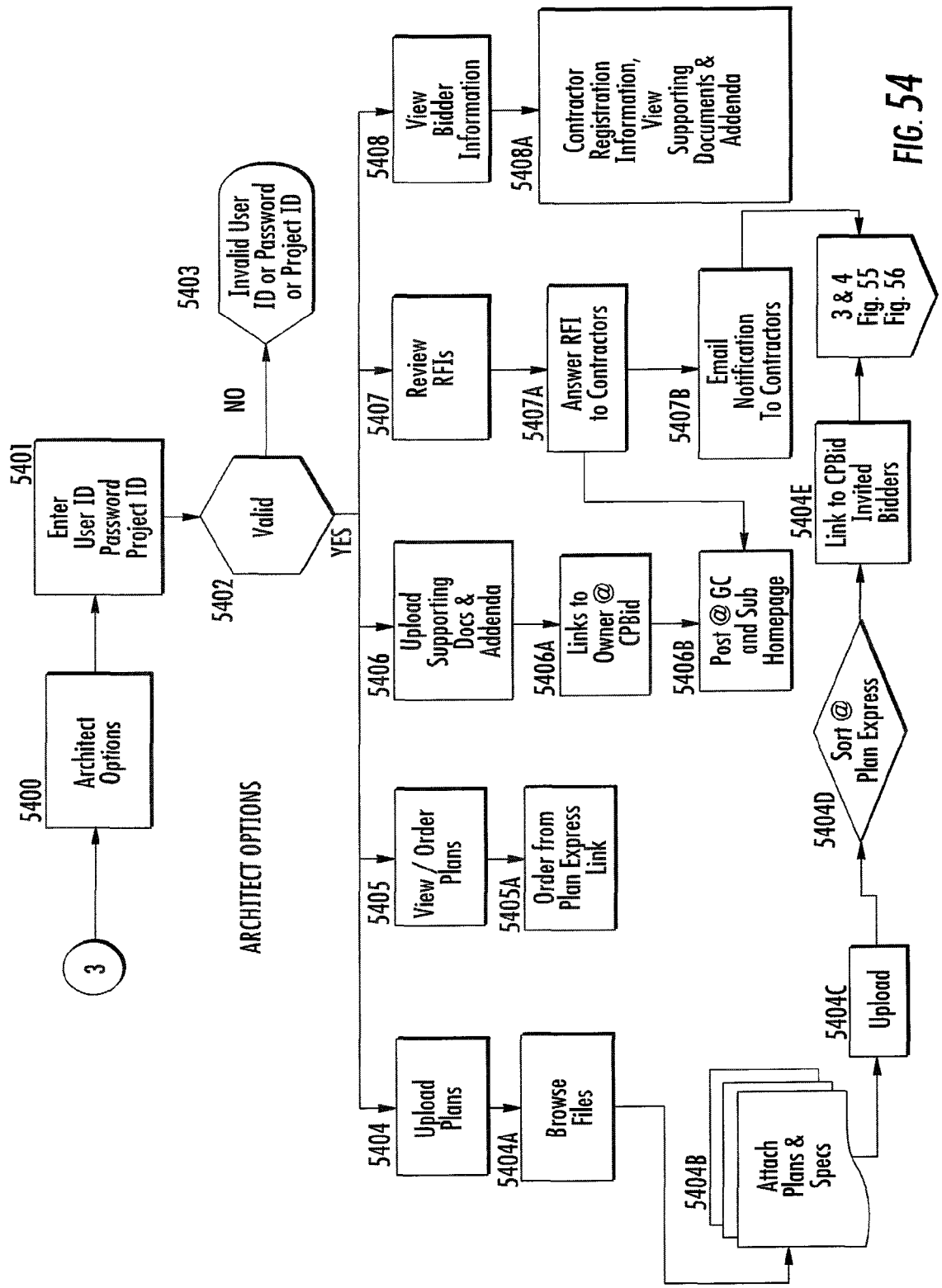
FIG. 54 illustrates the flow charts and screenshots that depart from the functionality of the owners and project managers/developers. With the exception of master portal management and template management, the functionality for creating projects and viewing reports are the same as depicted within the specified figures and screen shots.
Figure 55:
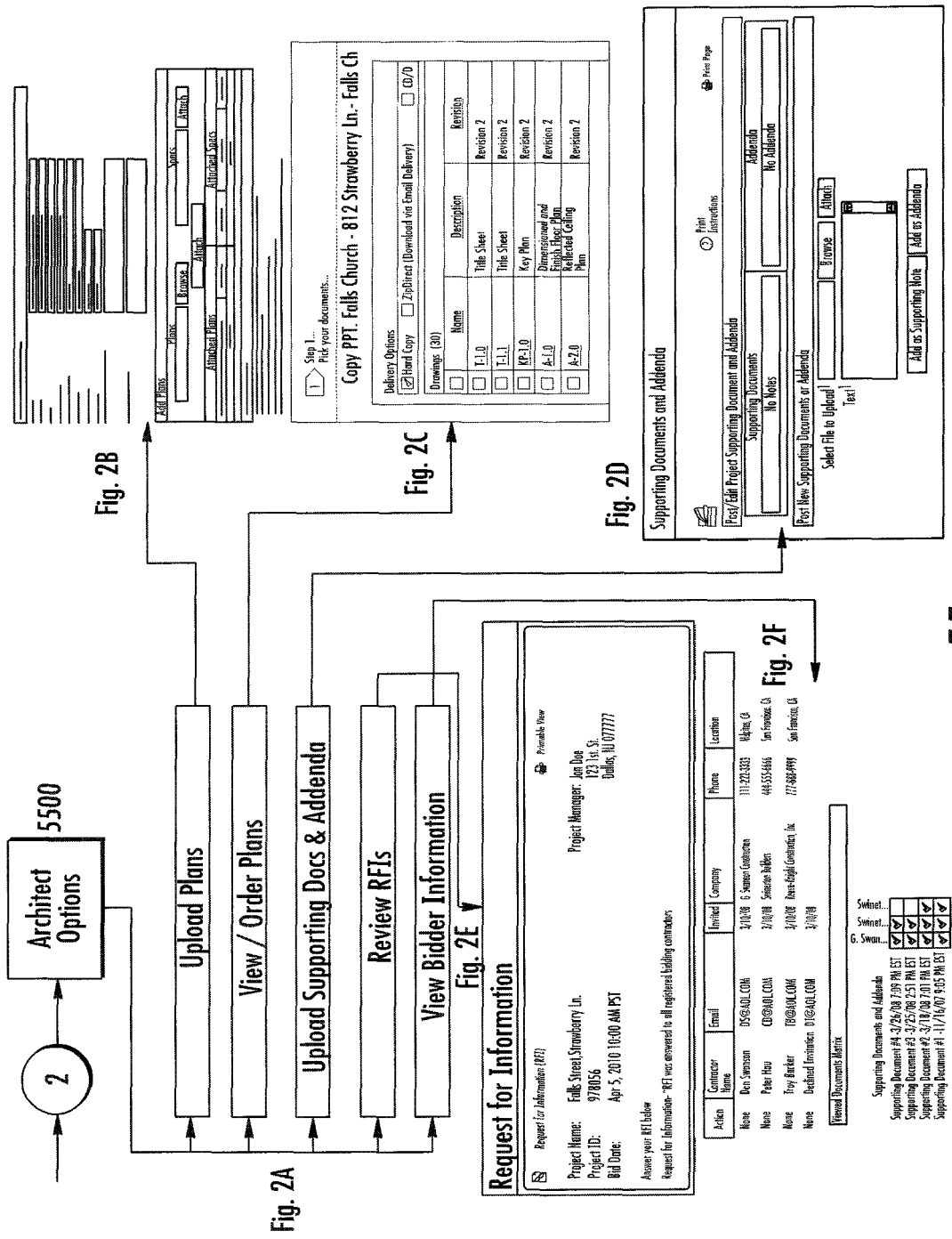
FIGS. 55 and 56 provide flow charts and screen shots that depart from the functionality of the owners and project managers/developers. Although access is a departure, the functionality allows the architect to operate in the same space as the project manager/developer for any given project i.e. when the architect uploads supporting documents those documents are posted to the project for any given project manager/developer. Additional functionality that is shown include uploading plans, viewing and ordering plans, reviewing and answering requests for information and viewing bidder registration information, the date and time the invited bidders view supporting documents.
Figure 56:
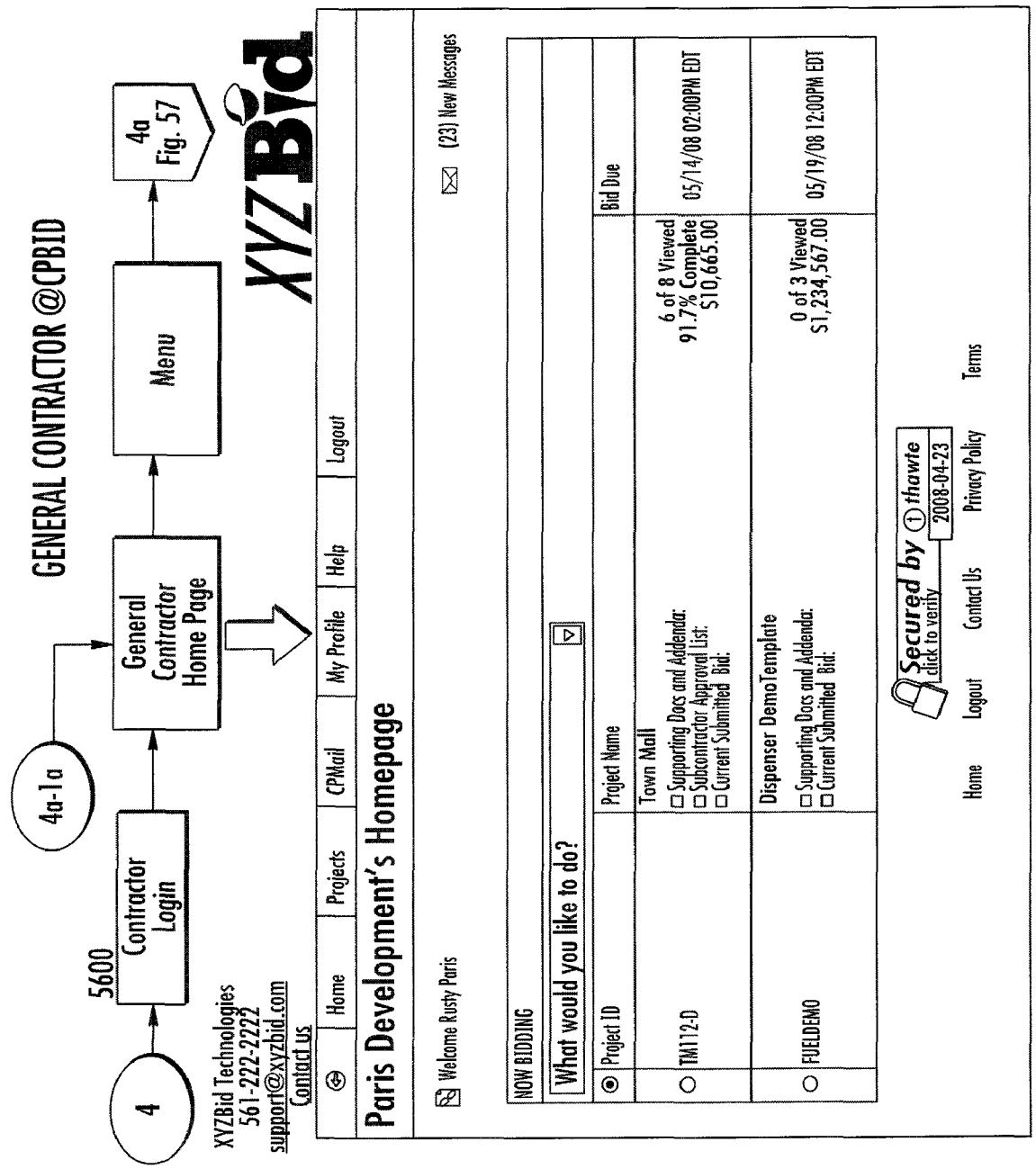

FIG. 54 shows the Architect functionality at XYZBid, the system. At the system's home page the Architect selects ARCHITECT OPTIONS 5400, and then ENTERS USER ID, PASSWORD, and PROJECT ID 5401. The system checks to see if the User Name and Password are VALID 5402. If the User Name or Password are invalid, a pop up is displayed stating that it is an INVALID USER ID OR PASSWORD, or PROJECT ID 5403. If all three are correct, the Architect is given five (5) options:

UPLOAD PLANS 5404—If the architect wants to Upload Plans, the UPLOAD PLANS button 5404 is selected. The architect can BROWSE FILES 5404, select the plans and specifications from his files, and then ATTACH PLANS & SPECIFICATIONS 5404B and then selecting the UPLOAD 5404C button. The files are sent to Plans Express, an independent company remote from XYZBid but linked to the XYZBid, SORTED 5404D and then LINKED TO THE SYSTEMS INVITED BIDDERS 5404E for them view and/or order. Screen shots are shown in FIGS. 55 & 56.

VIEW/ORDER PLANS 5405—The architect can VIEW and/or ORDER PLANS 5405, 5406 after they have been uploaded, sorted, and linked back to the system.

UPLOAD SUPPORTING DOCUMENTS & ADDENDA 5406—selecting the UPLOAD SUPPORTING DOCUMENTS & ADDENDA button 5406 allows the architect to POST 5406B supporting documents and addenda to be displayed at the contractor's homepage at XYZBid.

REVIEW REQUEST FOR INFORMATION (RFIs) 5407—This function allows the Architect to REVIEW RFIs 5407 that have been submitted by the contractors. The Architect can ANSWER 5407A the request for information with entered text as notes and attach drawings, photos, or documents to support the RFI answer. All answered RFIs are POSTED AT THE CONTRCTOR'S HOME PAGE 5406B and EMAIL NOTIFICATIONS 5407B are sent to the contractors.

VIEW BIDDER INFORMATION 5408—selecting the VIEW BIDDER INFORMATION button 5408 allows the architect to view ALL CONTRACTORS THAT ARE REGISTERED TO BID, THEIR REGISTRATION INFORMATION AND CONFIRMATION ON SUPPORTING DOCUMENTS AND ADDENDA THEY HAVE VIEWED 5408A.

FIG. 55 shows screen shots of the ARCHITECT OPTIONS 5500—The option buttons are show in FIG. 2A and include the Uploading of Plans, View/Order Plans, Upload Supporting Documents & Addenda, Review RFIs, and View Bidder Information.

Uploading Plans screen shot is shown in FIG. 2B.
View Order Plans screen shot is shown in FIG. 2C.
Upload Supporting Documents and Addend screen shot is shown in FIG. 2D.
Review RFIs screen shot is shown in FIG. 2E.
View Bidder Information is shown in FIG. 2F.

FIG. 56 shows a CONTRACTOR LOGGING IN 5600 and a screen shot of a typical home page with the Main Menu at the top of the Home Page, the projects displayed that the contractor is bidding on, and the "What would you like to do?" drop down functionality directly above the listed projects. The Menu and associated functions are further described on FIG. 57.

Figure 57:
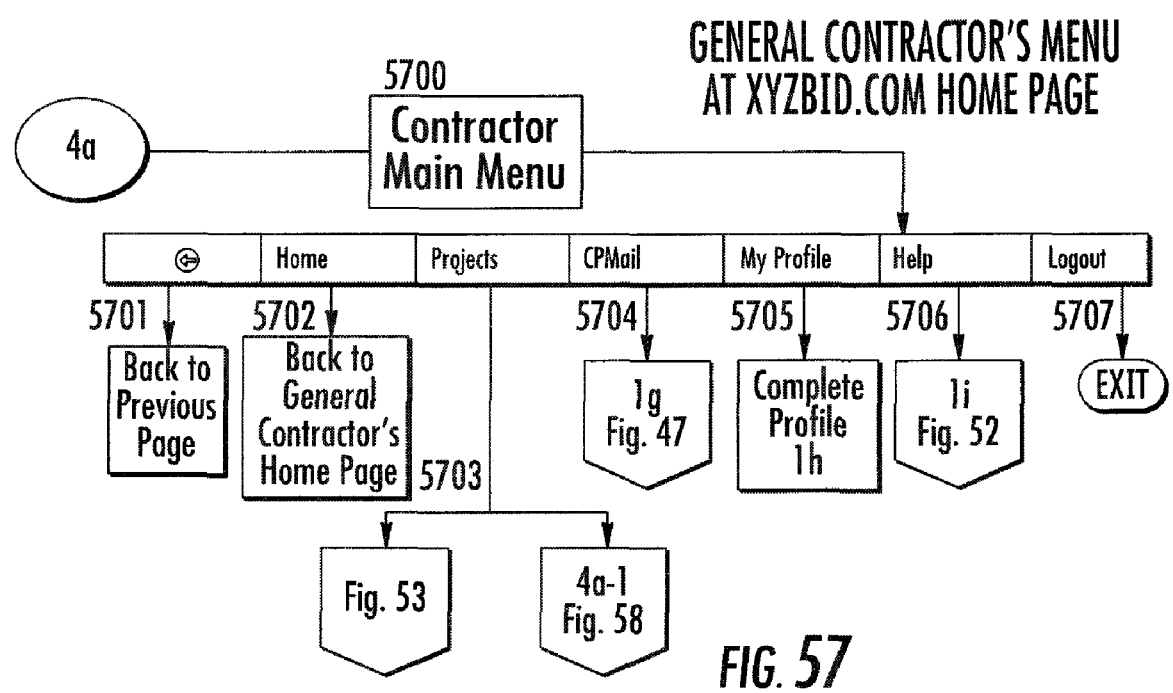

FIG. 57 shows the CONTRACTOR'S MAIN MENU 5700 at XYZBid. The menu options include:

BACK ARROW 5701—when selected, the system takes the User to the previous page.

HOME 5702 button when selected the system takes the User back to their Home Page.

Figure 58:
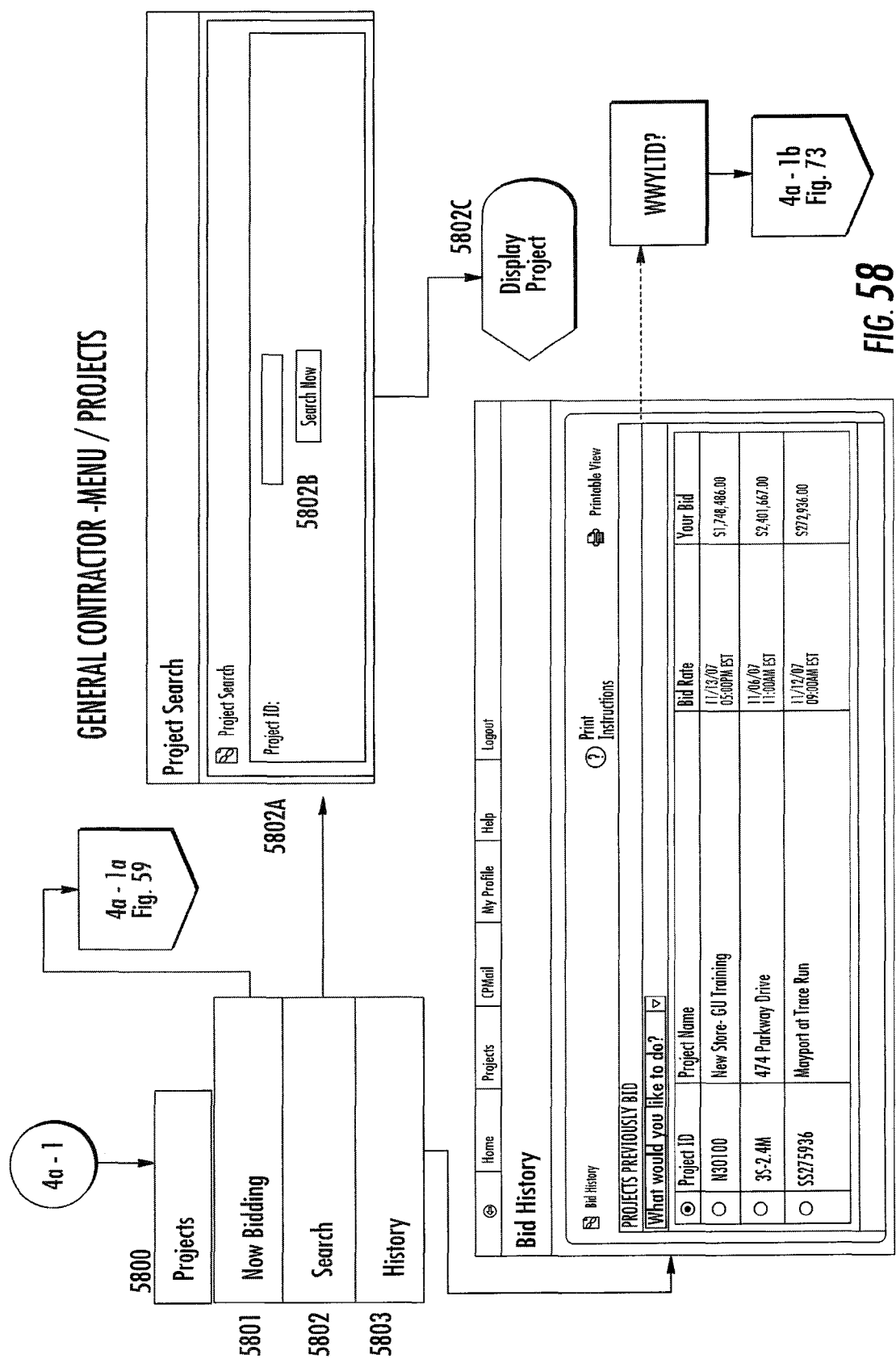

PROJECTS 5703—Selecting Projects functionality can be seen at FIG. 53 and the associated screen shots can be seen at FIG. 58

CPMail 5704 selection functionality is shown on FIG. 47.
MY PROFILE 5705 has been described at lh.
HELP 5706 has been previously described on the flow chart at FIG. 52.
EXIT 5707 closes the systems web page.

FIG. 58 shows a combined flow chart and screen shots to better depict what the contractor sees when selecting PROJECTS 5800 from the main menu. There are three options when Projects is selected:

NOW BIDDING 5801—This is shown in more detail on FIG. 59.

SEARCH 5802—Allows the contractor to enter a given PROJECT ID 5802A, select the SEARCH NOW 5802B button and DISPLAY THE PROJECT 5802C.

HISTORY 5803—This section displays all projects that have previously bid. The User has many options under the "What would you like to do?" drop down list as displayed in FIG. 73.

FIG. 59 is a screen shot of the contractors Home Page which also displays Projects Bidding. The "What would you like to do?" drop down list is shown and functionality links are shown on FIG. 60.

Figure 60:
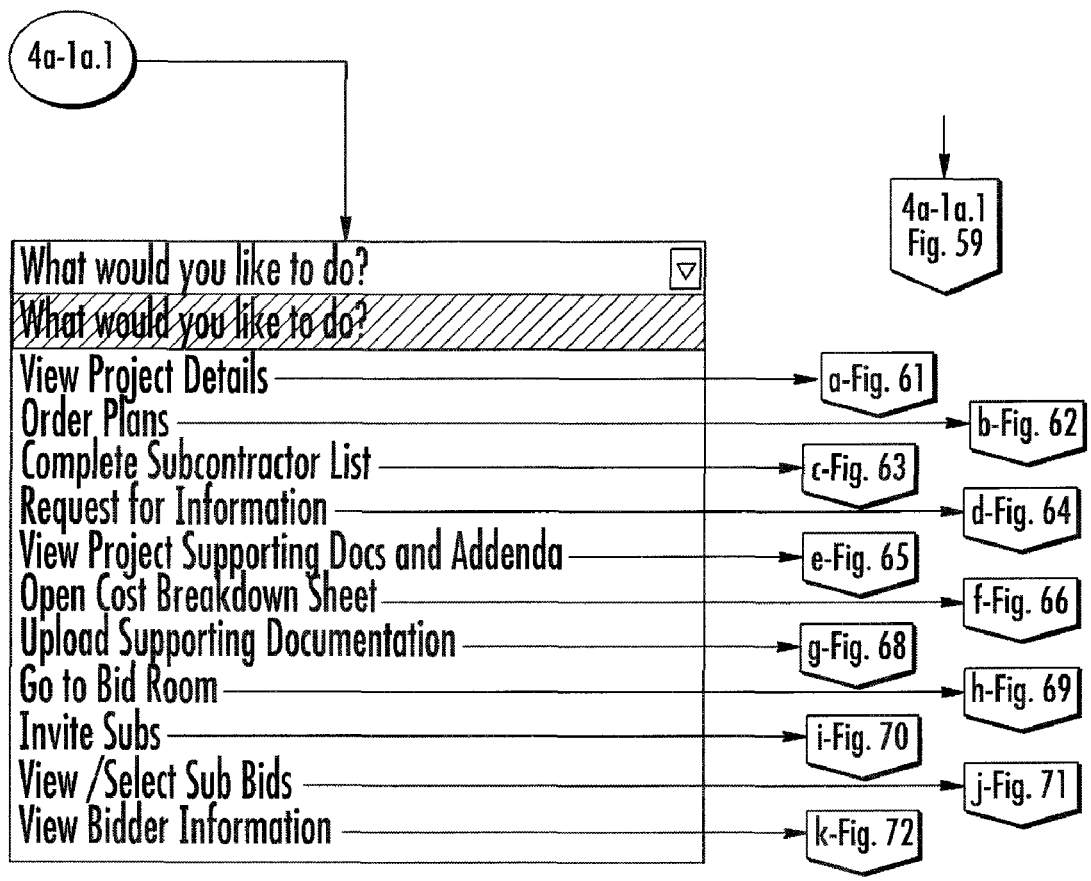
Figure 61:
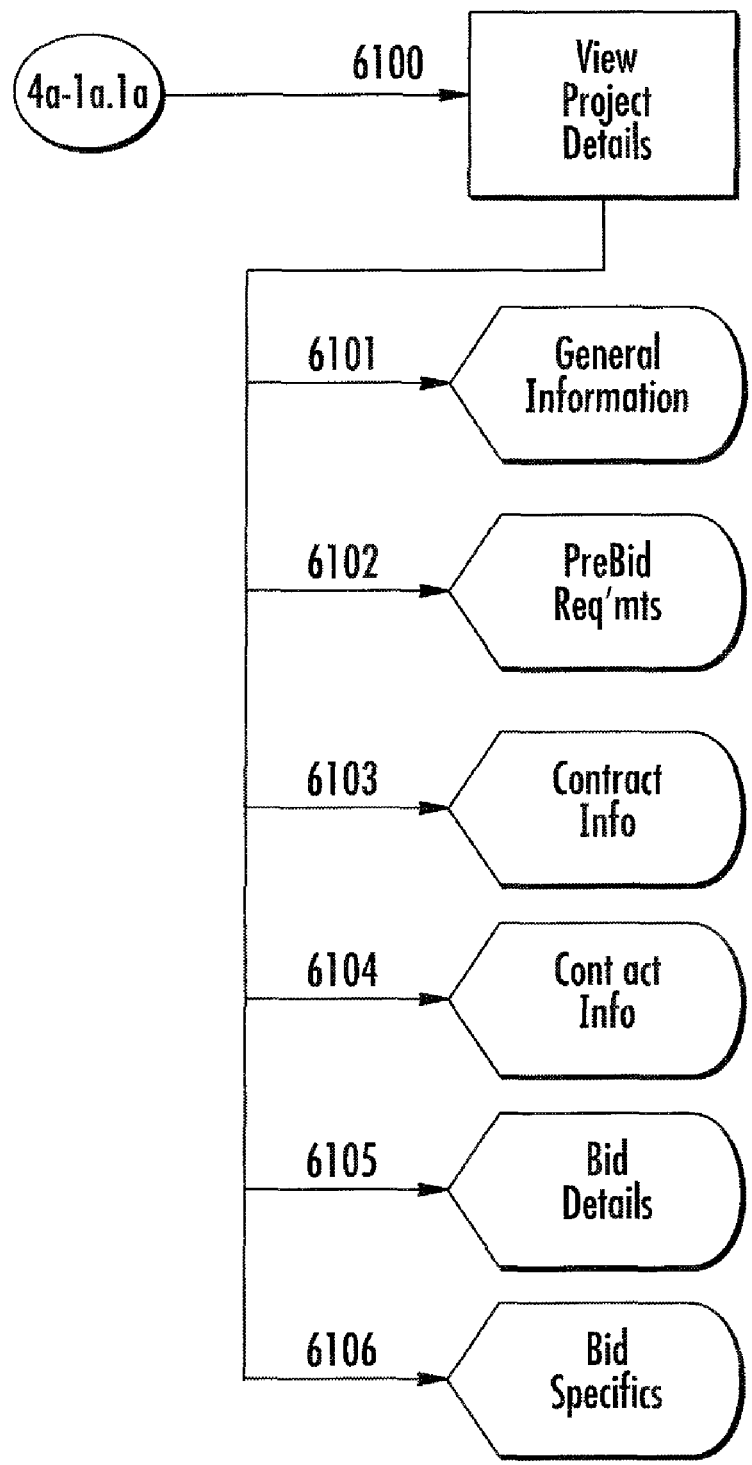

FIG. 60 is a screen shot of the Projects Bidding "What would you like to do?" drop down list and all links to detailed system functionality flow charts and screen shots. FIG. 61 shows the first selection in the WWYLTD drop down—View Project Details.

FIG. 61 CONTRACTOR VIEW PROJECT DETAILS—This flow chart shows the various sections within the VIEW PROJECT DETAILS 6100 selection:

GENERAL INFORMATION 6101—Selecting General Information provides the Contractor with the Project ID, Name, Address, Contact Information, Bid Specifics, and Bid Due Date and Time.

PRE-BID REQUIREMENTS 6102—Details and special requirements as provided by the User are entered into this section.

CONTRACT INFORMATION 6103—Provides the contractor with the type of contract to be issued i.e., Stipulated Sum, Cost Plus Fixed Fee or Guaranteed Maximum Price. Also included are the Number of Days to Complete the Project, Liquidated Damages, Retainage in the form of a percentage, and if it is a Prevailing Wage or Union Project.

CONTACT INFORMATION 6104—Provides contact information for the Owner, Architect, and Engineers in support of the project.

BID DETAILS 6105—Provides information on the number of stages to be bid and the Bid Due Date and Time.

BID SPECIFICS 6106—Any specific policies or procedures relative to the bid is posted to this section of the View Project Details.

Figure 62:
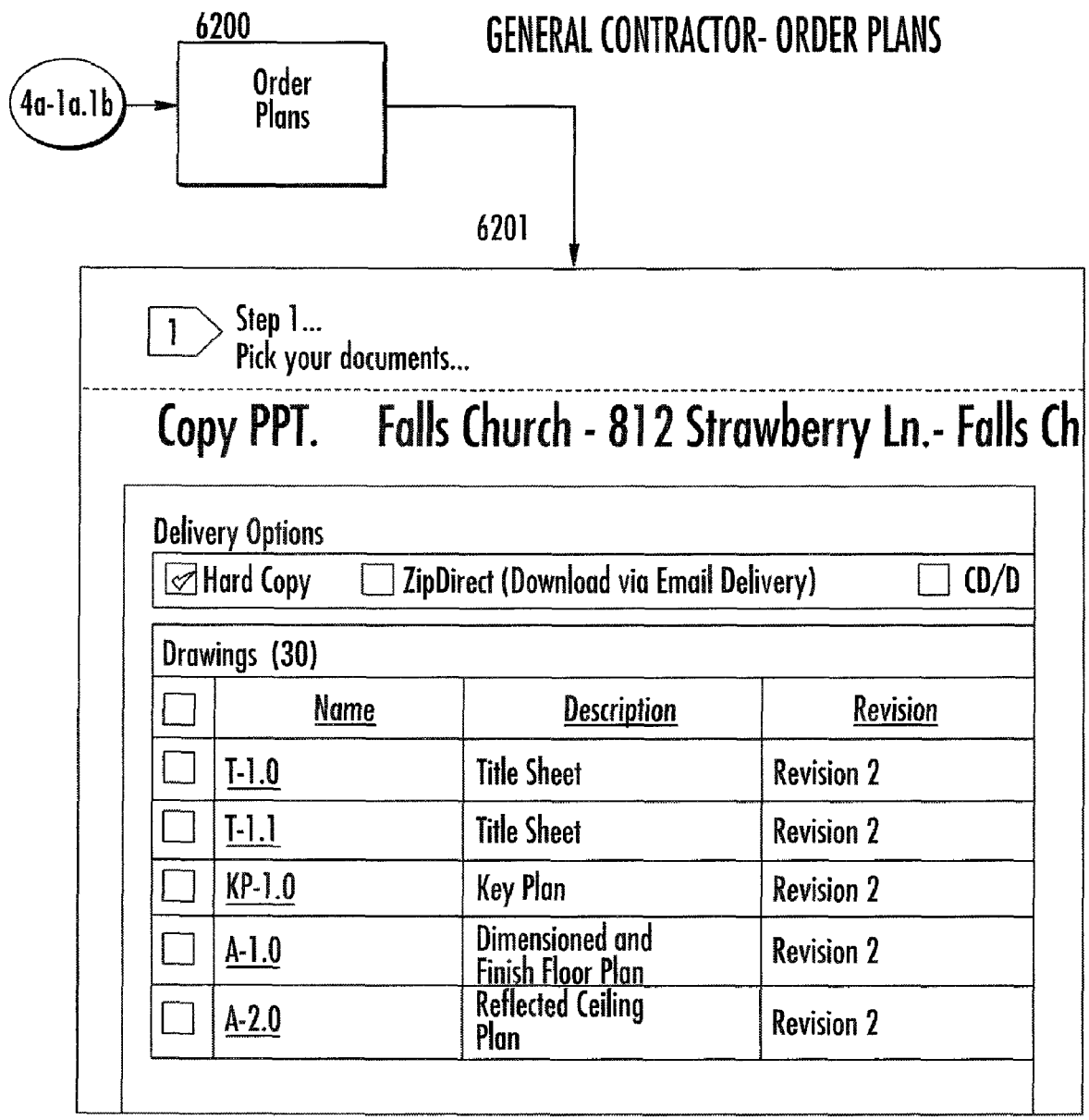

FIG. 62—General Contractor ORDER PLANS 6200—When the Contractor selects Order Plans, the system provides the Contractor with a list of drawings and specifications relative to the project 6201. The Contractor can then select individual drawings to order or the entire set. The drawings are available for overnight delivery, two day delivery, DVD/CD, or the Contractor can pick them up at Copy Dpt. The Contractor also has the option to download the drawings to in-house plotter/printers.

Figure 63:
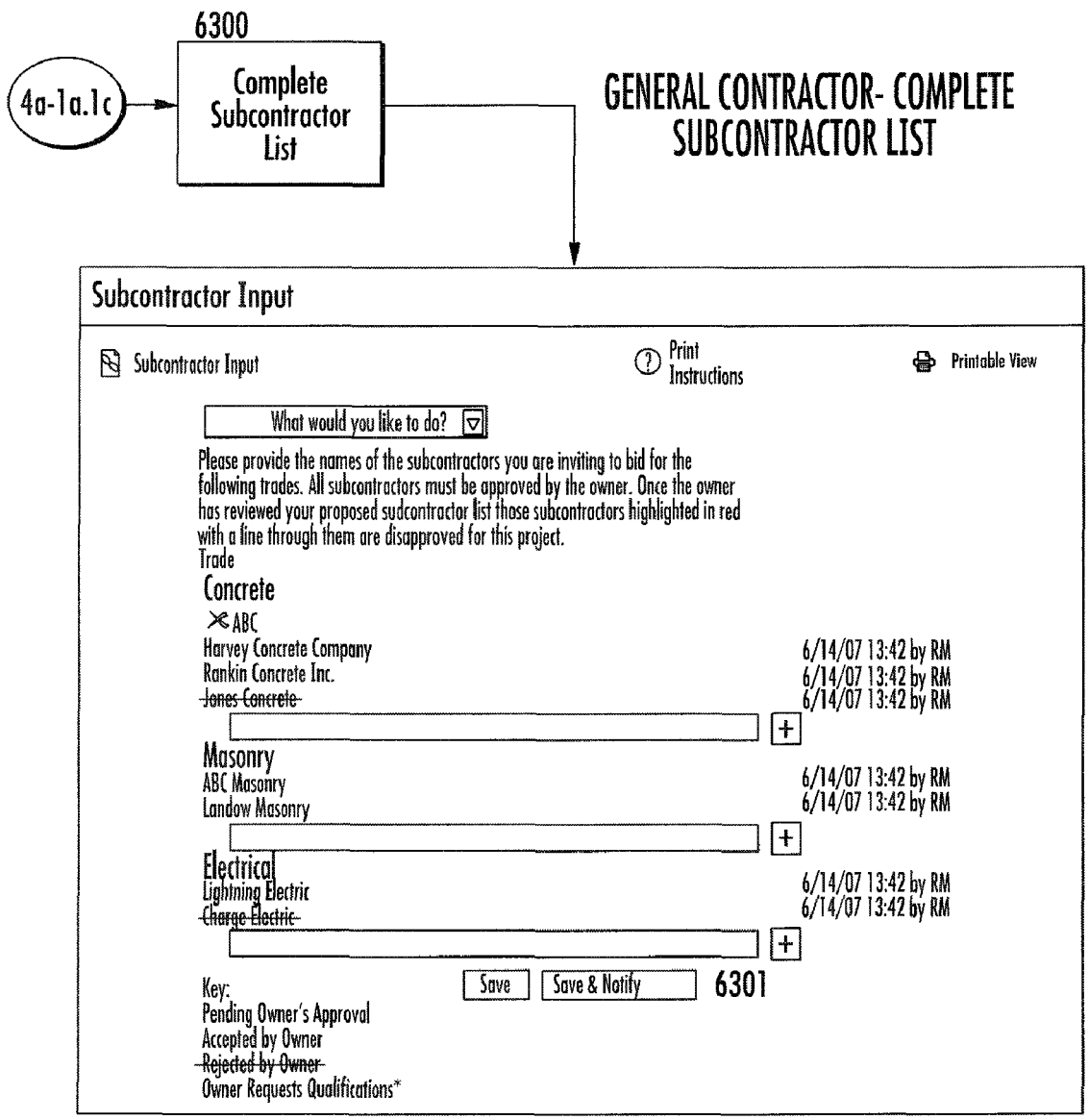

FIG. 63—General Contractor COMPLETE SUBCONTRACTOR LIST 6300 When the Owner request the Contractor complete a subcontractor list, the Contractor is notified at his work email address that the request has been made. The Contractor logs into XYZBid.com, selects the project and then from the "What would you like to do?" drop down list selects COMPLETE SUBCONTRACTOR LIST 6300. The Contractor then enters the names of the companies, associated with the listed trade, which he plans to receive bids from. When finished the Contractor clicks the SAVE AND NOTIFY 6301 button. The Owner then has the option to accept, reject, or request additional qualification information. The Contractor will then receive notification as shown in the FIG. 63 screen shot. Those subcontractors approved by the Owner will be in green, those rejected will be in red with a line through them, and those in brown indicate the Owner is requesting additional qualification information.

Figure 64:
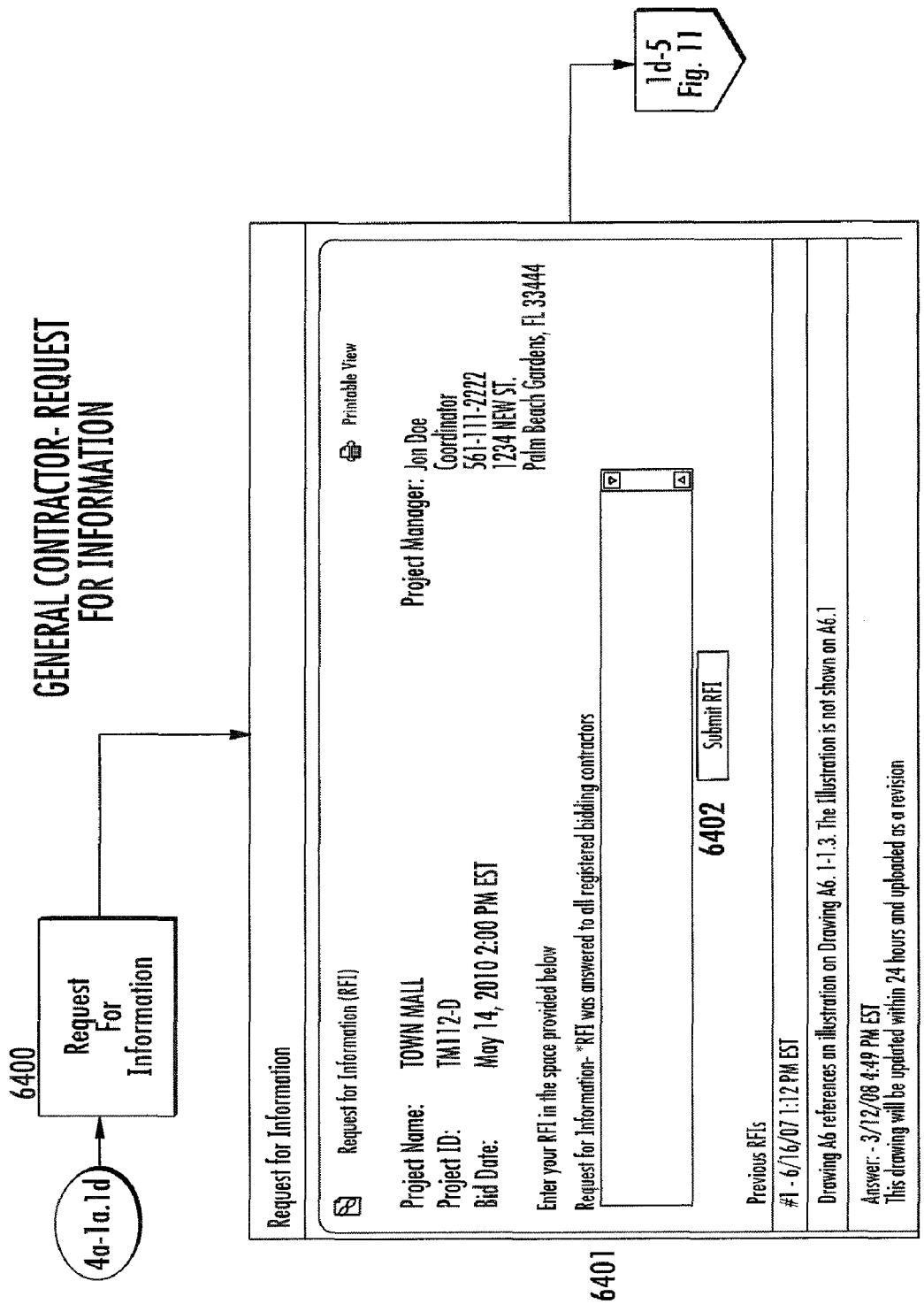

FIG. 64—General Contractor REQUEST FOR INFORMATION 6400—When the Contractor has a question relative to the project, he selects REQUEST FOR INFORMATION 6400 from the 'What would you like to do?" drop down list. The Contractor is then presented with the Request for Information page as shown in the screen shot on FIG. 64. The Contractor enters the question in the TEXT BOX 6401 and clicks the SUBMIT RFI button 6402. The Owner then receives the RFI as shown in FIG. 11 and the question is then posted directly below the text box with a date and time stamp. When the RFI is answered the Contractor is notified via email and the Contractor can then access the answer by logging into XYZBid and selecting REQUEST FOR INFORMATION 6400.

FIG. 65—General Contractor VIEW SUPPORTING DOCUMENTS & ADDENDA 6500—To view the supporting documents and addenda that was uploaded to the project by the Owner, the Contractor selects VIEW SUPPORTING DOCUMENTS & ADDENDA 6500 from the "What would you like to do?" drop down list. The Contractor is presented with an interactive page as shown in the screen shot in FIG. 65. If the Contractor has not viewed a document, a YELLOW ENVELOPE 6501 is displayed. When the Contractor clicks on the envelope the information relative to the supporting document or addenda is displayed along with any attachments. When the Contractor clicked on the envelope, it is date and time stamped at the Owners "View Bidder Information" page matrix.

Figure 66:
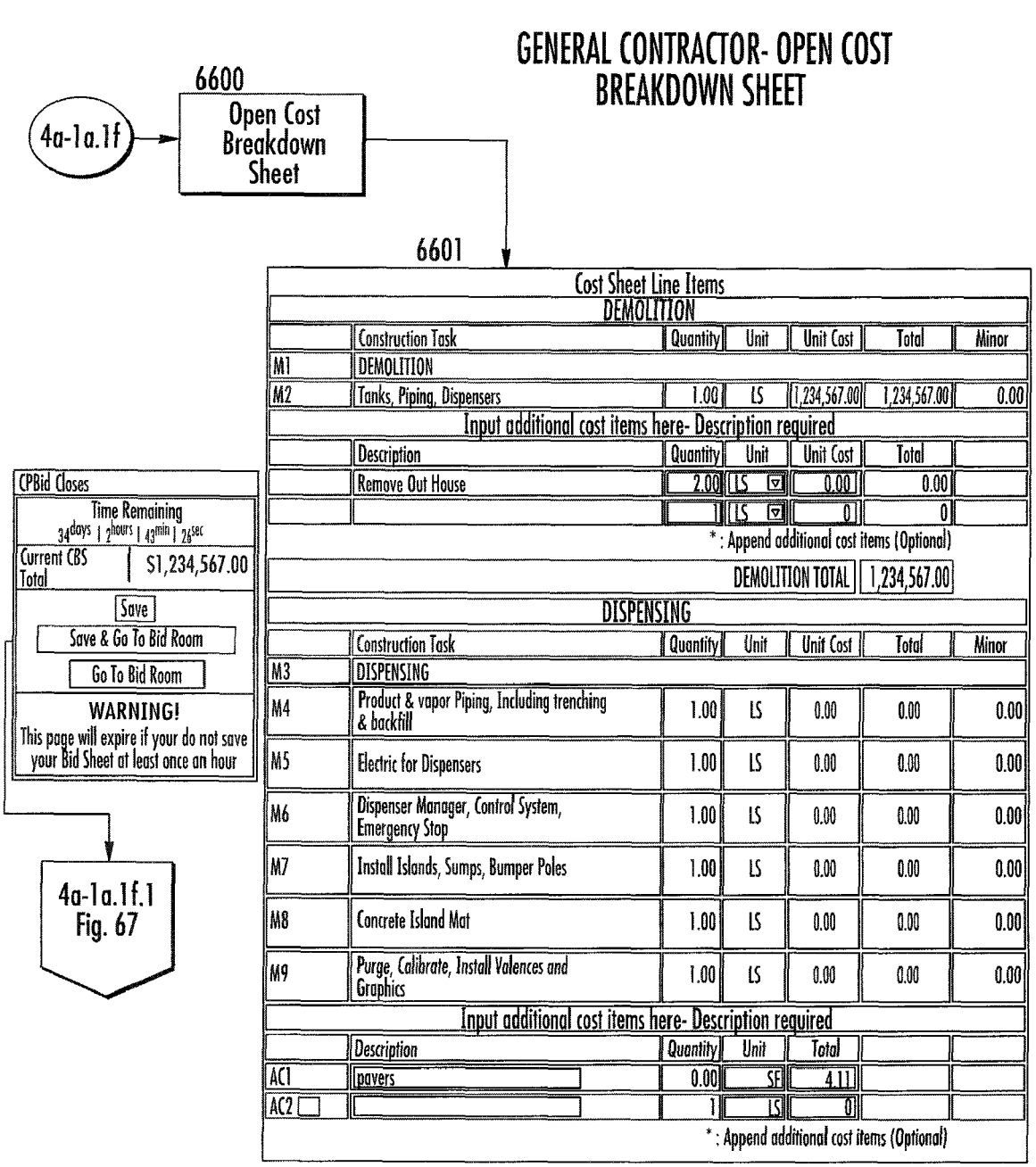
Figure 67:
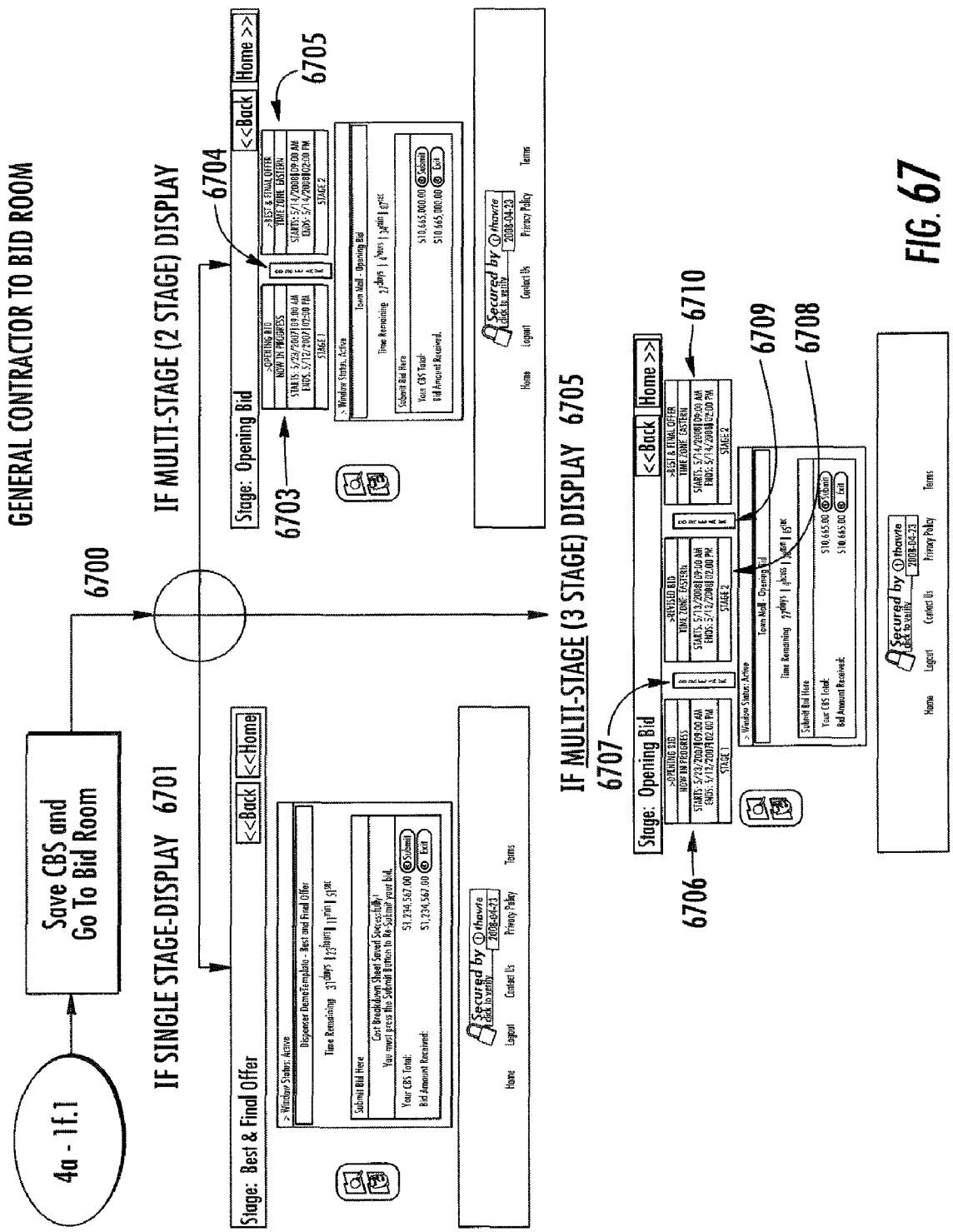

FIG. 66—General Contractor OPEN COST BREAKDOWN SHEET 6600—When the Contractor selects the OPEN COST BREAKDOWN SHEET 6600 from the drop down list, the interactive and dynamic cost breakdown sheet is display as shown in the SCREEN SHOT 6601 on FIG. 66. The Cost Breakdown Sheet allows the Contractor to enter Quantity, Unit of Measure, and Unit Costs for each line item in the Cost Breakdown Sheet. The Contractor can also click on any Construction Task and a text field will open allowing him to enter clarification information relative to the task. The Contractor can also enter additional cost items not found in the bid sheet. This function eliminates the need for the Owner to enter "Other" or "Miscellaneous" into a line item. When the Contractor is ready to submit the cost proposal/bid, he selects the Save and Go To Bid Room button and the Bid Room page is displayed as shown in FIG. 67. Note the Contractor has a countdown clock that alerts the Contractor as to the time remaining in the bid.

FIG. 67—When the Contractor selected the "Save and Go To Bid Room" as shown in the screen shot in FIG. 66, he is taken to the BID ROOM 6700. Depending on the number of stages selected when the Owner created the project will determine what the Contractor will see at the bid room.

1. If the Owner selected Single Stage, then the Contractor will see the SINGLE STAGE DISPLAY 6701 at the Bid Room. The Contractor will now select the Submit button to submit the bid. Once submitted, the Contractor will see the Bid Amount Received displayed in red.

2. If the Owner selects the MULTISTAGE (2 STAGE) BID 6702, the Contractor will see the screen shot as shown on FIG. 67 for the 2 Stage Bid. The Contractor then sees the OPENING BID 6703, BREAK PERIOD 6704, and BEST & FINAL OFFER 6705 start and end time information.

3. If the Owner selects the MULTISTAGE (3 STAGE) BID 6705, the Contractor will see the screen shot as shown on FIG. 67 for the 3 Stage Bid. The Contractor then sees the OPENING BID (Stage 1) 6706, BREAK PERIOD 6707 REVISED BID 6708 (Stage 2)], BREAK PERIOD 6709, and BEST & FINAL OFFER (Stage 3) 6710.

Figure 68:
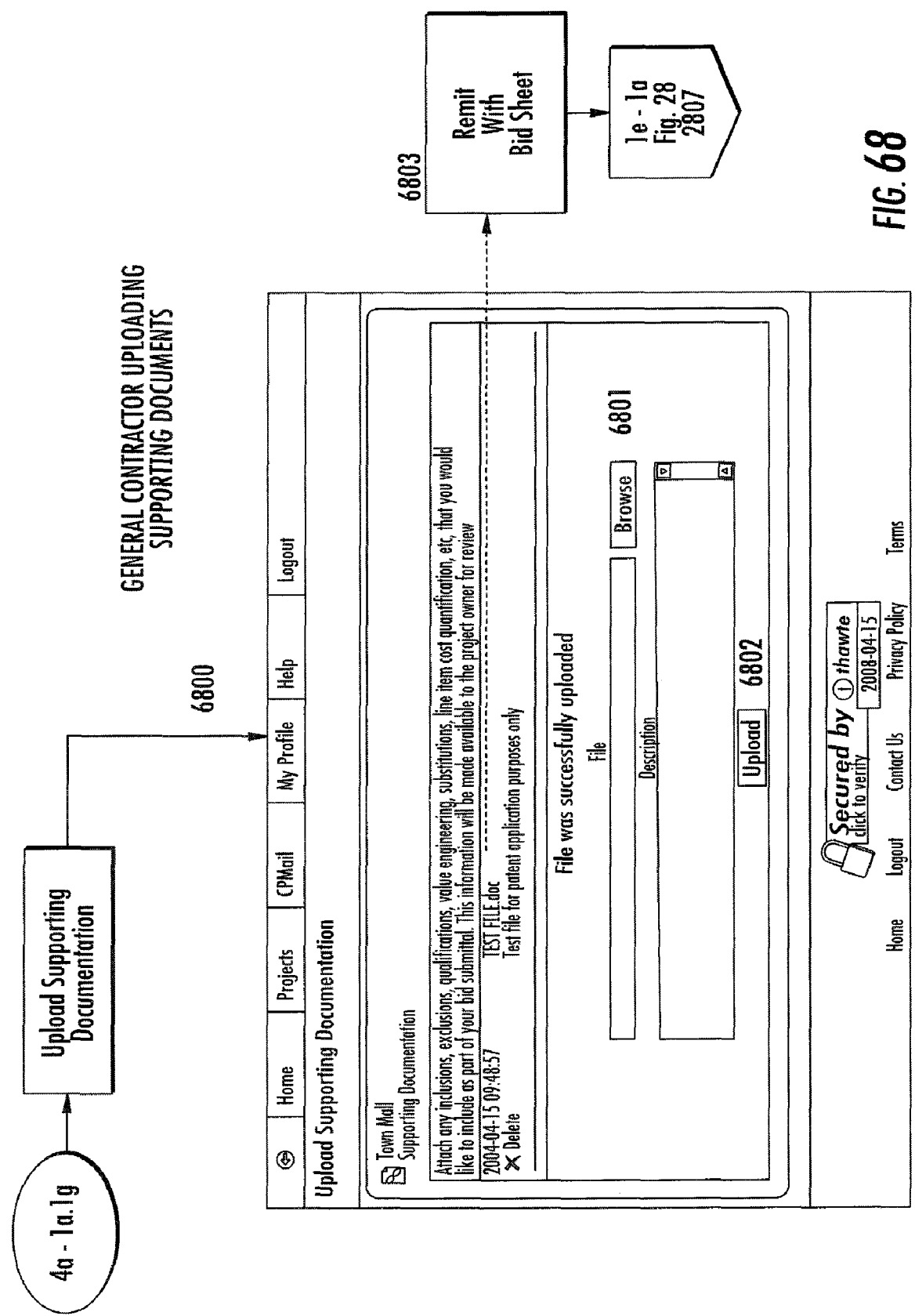

FIG. 68-FIG. 68 shows a screen shot of the Contractor's option to UPLOAD SUPPORTING DOCUMENTATION 6800. The contractor can BROWSE 6801 their files, select the document and then click the UPLOAD 6802 button. The files are then attached and REMITTED 6803 with the cost proposal as shown in FIG. 29.

Figure 69:
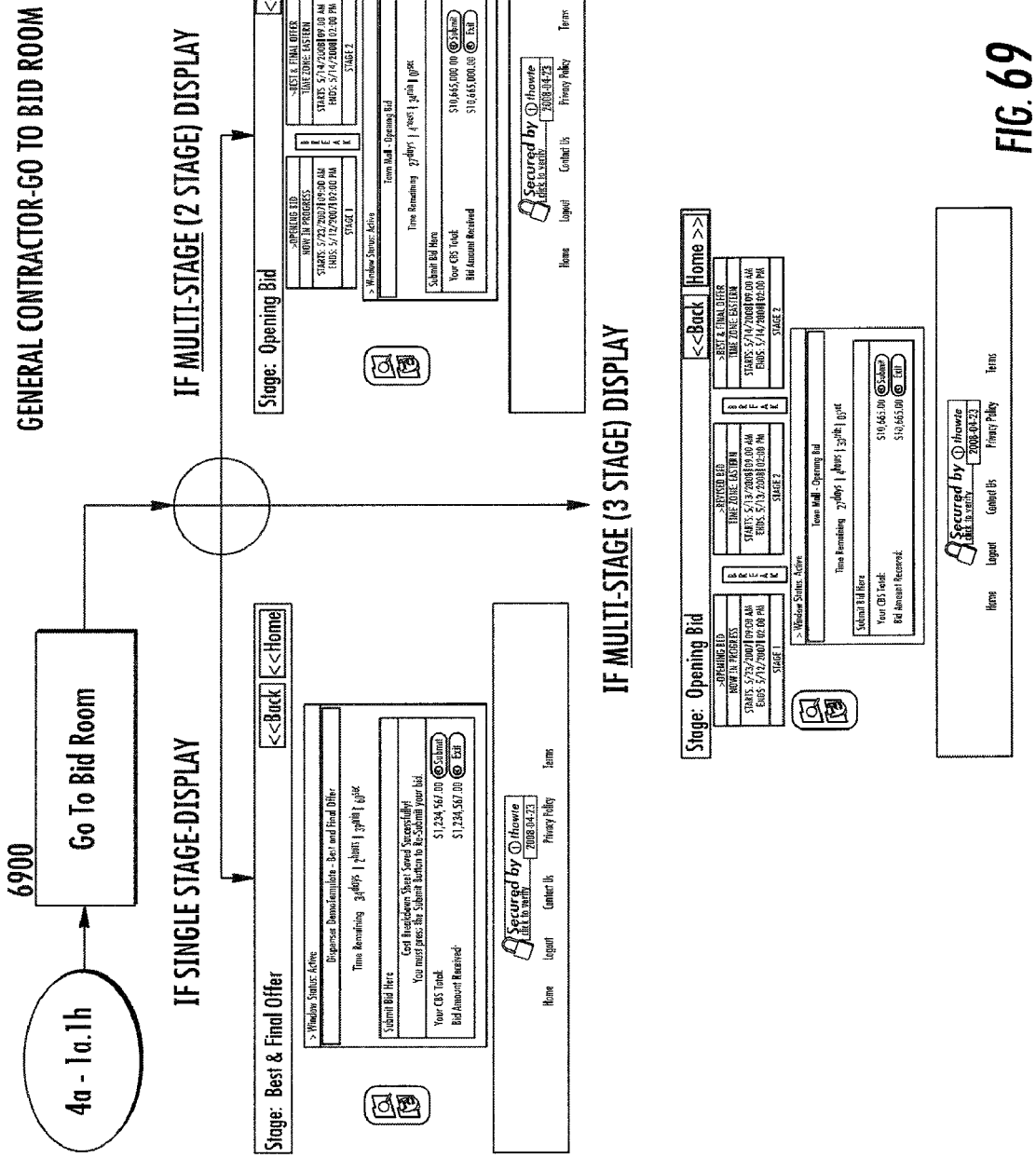

FIG. 69-FIG. 69 shows a screen shot of the Contractor's option to select GO TO BID ROOM [6900] from the "What would you like to do?" drop down list. This allows the contractor to have direct access to the bid room without being routed via multiple clicks. The BID ROOM 6900 screen shot is the same as that displayed in FIG. 67. Depending on the type of multistage bid, 1, 2, or 3 Stages, will determine the view displayed.

Figure 70:
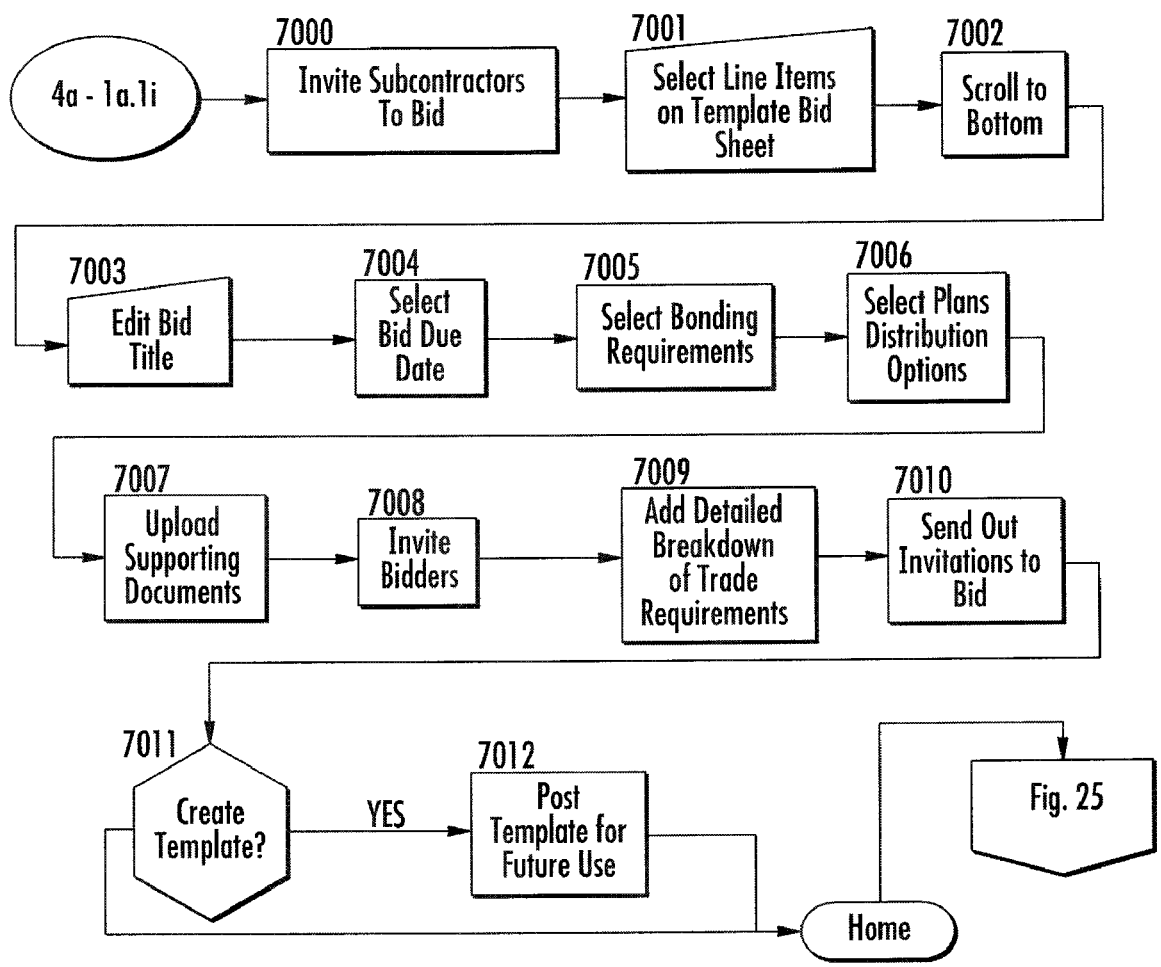

FIG. 70-FIG. 70 provides a flow chart showing the sequence and options the Contractor has available when inviting Subcontractors to submit a bid to the Contractor. This selection is from the "What would you like to do?" drop down list at the Contractor's home page at XYZBid.com. When the Contractor selects the INVITE SUBCONTRACTORS TO BID 7000 he is presented with the template bid sheet that was included in his invitation to bid from the Owner. The Contractor then SELECTS LINE ITEMS ON THE TEMPLATE BID SHEET 7001 that will be sent out with the Invitation to Bid for that particular trade such as concrete or electrical. The Contractor then selects the SCROLL TO BOTTOM [7002] button and then has the option to EDIT THE BID TITLE 7003. The Contractor then SELECTS THE BID DUE DATE 7004 from a calendar drop down list. The Contractor then SELECTS BONDING REQUIREMENTS 7005 to include, Bid Bond, Payment Bond, and Performance Bond. The selection is a simple click into a redial button titled Yes or No. The Contractor then Selects the PLANS DISTRIBUTION 7006 options; Plans and Shipping paid by GC, Plans Paid by GC—Subcontractor pays shipping, or Plans and Shipping paid by Subcontractor. The Contractor then has the option to UPLOAD SUPPORTING DOCUMENTS 7007 if needed. Next the Contractor can INVITE BIDDERS 7008 by entering their email addresses into the Invitation to Bid or selecting them from the Address Book and clicking the Insert Button. The Contractor also has the option to ADD A DETAILED BREAKDOWN OF TRADE REQUIREMENTS 7009 such as Furnish and Install barricades. The Subcontractor will then have the option to select Included or Excluded from the cost proposal. If Excluded, the Subcontractor can enter the dollar amount it that should be added to his cost proposal if the Contractor wants to include the requirement. The Contractor then SENDS OUT THE INVITATIONS TO BID 7010. After sending out the Invitations to Bid, the Contractor has the option to CREATE A TEMPLATE 7011 from the invitation that was just sent to the Subcontractors. In doing this, the Contractor can expedite invitations to bid when this same trade is being invited to bid on the next project. The TEMPLATE IS POSTED FOR FUTURE USE 7012.

Figure 71:
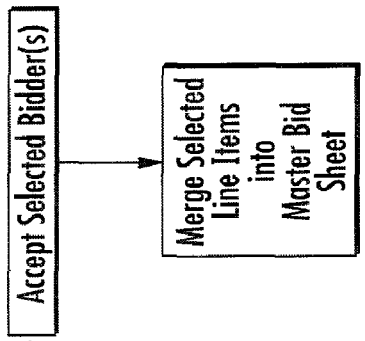

FIG. 71—FIG. 71 allows the Contractor to VIEW OR SELECT SUBCONTRACTOR BIDS 7100 and MERGE THAT SELECTED SUB CONTRACTOR'S COST PROPOSAL NUMBERS INTO THE MASTER BID SHEET 7101 that the Contractor will submit back to the Owner. This eliminates the need for the Contractor to manually add each cost line item submitted by the Subcontractor into the Maser Bid Sheet.

Figure 72:
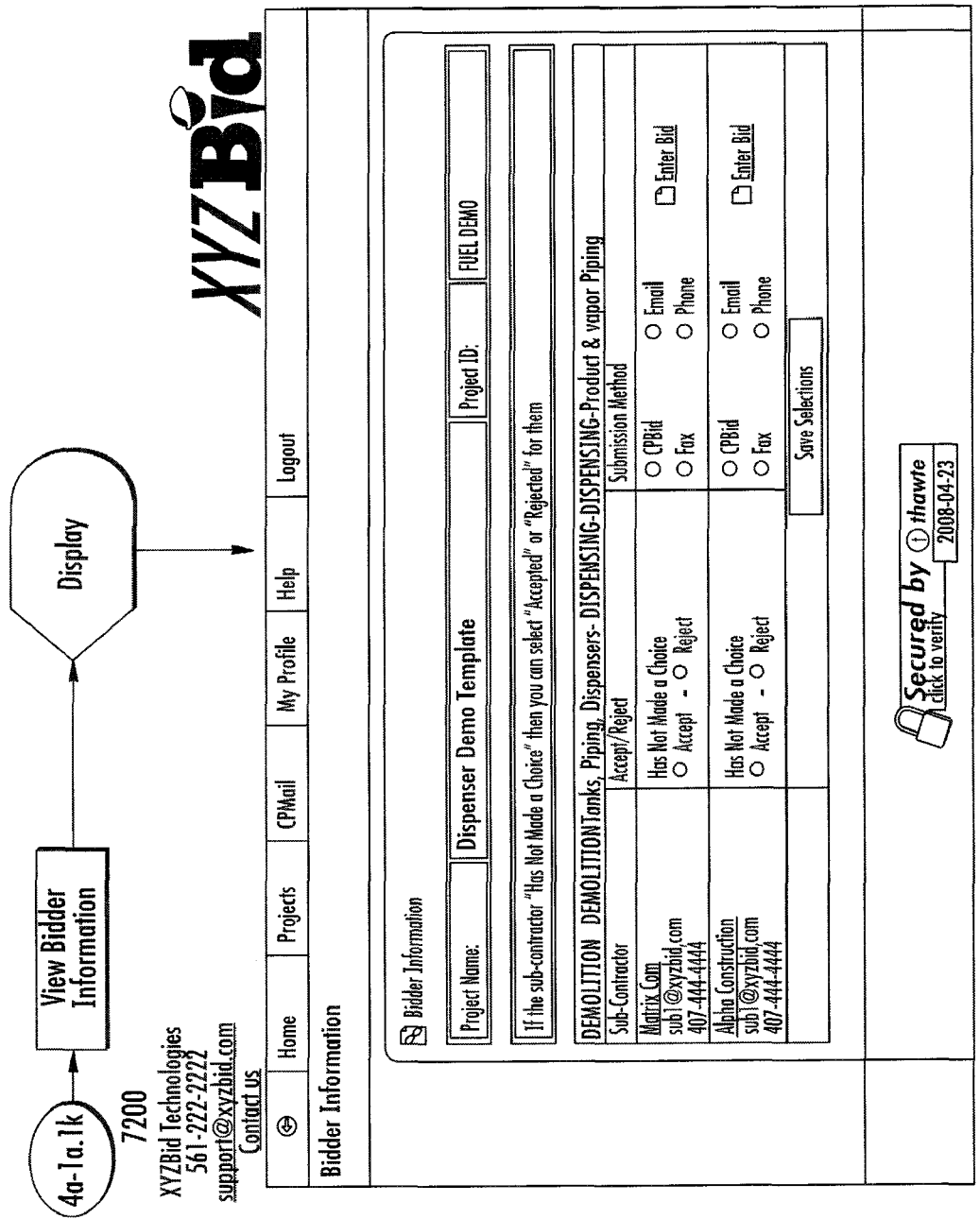

FIG. 72—FIG. 72 is a screen shot of the next selection in the "What would you like to do?" drop down list—VIEW BIDDER INFORMATION 7200. Here the Contractor can see a listing of the Subcontractors that have been invited to bid, they have made a choice to Accept or Reject the Invitation to Bid, and a place for the Contractor to select how the Subcontractor will be submitting their bid; XYZBid, Fax, Email, or by Phone. Although XYZBid is an automated process, it also accounts for those that may not have access to the internet at the time of the bid.

Figure 73:
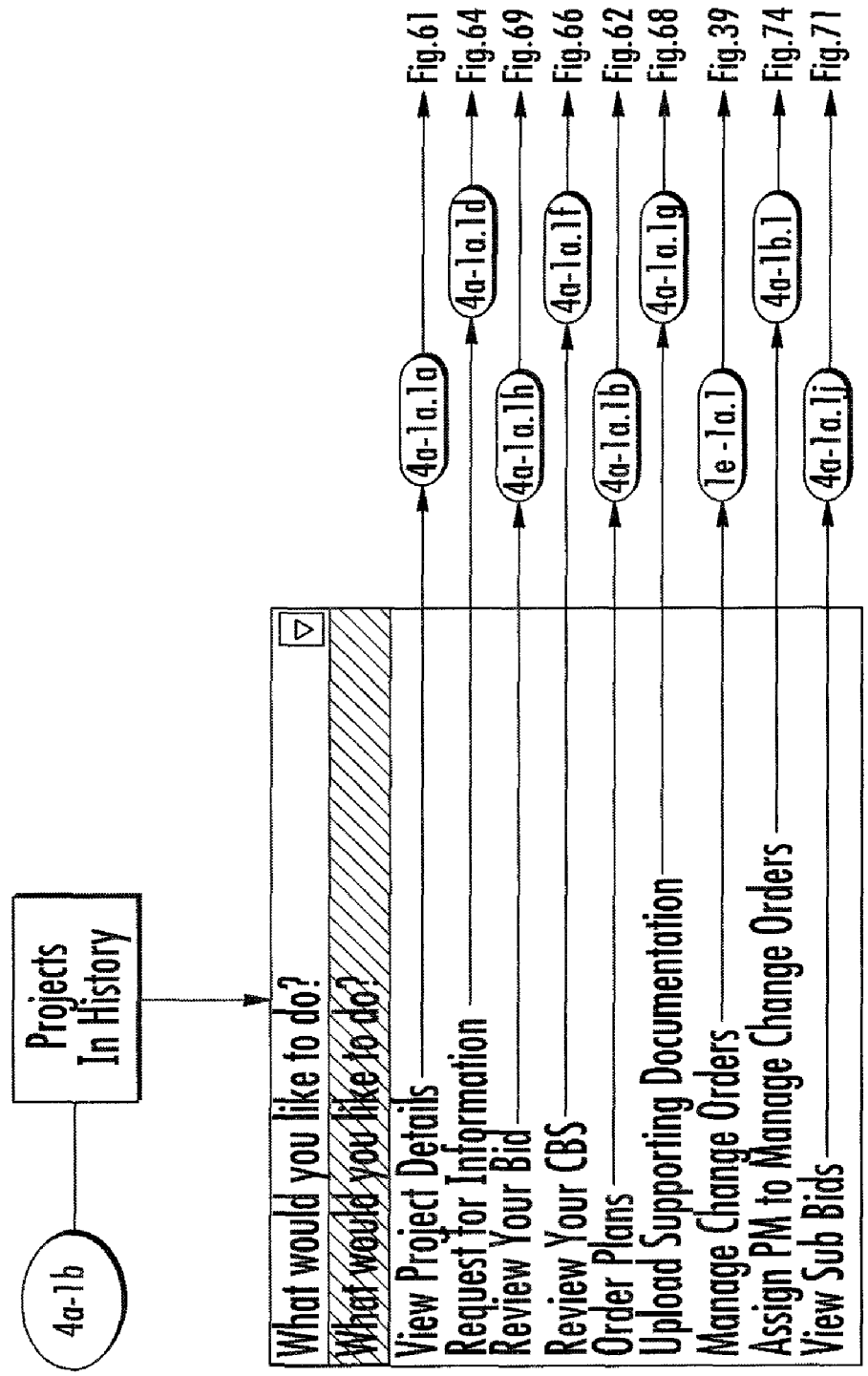

FIG. 73-FIG. 73 is a screen shot of the multiple selections the Contractor has once the project has bid. The Contractor selects PROJECTS/HISTORY [7300] then selects the project and from the "What would you like to do?" the following options are made available. The Contractor will have access to all projects in History and the following information as long as he has an active account with XYZBid.

1. VIEW PROJECT DETAILS 7301—same as described in FIG. 61.

2. REQUEST FOR INFORMATION 7302—same as described in FIG. 64.

3. REVIEW YOUR BID 7303—same as described in FIG. 69.

4. REVIEW YOUR CBS 7404—same as described in FIG. 66.

5. ORDER PLANS 7405—same as described in FIG. 62.

6. UPLOAD SUPPORTING DOCUMENTATION 7406—same as described in FIG. 68.

7. MANAGE CHANGE ORDERS 7407—same as described in FIG. 39.

8. ASSIGN PM TO MANAGE CHANGE ORDERS 7408—described in FIG. 74.

9. VIEW SUB BIDS 7409—same as described in FIG. 71.

Figure 74:
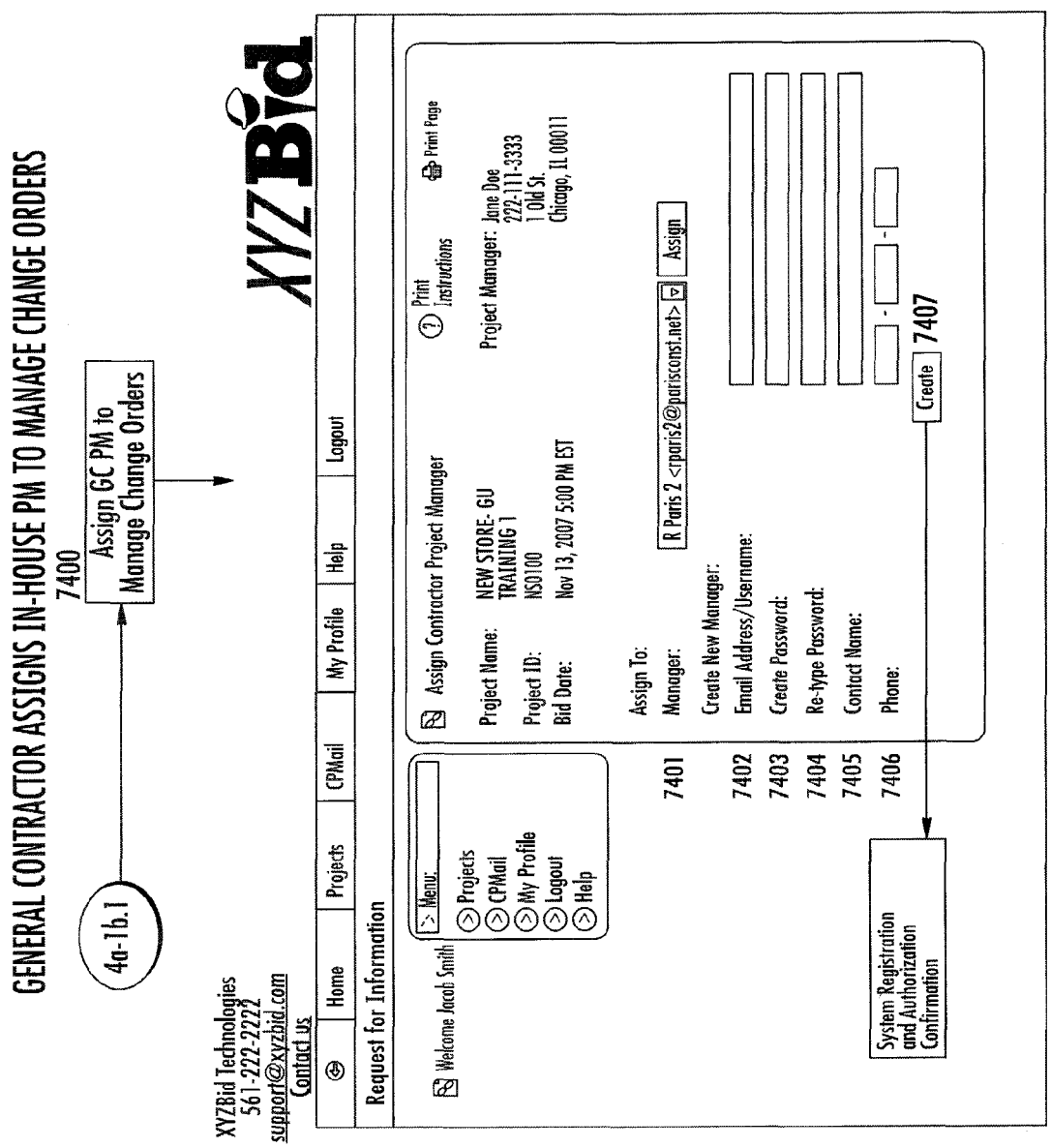

FIG. 74—FIG. 74 shows a screen shot of the page displayed when the Contractor selects ASSIGN GC PM TO MANAGE CHANGE ORDERS 7400. Many times the person who submitted the bid will not be the same person that manages the change orders. This option will allow the Contractor to ASSIGN [7401] a select PM for this task. The Contactor can select a PM from the drop down list that will include those individuals in their company registered at XYZBid or they can be entered manually. The Contractor then enters the PMs EMAIL ADDRESS 7402, CREATS A TEMPORARY PASSWORD 7403, RE-TYPES THE PASSWORD 7404 for validation, ENTERS THE CONTACT NAME 7405 of the PM and then the PHONE NUMBER 7406 and clicks the CREATE 7407 button. The assigned PM is notified via email that they have been assigned to manage the change orders for that particular project. The system then authorizes the assigned PM to login to XYZBid and manage the change orders.

Figure 75:
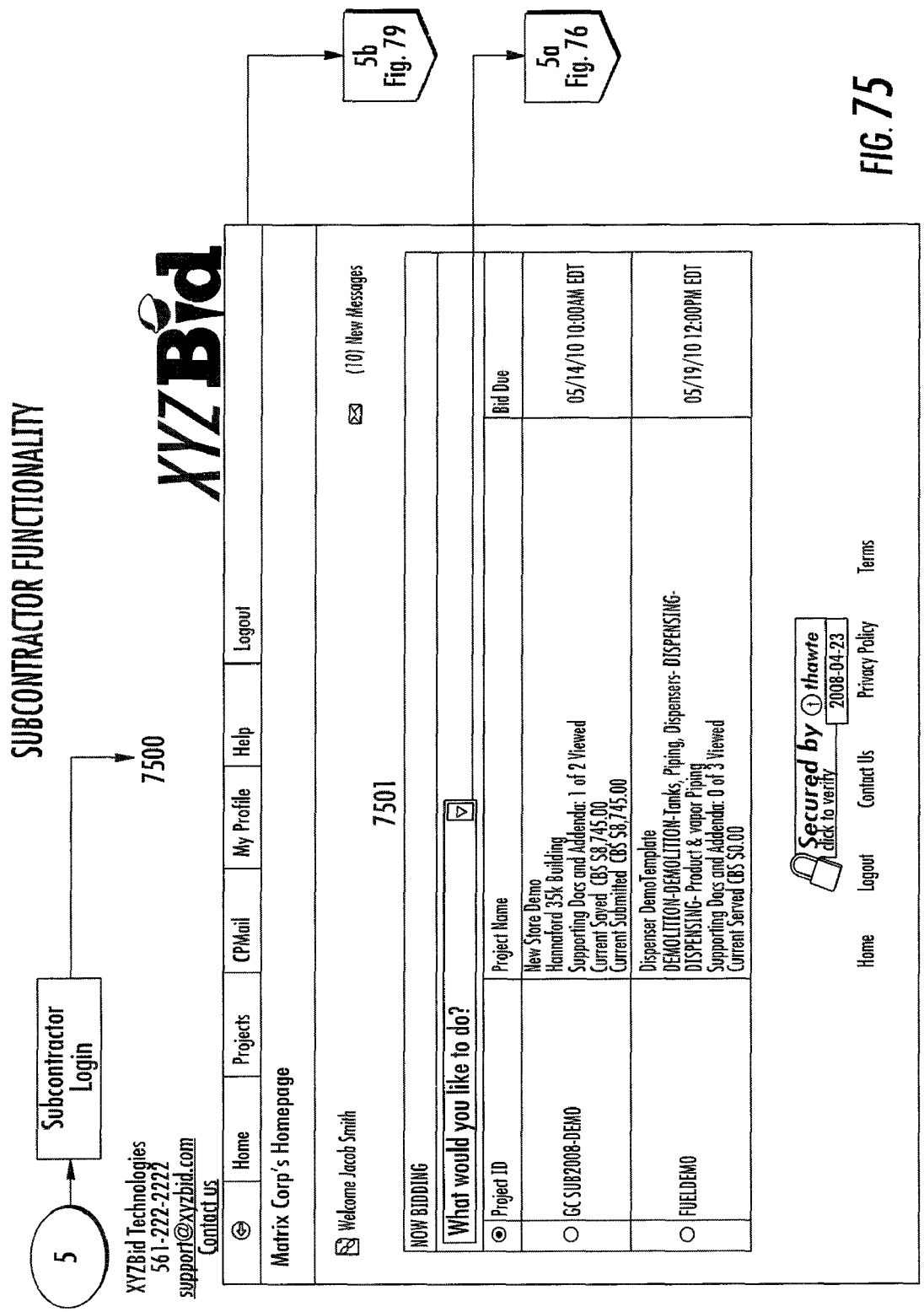

FIG. 75-FIG. 75 shows a screen shot of the SUBCONTRACTOR FUNCTIONALITY 7500. As with the Contractor, the Subcontractors have their own MENU as described in FIG. 79 and WHAT WOULD YOU LIKE TO DO? 7501 drop down list of options as described on FIG. 76. The system also displays each project with the Project ID, Project Name, Number of Supporting Documents Viewed, current Saved CBS and Submitted amount.

Figure 76:
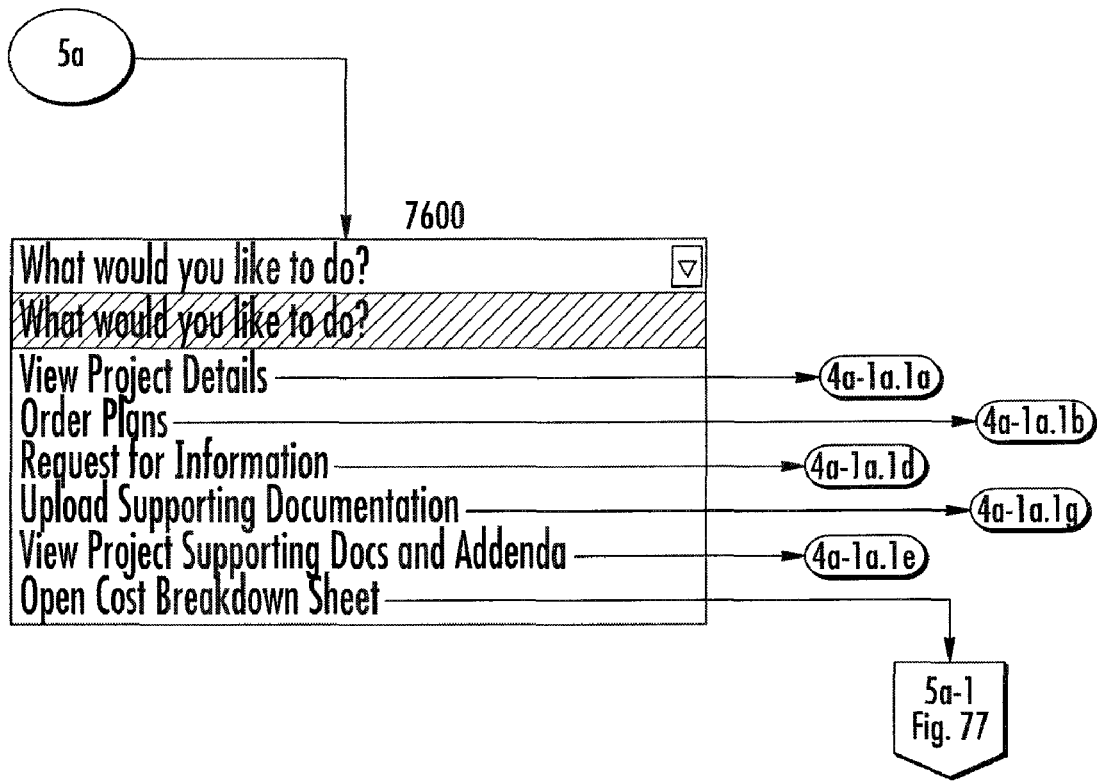
FIGS. 76-80 illustrate the Sub Contractor flow chart functionality and screen shots. This section starts off with a screen shot of the Sub Contractor's home page at XYZBid.com. From here the Sub Contractor can navigate the system through selections at the main menu and the "What would you like to do?" drop down selections.

FIG. 76-FIG. 76 shows a screen shot of the SUBCONTRACTOR WHAT WOULD YOU LIKE TO DO? 7600 drop down list and functionality links to other Figures as described herein.

Figure 77:
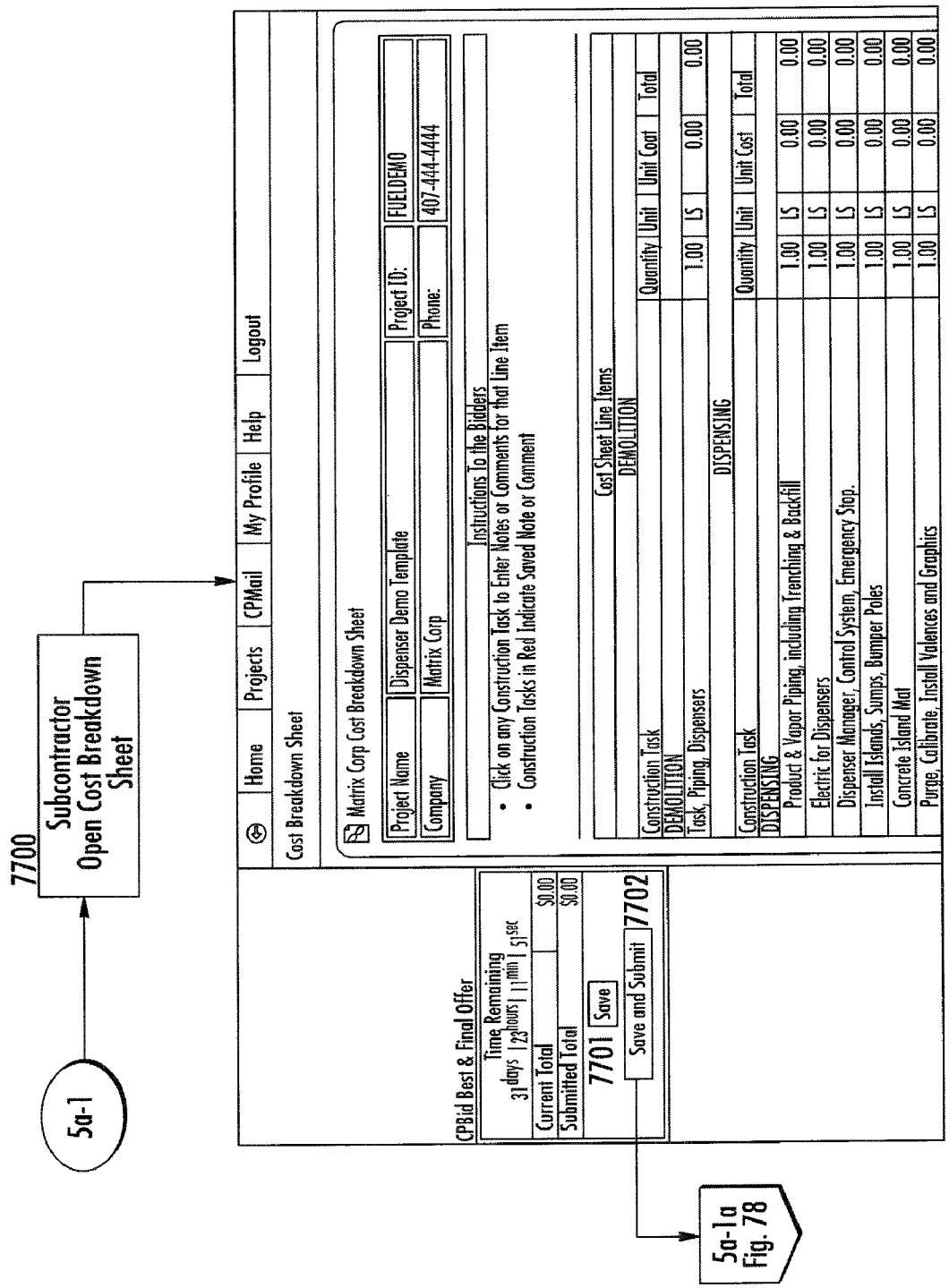

FIG. 77-FIG. 77 shows a screen shot of the SUBCONTRACTOR OPEN COST BREAKDOWN SHEET selection 7700. As with the Contractor, the Subcontractor's Cost Breakdown Sheet is interactive in that they can enter their line item numbers and the system will keep a running total of all entries. The Subcontractor can SAVE [7701 the bid sheet and return to work on it at any time prior to the bid due date and time. When the Subcontractor is ready to submit the bid, he selects the SAVE AND SUBMIT 7702 button. The process that follows is shown on FIG. 78.

Figure 78:
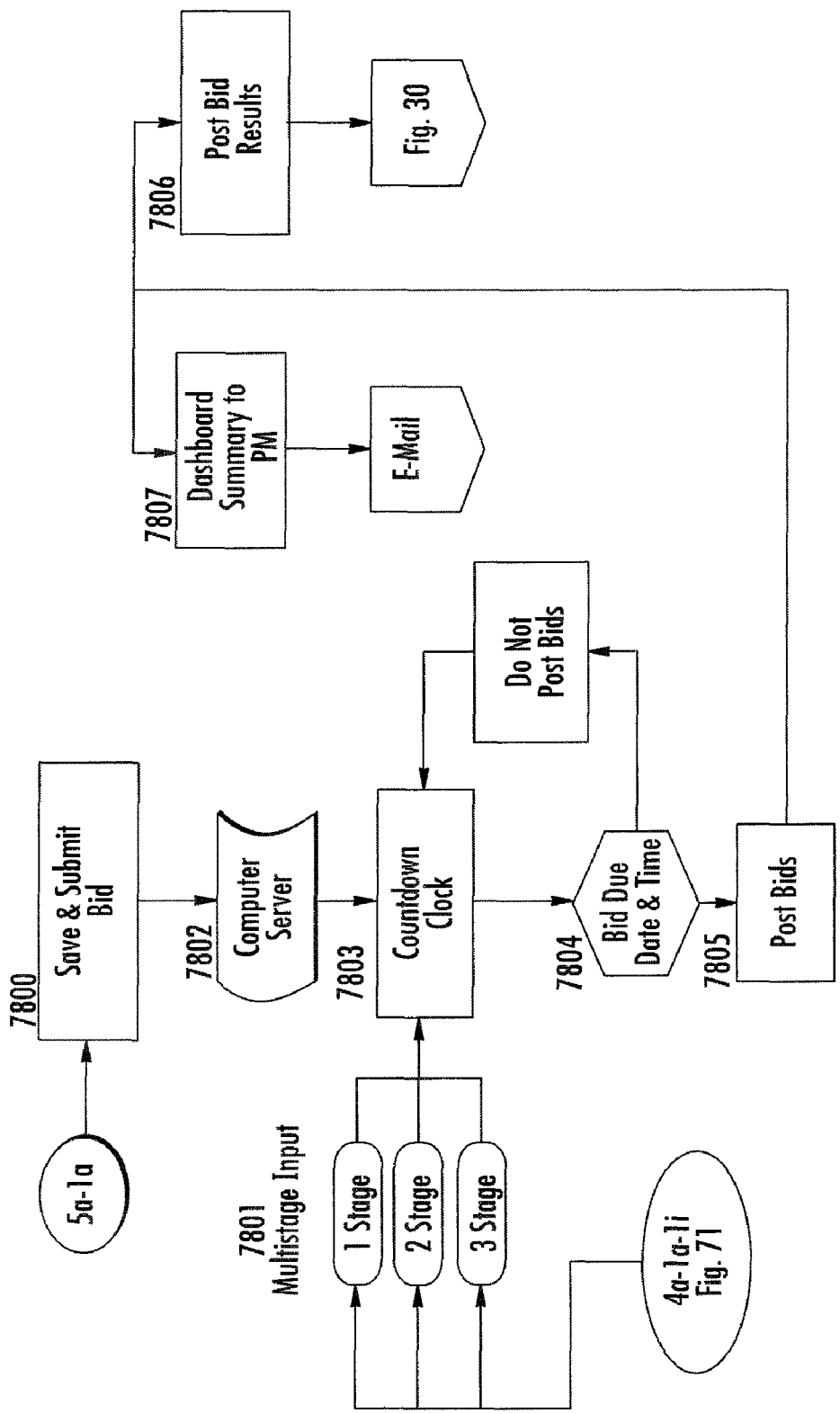

FIG. 78-FIG. 78 shows the process that takes place after the Subcontractor selects the SAVE AND SUBMIT 7800 button associated with his Cost Breakdown Sheet. All submitted bids are sent to the SYSTEM COMPUTER SERVER 7801 and stored until the bid due date and time. The system accounts for all projects bidding and an individual MULTISTAGE INPUT 7802 to the COUNTDOWN CLOCK 7803 is provided. If the project is a single stage bid, the system is coded to end the Best and Final Offer as the preset BID DUE DATE AND TIME 7843. When the countdown clock reaches zero, the bid results are POSTED 7805 to the Project Mangers History Folder where he can access the BID RESULTS 7806. At the same time a DASHBOARD SUMMARY 7807 is sent to the PM and management, as specified.

Figure 79:
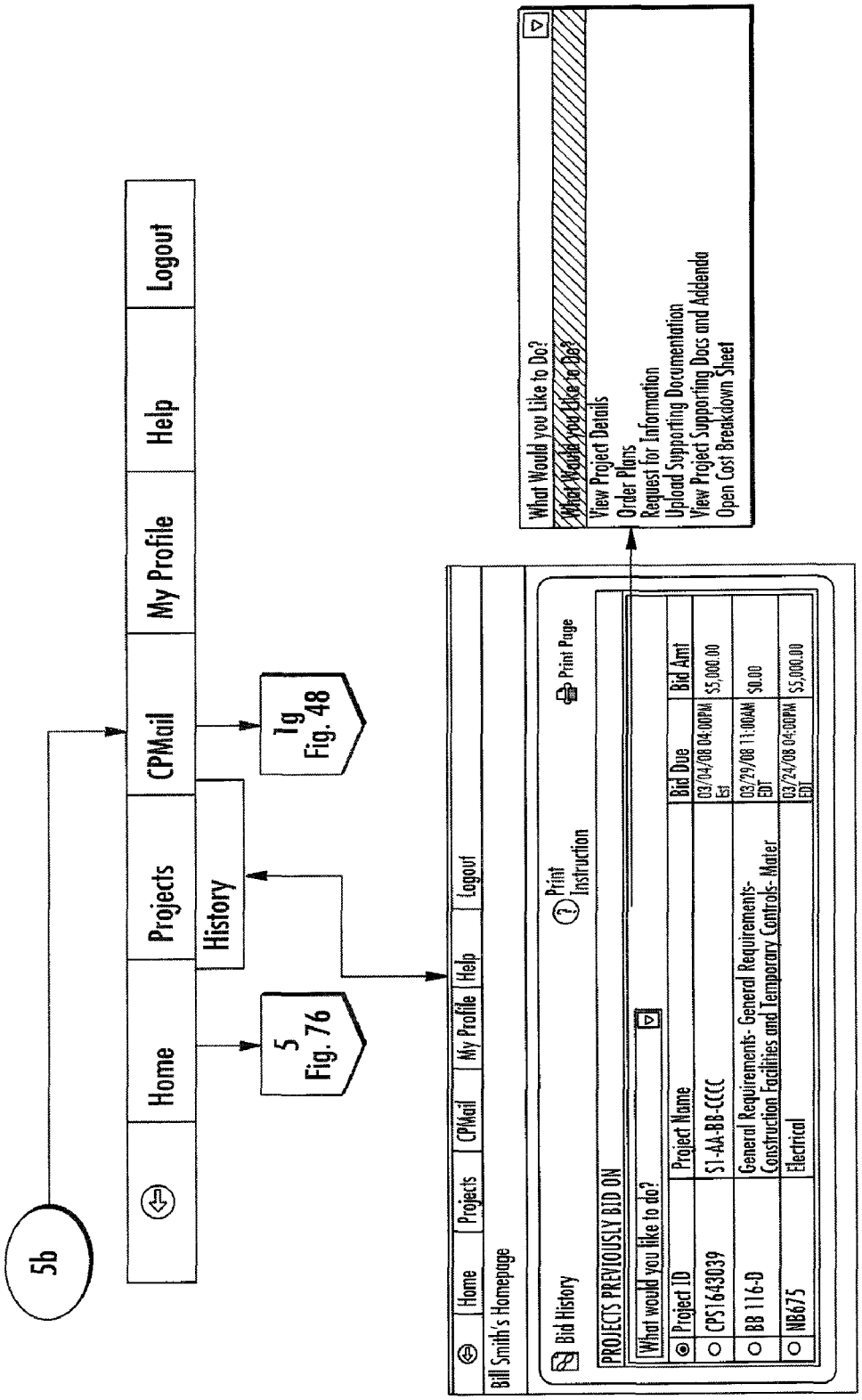

FIG. 79 shows a screen shot of the Subcontractor selecting Projects/History from the main menu. This will allow the Subcontractor to view all projects that he has bid at XYZBid. The Subcontractor selects the project and then from the WHAT WOULD YOU LIKE TO DO? drop down list selects the any of the options whose functions have been previously described for similar options at the Contractor's home page at XYZBid.

Another embodiment of the present invention is described herein after.

Figure 80:
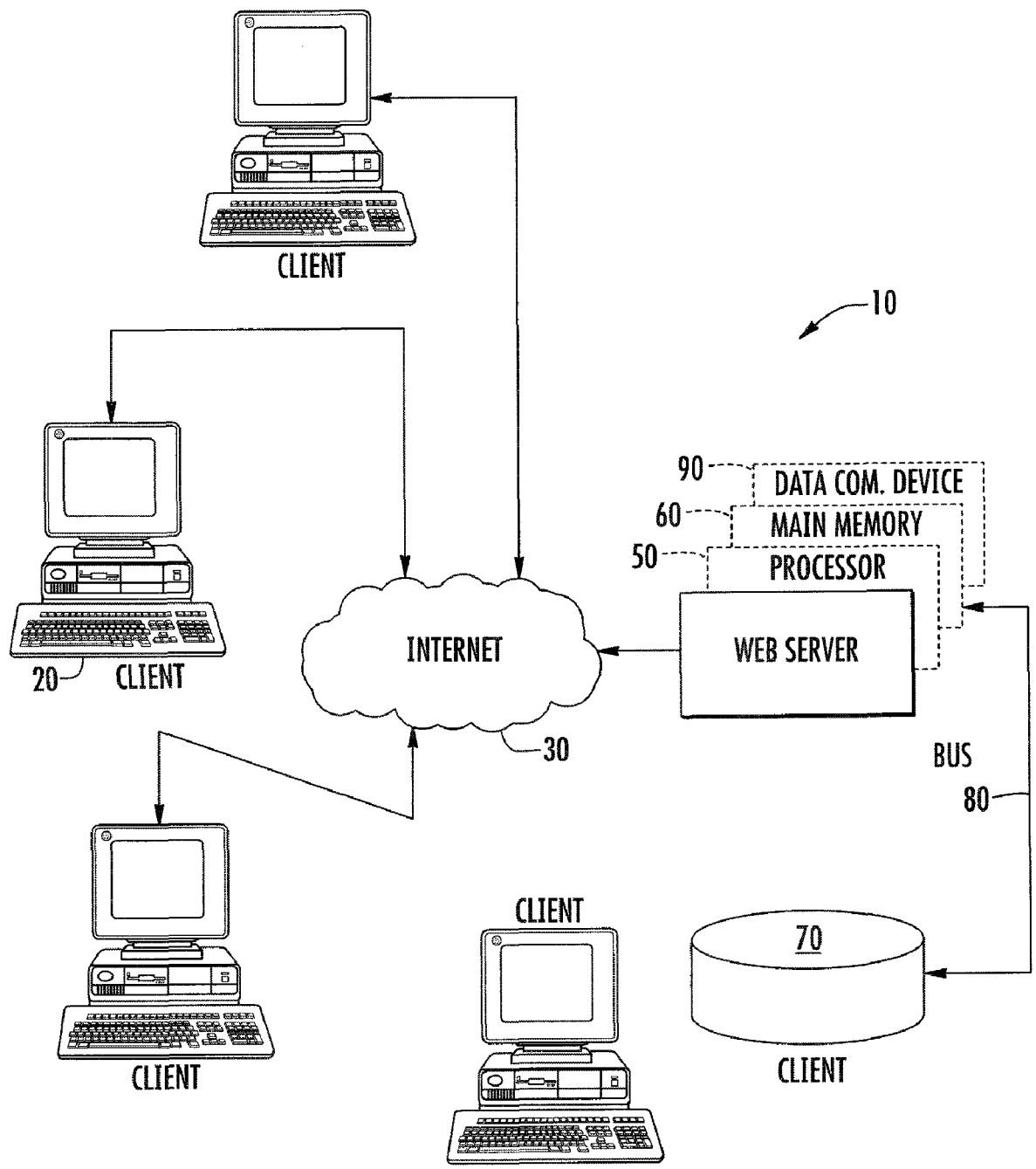

The present invention is characterized by bid-auction platform software, written in a number of different programming languages, possibly including but not limited to HTML, JAVA, JSP, PHP, ASP, VisualBasic, Javascript, and Cascading Style Sheets. The software is intended to be run off of a server, possibly configured with an open port to the Internet, allowing access to multiple clients at the same time. A representative computerized system 10 in which the present invention operates is shown in FIG. 80. The computerized system 10 uses a client-server model, including a plurality of clients 20 connected to a Web server 40 through a computer network, preferably the Internet 30, although the computerized system 10 may operate on an intranet or extranet as well. The Web server 40 has a processor 50 for processing instructions and an area of main memory 60 for executing program code under the direction of the processor 50.

The computerized system 10 also includes at least one relational database 70 for storing data. The relational database 70 may reside in an area of disk storage on the Web server 40 or may reside on a remote database server accessible by the Web server 40. The client computers 20 have a Web browser operable thereon for receiving and viewing documents written in Hypertext Markup Language (HTML) and transmitted over the Internet 30 via Hypertext Transfer Protocol (HTTP) by the Web server 40 and transmitting requests for HTML documents to the Web server 40 via HTTP.

The present invention includes software program code stored on the Web server 40 for a system and method for auctioning bids on construction projects, which is accessible to a client computer 20 through the Internet 30. The computer code may be written in JAVA (Java is a trademark of Sun Microsystems), HTML, XML or Microsoft's Active Server Pages (ASP), PHP, JAVA Server Pages (JSP), and includes code for a system and method for auctioning bids on construction projects.

Figure 81:
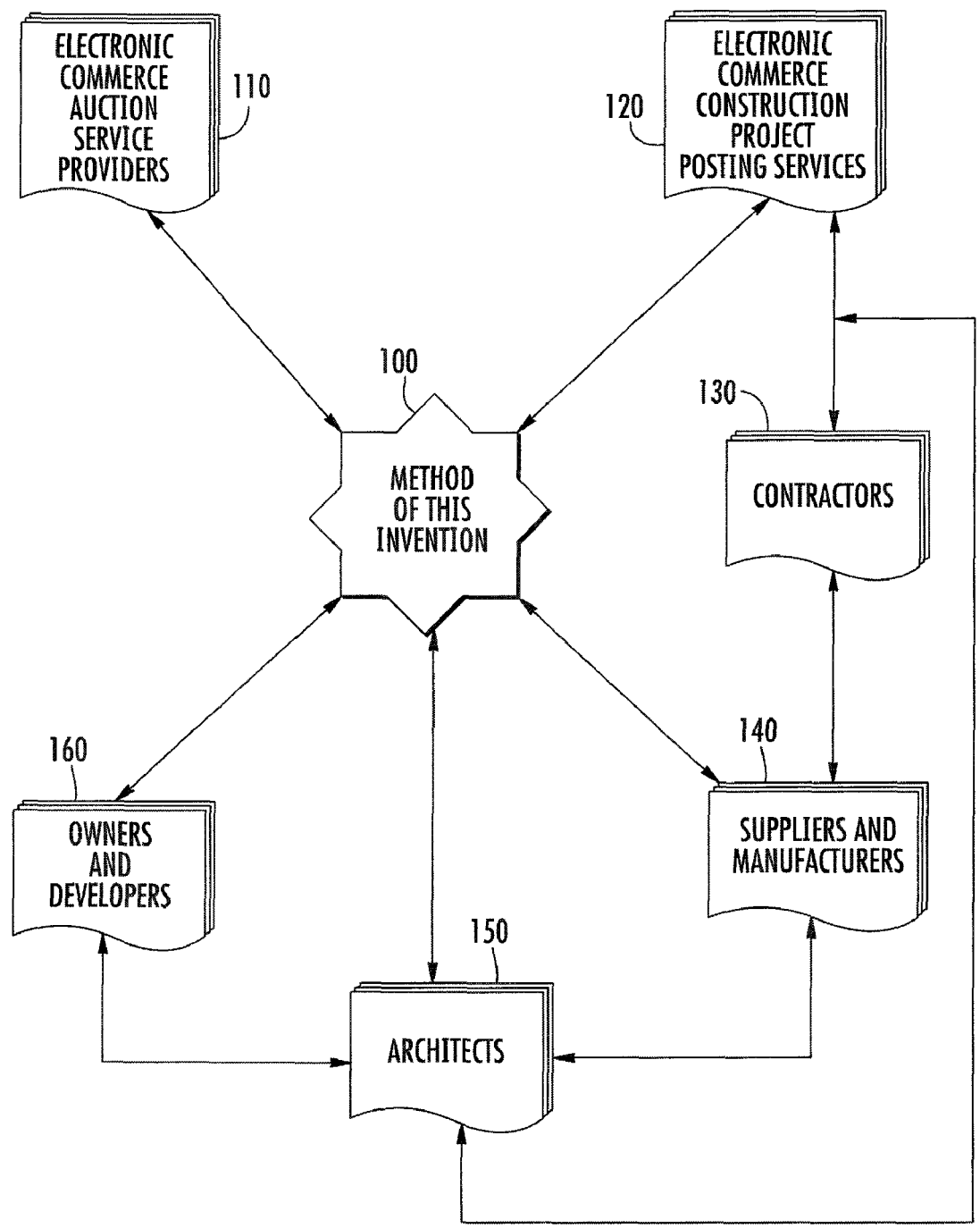
FIG. 81 is a block diagram showing the participants in a system and method for auctioning bids on construction projects.

FIG. 81 illustrates the persons involved with the overall method 100 of the invention. These persons include electronic commerce auction service providers 110, electronic commerce construction project posting services 120, contractors 130, suppliers and manufacturers 140, architects 150 and owners and developers 160. Electronic commerce auction services providers 110 and electronic commerce construction project posting services 120 exist with minor modification required. These include electronic commerce auction sites similar to E-Bay and Ubid as well as electronic commerce construction project posting services similar to FWDodge.com and CDCNews.com. Contractors 130 include qualified general contractors and subcontractors nationwide and owners, and developers 160 of building construction projects. Architects 150 include architectural firms who most often manage owner and developer 160 projects, provide design services and develop plans and project specifications, while suppliers and manufacturers 140 provide materials to these contractors 130 in support of their projects.

The computer program code can be broken down into eight overall steps and includes a means for entering into the computerized system 10 and validating member credentials 170, a means for accessing the construction projects and registering to bid on the construction projects 180, a means for providing the computerized system 10 information relative to a type of contract the construction projects will have 190, a means for sorting, accepting and rejecting bids for the construction projects 200, a means for posting the low bid and comparing all competitive bids to an owner's budget 210, a means for having the low bid be reviewed by an owner 160 and architect 150 of the construction projects 220, a means for having nonmember contractors 130 applying to bid on construction projects 230 and a means for having nonmember contractors 130 selecting geographic areas of participation and issuance of identification and password selection 240. These steps are also described in detail in the subsequent figures and text.

Figure 82:
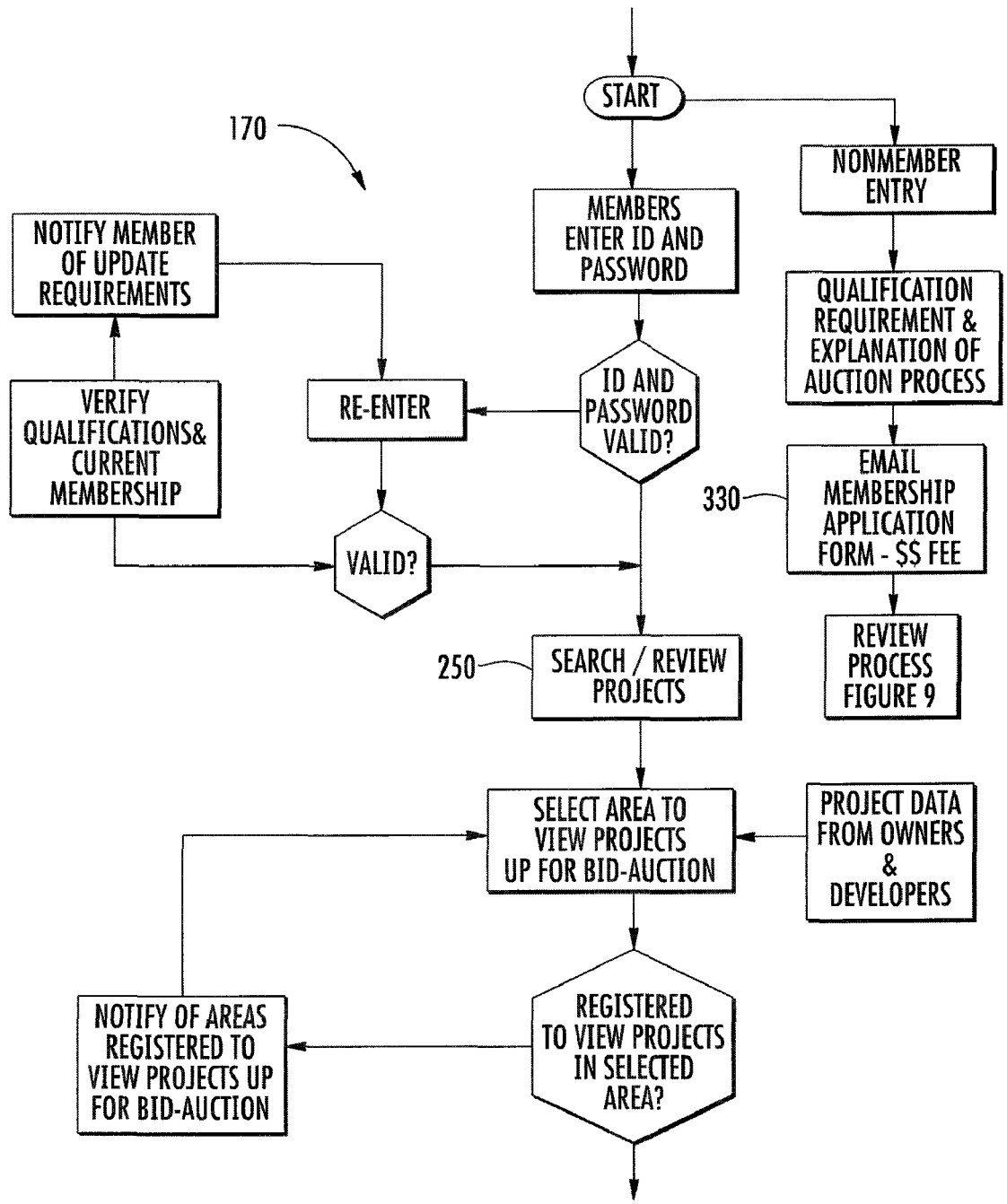
FIG. 82 represents a flowchart illustrating entry into the computerized system, password and identification validation and entry into a project room.

FIG. 82 is a flowchart illustrating entry into the computerized system 10, password and identification validation as well as entry into "the project room" 250. FIG. 3 depicts a means for entering into the computerized system and validating member credentials 170. Once on-line, member contractors 130 will enter their identification word and password and the computerized system 10 will check each identification word and password for validity. If invalid, the member contractor 130 will be asked to reenter his identification word and/or password, whichever is incorrect. The computerized system 10 will again check each for validity and if correct, the member contractor 130 will be authorized to proceed. If the query still shows an invalid entry, the computerized system 10 will verify qualifications and cur-rent membership and notify the member contractor 130 of update requirements and will allow the member contractor 130 to proceed once these are corrected.

If the identification word and password were valid on the first entry, the computerized system 10 will allow him to enter the project room 250 or proceed directly to the auction room 260. In the project room 250, the member contractor 130 will select the state to view projects up for auction. Project data will be provided from owners and developers 160 throughout the geographic extent and all geographic areas will be posted for member contractor 130 selection. When an area is selected, the information will be processed to validate if the member contractor 130 is registered to view projects in a selected area. If he is not registered for the area selected, the computerized system 10 will notify him of the geographic areas he is authorized to participate in and allow him to reenter his selection. Selection of an area that the member contractor 130 is authorized to view projects up for auction will initiate viewing of sub-areas within the particular area, as is depicted in FIG. 4. The registration process for nonmember entries is also discussed in greater detail in FIG. 9.

Figure 83:
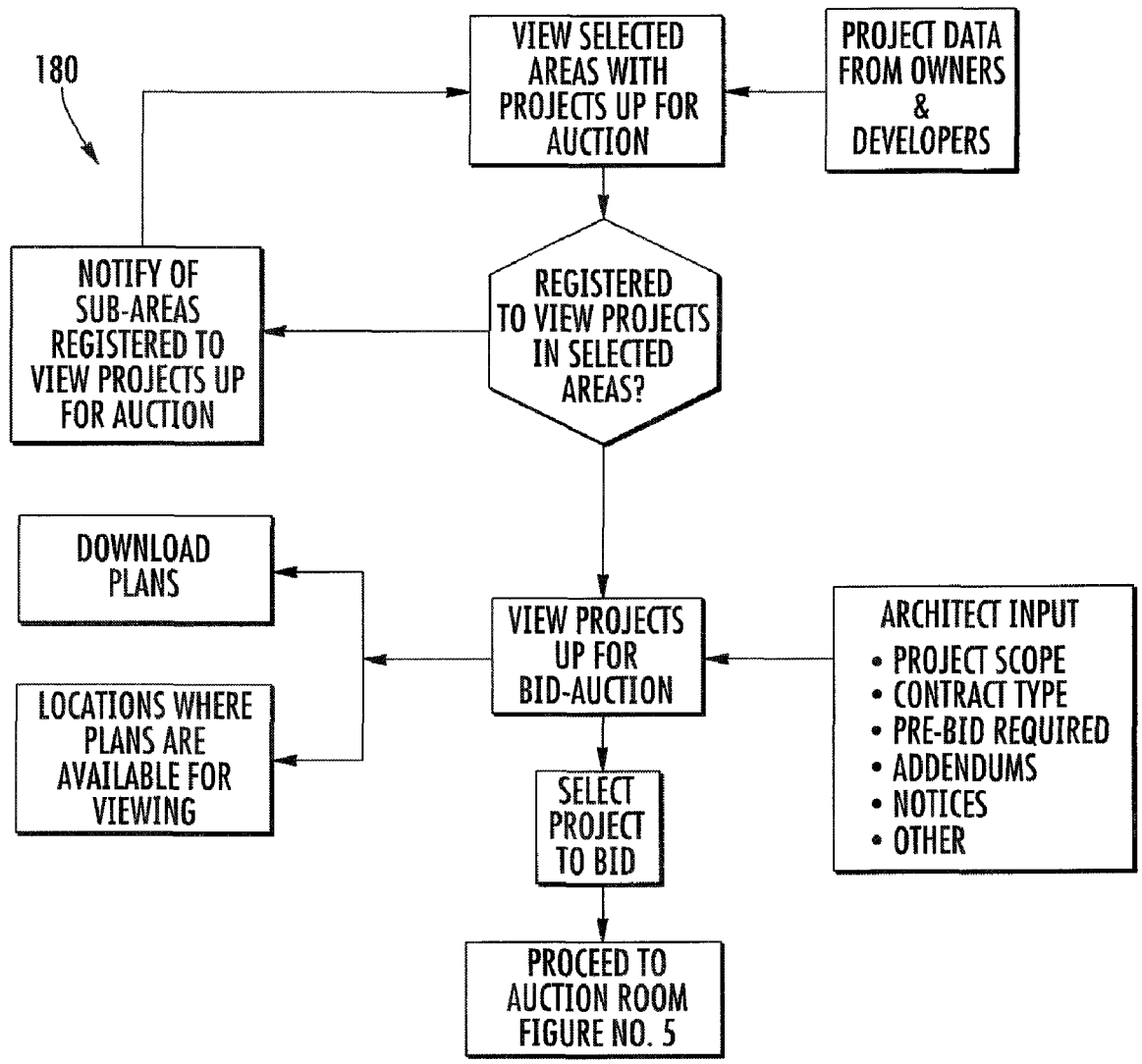
FIG. 83 is a flowchart illustrating how members access the viewing of construction projects, download plans and register to bid on selected projects.

As is shown in FIG. 83, a member contractor 130 can be registered in any number of geographic areas he so desires. FIG. 4 illustrates the means for accessing the construction projects and registering to bid on the construction projects 180. Selection of an area will also be processed for validity of registration. If the member contractor 130 is not registered for the geographic area selected, the computerized system 10 will notify him of the areas he is registered in. Correct selection of a geographic area will allow the member contractor 130 to view all of the construction projects up for auction in that particular area. Combined with owner and developer 160 project information, architect 150 input will also be provided regarding project addendums, notices and other pertinent information to the project.

While viewing the projects up for auction, the computerized system 10 will allow the member contractor 130 to download plans or find out where plans are available for viewing. At this time, the computerized system 10 will allow for the member contractor 130 to select any particular project or projects to bid on. Selection may require the member contractor 130 to register to bid on the project. This registration information would be recorded and stored for recall on the day of the auction. Once registered, the member contractor 130 can exit or proceed directly to the bid-auction room 260.

Figure 84:
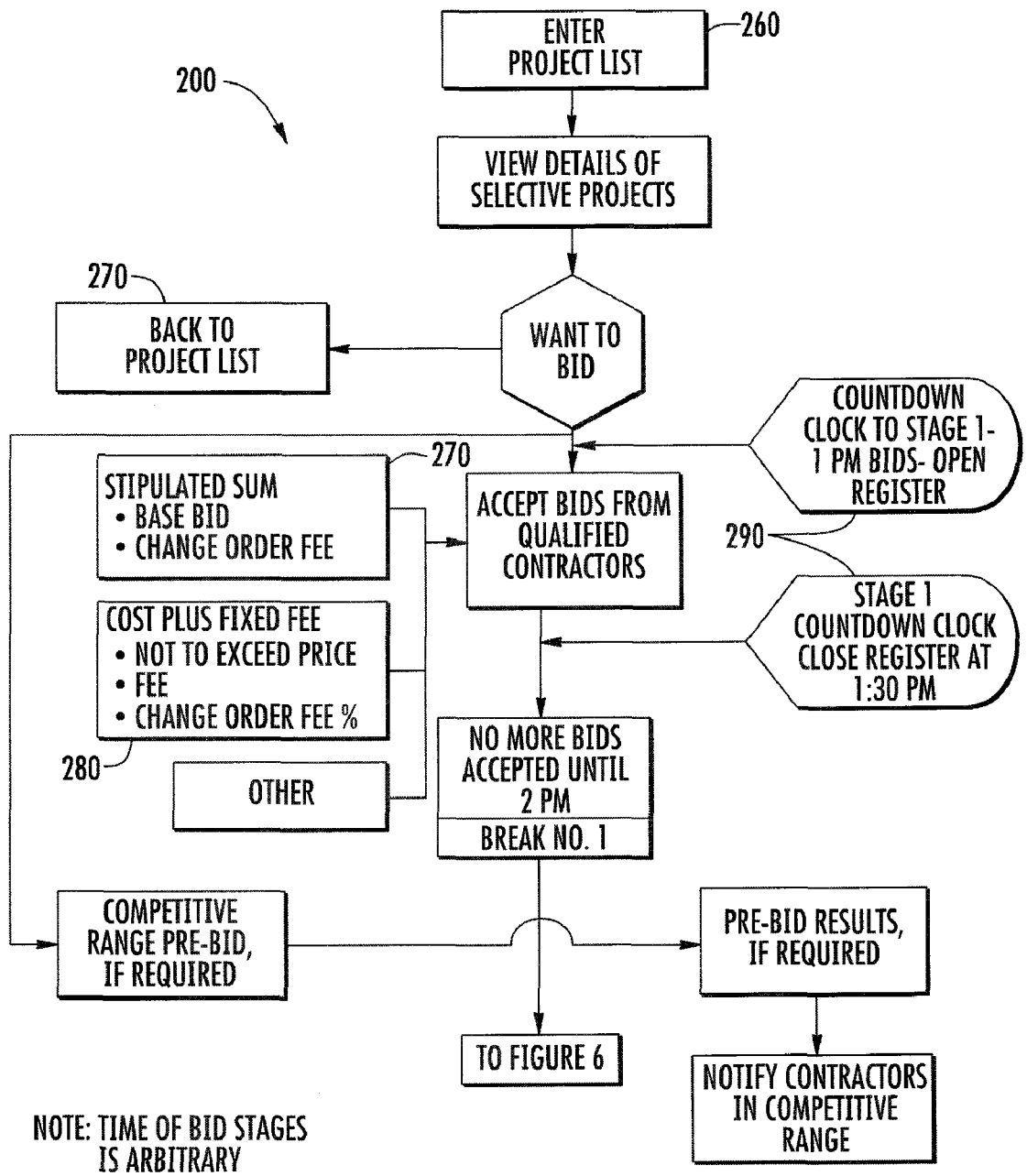
FIG. 84 is a flowchart illustrating the start of the multistage bid-auction process (in this example, 3 stages are demonstrated), how the system provides information relative to the type of contract the project will have, how the first half hour of the bidding process starts and stops and how bids are sorted, accepted and rejected.

According to FIG. 84, once in the bid-auction room 260, the computerized system 10 is designed to allow for owners and developers 160, to stipulate the type of contractual vehicle they want for any particular project. As illustrated in FIG. 84, the member contractor 130 will vie for the type of contract for the project selected to be bid on. As further depicted in FIG. 84, the means for providing the computerized system 10 information relative to a type of contract the construction projects will have 190 is shown. Types of contract information may refer to stipulated sum 270, cost plus fixed fee 280 or any other type of contract desired by the owner and developer 160. The member contractor 130 will be asked if he wants to bid on the contract. If so, the contractor may be required, at the option of the owner, to participate in a single-stage pre-bid process in order to determine if he is in the owner's competitive range. This process will take place on a date and time specified by the owner. At the completion of the pre-bid process, the owner will be provided with the pre-bid results. Those within the competitive range will be allowed to participate in the following multi-stage auction process.

Figure 85:
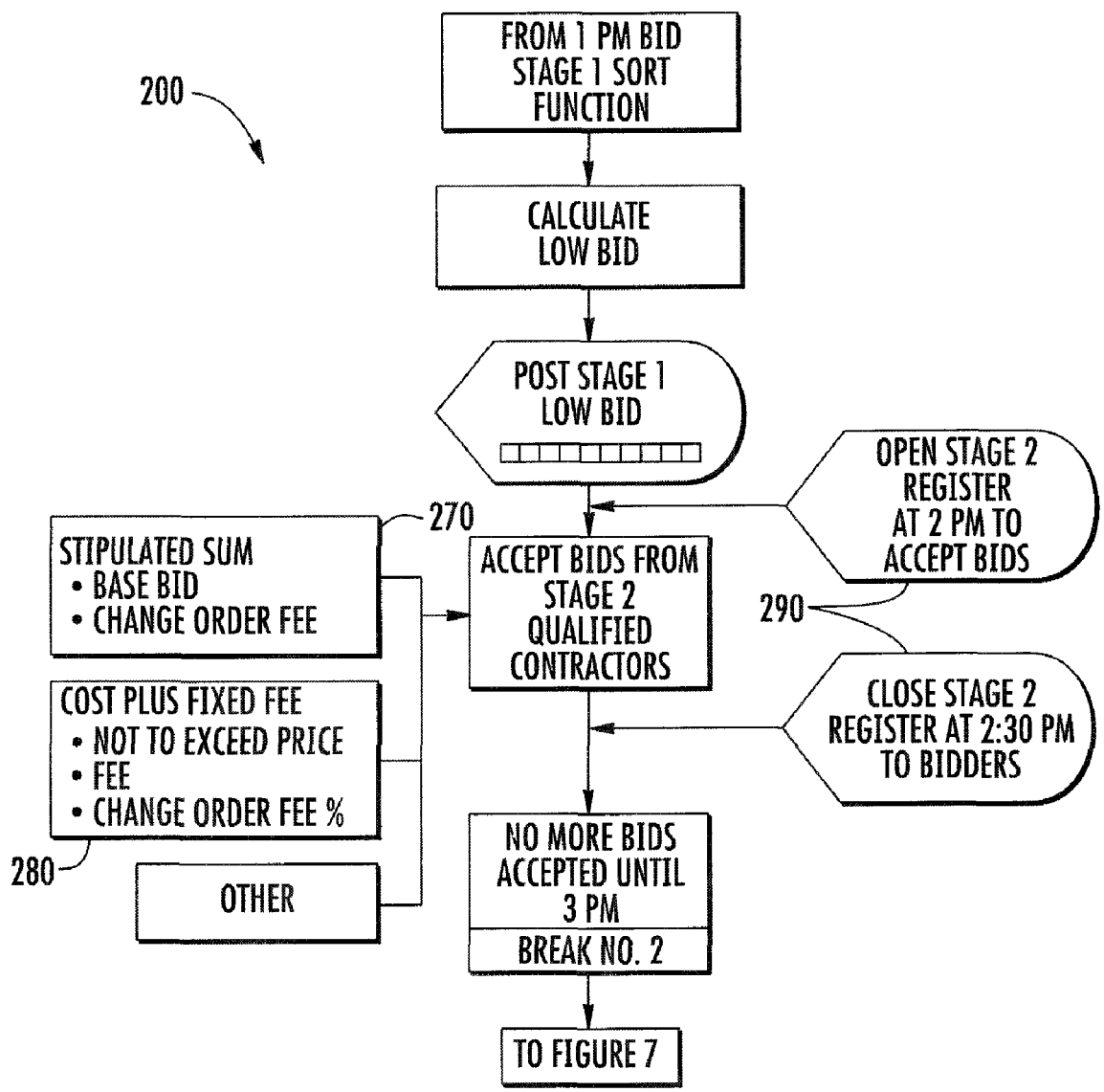
FIG. 85 is a flowchart illustrating how accepted bids are processed to post the lowest bid, how the second phase of bidding from 2:00 PM to 2:30 PM starts and stops and how again the lowest bid is posted for that stage.
Figure 86:
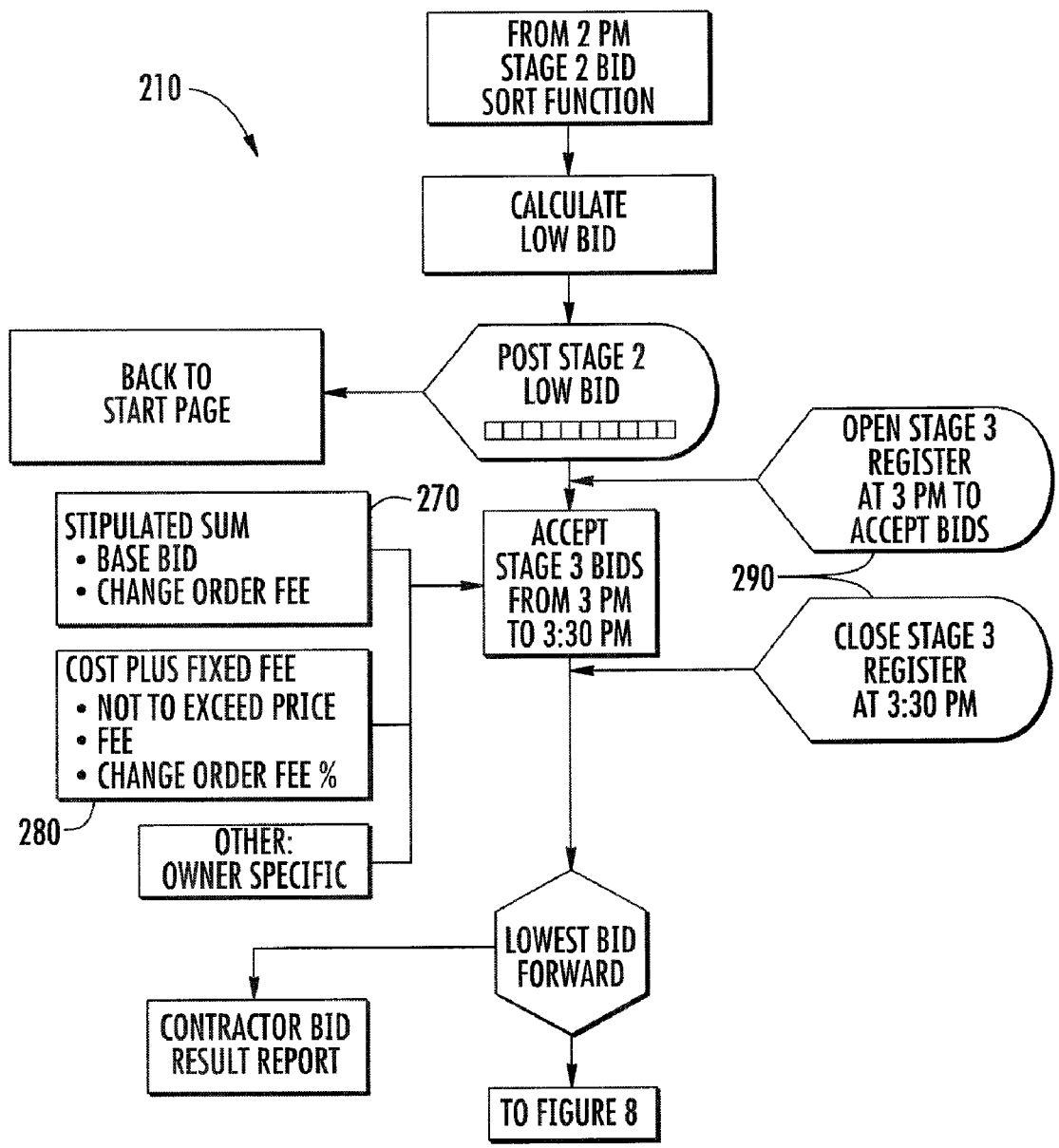
FIG. 86 is a flowchart illustrating the posting of a 3:00 PM bid, submission of the best and final offer, sorting of bids and rejection of all but the lowest bid.
Figure 87:
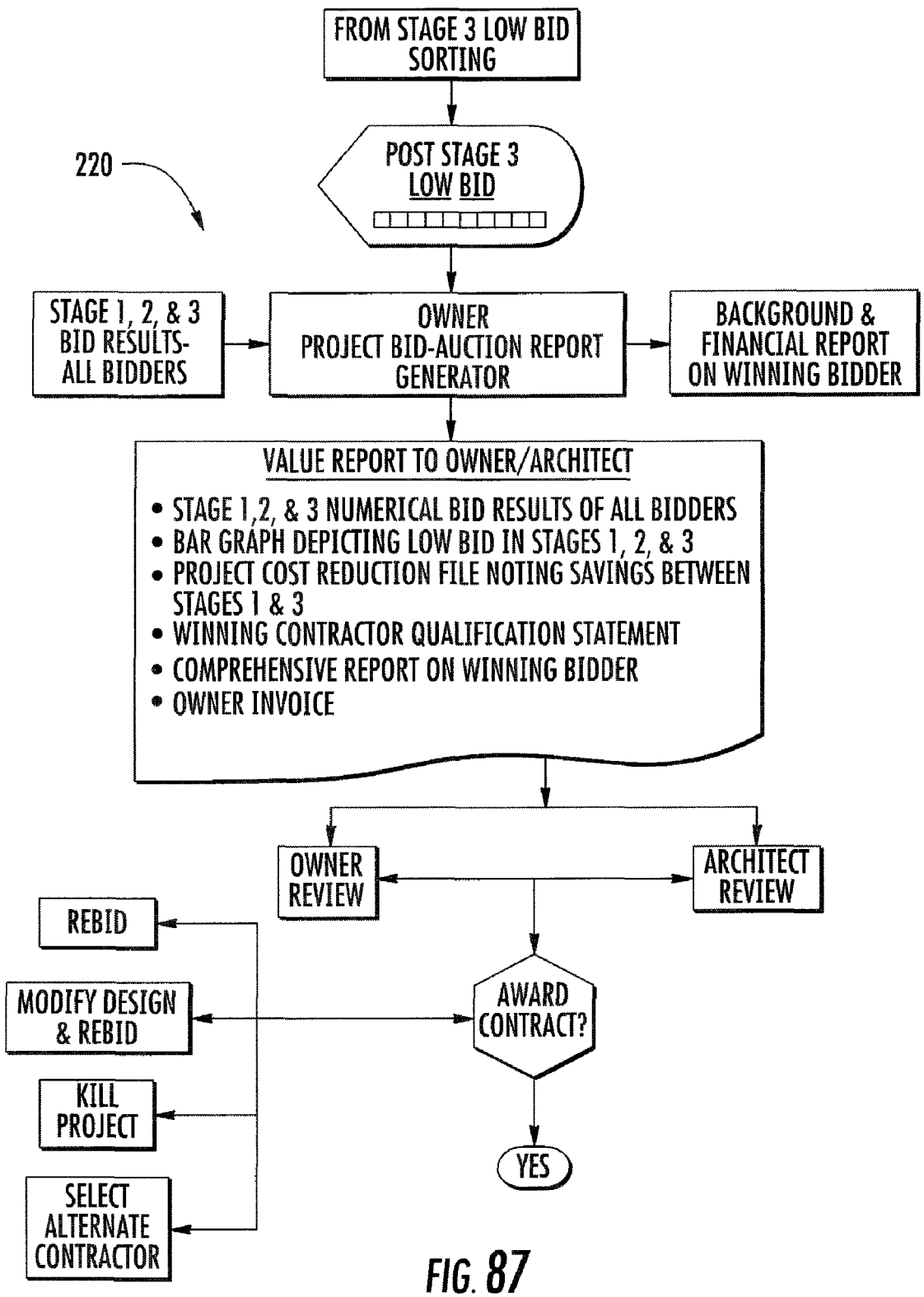
FIG. 87 is a flowchart illustrating the posting of the low and winning bid, comparing the winning bid to budget, with final member qualification query, owner and architect provided a comprehensive Project Report for their review, whereas the owner can then make a decision to rebid, modify the design and then re-bid the project, kill the project or decide to award the project.

As outlined in FIG. 85, FIG. 86 and FIG. 87, there are three default time slots for bidding a project, Stage 1, 1:00 PM-1:30 PM, Stage 2, 2:00 PM-2:30 PM and Stage 3, 3:00 PM-3:30 PM. The time and duration parameters are fully customizable by the owner. FIG. 85 depicts the means for sorting, accepting and rejecting bids for the construction project 200. FIG. 86 depicts the means for posting the low bid and comparing all competitive bids to an owner's budget 210. FIG. 87 depicts the means for having the low bid be reviewed by an owner and a developer 160 and architect 150 for the construction project 220. The system 10 will provide a countdown clock 290 that will open registers at 1:00 PM to qualified member contractors 130 who have registered to bid on the project. For Stage 1, they will enter their bid between 1:00 PM and 1:30 PM. If this is a stipulated sum 270 type of contract, the member contractor 130 will be required to enter his base bid for the project. If it is a cost plus fixed fee 280 type of contract, the member contractor 130 will provide pricing in two fields. First will be a not to exceed price that the member contractor 130 guarantees the owner and developer 160. If the cost of the project goes over this cost, it will be at the member contractor's 130 expense. Second will be the fee the member contractor 130 will charge to complete the project.

At 1:30 PM, the Stage 1 register closes to all bids. The computerized system 10 alerts member contractors 130 that no more bids will be accepted until Stage 2 begins at 2:00 PM. Note that bids cannot be withdrawn once entered and will be rolled to the second and third slot bidding if no bid is entered during these time frames. When the 1:30 PM bidding register closes, bids are sorted and the low bid is posted.

This alerts the remaining bidders of their competitive positions in preparation for the next auction stage. At 2:00 PM the Stage 2 register opens and accepts the contractors' bids for Stage 2. Bidders again would enter their numbers in an effort to be the low-bidder of Stage 2. At 2:30 PM, the register is closed to all bidding. Bidders are notified that the next stage for bidding this project will be at 3:00 PM. With most other auctioning services, the high bid is the winner. However, this computerized system 10 is designed to select the low bidder in all instances. The low bid is posted at the end of Stage 3. The computerized system 10 then adds this number to the project report, which is available electronically to the owner and developer 160 and architect 150 for review. If the number is within budget, the member contractor's 130 qualification and membership requirements are again validated. The project report will allow the owner and developer 160 to further evaluate the bid results and the qualifications of the low-bidder. Once all issues are resolved, a decision will be made by the architect 150 and owner and developer 160 whether to award a contract, rebid the project, modify the design and then re-bid the project, or kill the project.

Figure 88:
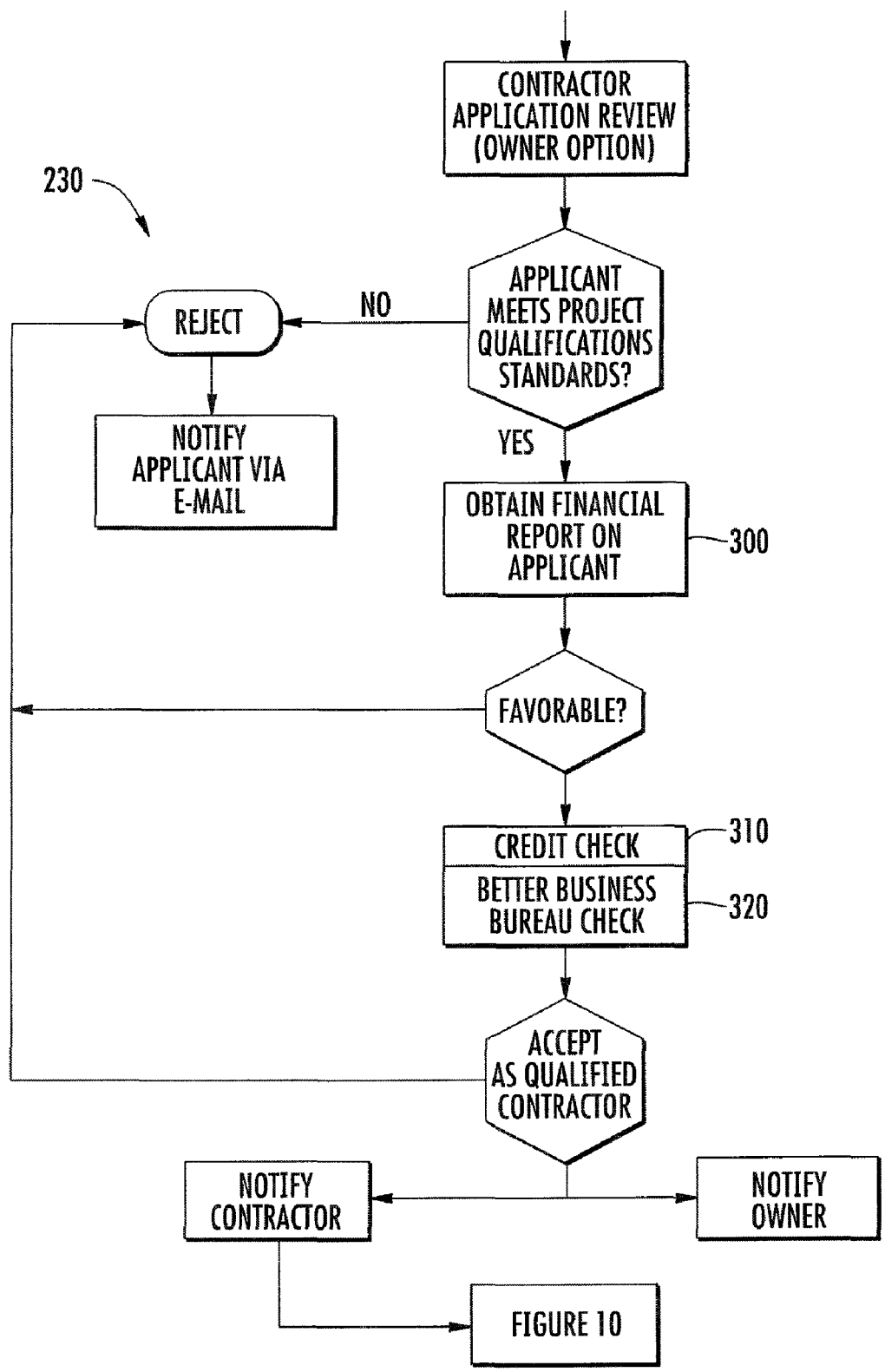
FIG. 88 is a flowchart illustrating a non-member application process.
Figure 89:
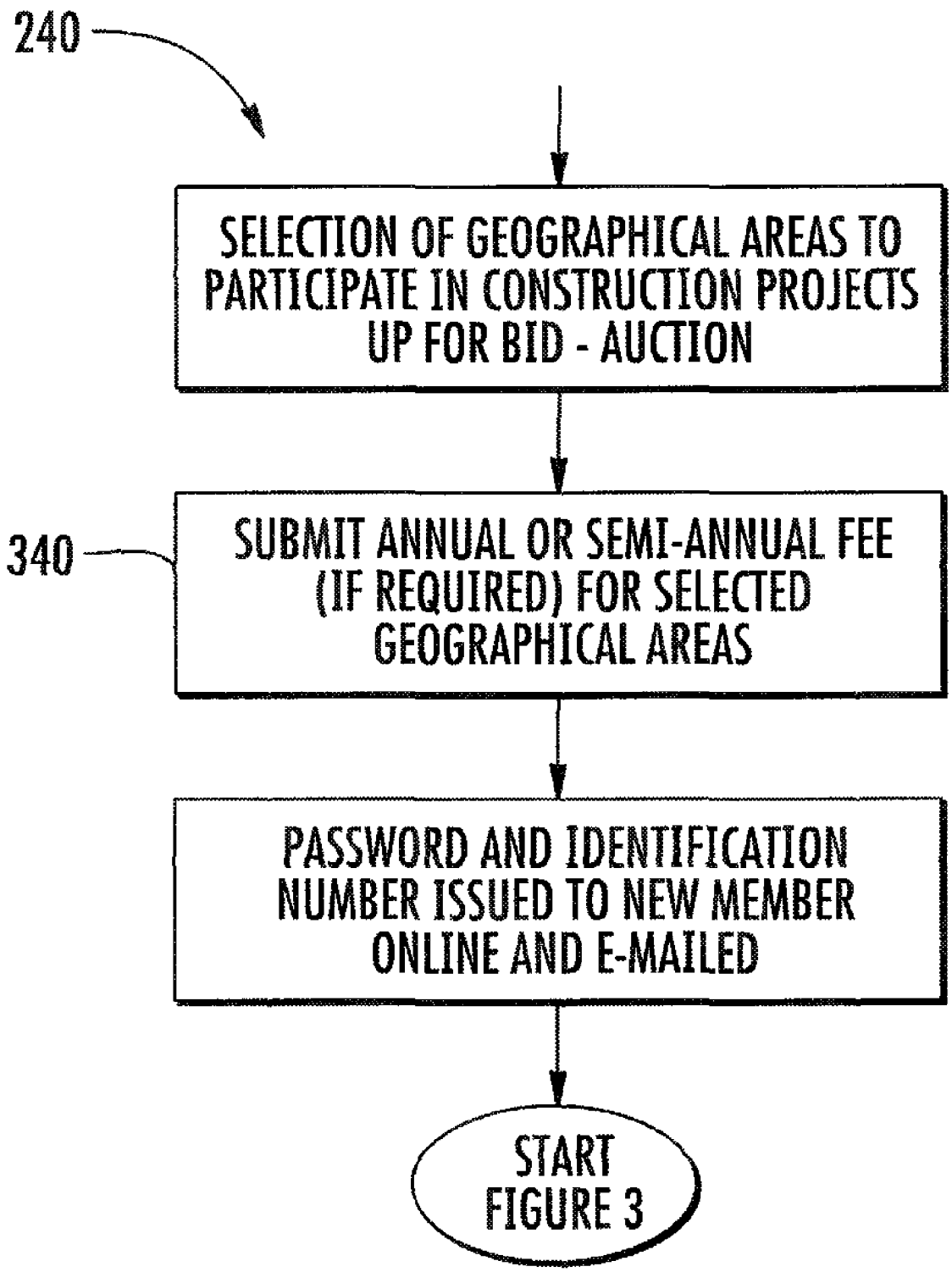
FIG. 89 is a flowchart illustrating a new applicant selecting new projects in specific states and counties and issuance of identification and password selections.

Once online, contractors who are not members and would like to join will select the nonmember entry feature originating in FIG. 82. As detailed in FIG. 88 and FIG. 89, an explanation of the qualification standard requirements, insurance requirements and auction process will be defined in detail. FIG. 88 depicts the means for having nonmember contractors 130 applying to bid on a construction project 230. FIG. 89 depicts a means for having nonmember contractors 130 selecting states and counties of participation and issuance of identification and password selection 240. If the prospective member selects to apply for membership, he will be required to complete an application form (not shown) covering AIA type qualification questions, insurance certificate requirements and other information pertinent to the application. Once submitted for review, the application will be placed on file for an owner and developer 160 to review to see if the applicant meets the required AIA qualification standards. If the participant is successful in the bidding process, a comprehensive report from Dunn and Bradstreet 300 or similar report will be added to the project report for the owner's and developer's 160 review. Once the applicant is accepted as a member, he will be required to select the states and counties he would like to participate in. Once selected, the new member may be required to submit a membership fee 330 and state/county participation fee 340. The member will then issue an identification word and password for future entry into the computerized system 10.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A computer-implemented project management system for multi-stage bidding on construction projects comprising:
   a technology infrastructure, said technology infrastructure including components which are constructed and arranged to receive, store and exchange information;
   a coordinating infrastructure coupled to said technology infrastructure, said coordinating infrastructure including components constructed and arranged to coordinate bids between owners, architects, developers, general contractors, subcontractors, suppliers, wholesalers and product manufacturers on at least one of a plurality of construction projects utilizing information stored in said technology infrastructure, said coordinating infrastructure including:
   an input device in communication with said project management system to provide entry into said project-management system and validating a bidder's credentials, said bidders including said general contractors, said subcontractors said suppliers, said wholesalers and said product manufacturers;
   said input device in communication with said project management system to access said construction projects, planning locations and registering to bid on said construction projects;
   said input device in communication with said project management system to provide information relative to a type of contract associated with said construction projects;
   said input device in communication with said project management system to provide a optional pre-bid stage to determine if said bidders are within a competitive range established by said owner and disqualifying said bidders that are not within said competitive range;
   said input device in communication with said project management system to provide a multi-stage auction process, including posting of a low bid for every stage, communicating the low bid to each of said qualified bidders at each said stage of said auction process, establishing a break period between each said stage for a predetermined period of time;
   said technology infrastructure components in communication with said project management system to sort, accept and reject bids for said construction project;

said technology infrastructure components in communication with said project management system to post a low bid and provide a comprehensive project report to said owner and said developer for their evaluation of said low bid compared to parameters set by said owner;

said technology infrastructure components in communication with said project management system communicating the winning low bid to said owner and said developer of said construction project for evaluation;

said input device in communication with said project management system to permit nonmember contractors to bid on said construction project;

said input device in communication with said project management system to permit nonmember contractors to select states and counties in which they will participate in said bidding; and said technology infrastructure components in communication with said project management system to issue identification to each said nonmember contractor whereby said nonmember contractors are qualified to participate in said bidding process.

2. A computer-implemented project management system for multi-stage bidding on construction projects comprising:

a technology infrastructure, said technology infrastructure including components which are constructed and arranged to receive, store and exchange information;

a coordinating infrastructure coupled to said technology infrastructure, said coordinating infrastructure including components constructed and arranged to coordinate bids between owners, architects, developers, general contractors, subcontractors, suppliers, wholesalers and product manufacturers on at least one of a plurality of construction projects utilizing information stored in said technology infrastructure, said coordinating infrastructure including:

an input device in communication with said project management system to provide entry into said project-management system and validating a bidder's credentials, said bidders including said general contractors, said subcontractors said suppliers, said wholesalers and said product manufacturers;

said input device in communication with said project management system to access said construction projects, planning locations and registering to bid on said construction projects;

said input device in communication with said project management system to provide information relative to a type of contract associated with said construction projects;

said input device in communication with said project management system to provide a optional pre-bid stage to determine if said bidders are within a range established by said owner and disqualifying said bidders that are not within said competitive range;

said input device in communication with said project management system to provide a multi-stage bidding process, including posting of a low bid for every stage, communicating the low bid to each of said qualified bidders at each said stage of said auction process, establishing a break period between each said stage for a predetermined period of time;

said technology infrastructure components in communication with said project management system to sort, accept and reject bids for said construction project;

said technology infrastructure components in communication with said project management system to post a low bid and provide a comprehensive project report to said owner and said developer for their evaluation of said low bid compared to parameters set by said owner;

said input device in communication with said project management system allowing said owner to establish a group of low bidders;

said technology infrastructure components in communication with said group of low bidders and allowing said group to proceed to a next stage of bidding;

said technology infrastructure components in communication with said project management system communicating the winning low bid to said owner and said developer of said construction project for evaluation; and said technology infrastructure components in communication with said group of low bidders to communicate the winning low bid to said group of low bidders.

3. The computer-implemented project management system for multi-stage bidding on construction projects of claim 2 including said input device in communication with said project management system to permit nonmember contractors to bid on said construction project;

said input device in communication with said project management system to permit nonmember contractors to select states and counties in which they will participate in said bidding; and said technology infrastructure components in communication with said project management system to issue identification to each said nonmember contractor whereby said nonmember contractors are qualified to participate in said bidding process.

4. The computer-implemented project management system for multi-stage bidding on construction projects of claim 2 including said technology infrastructure components in communication with said group of low bidders and allowing said group to proceed to a third stage of bidding.

5. The computer-implemented project management system for multi-stage bidding on construction projects of claim 2 including said technology infrastructure components in communication with said project management system to allow said general contractor to accept bids by said subcontractors.

6. The computer-implemented project management system for multi-stage bidding on construction projects of claim 5 including said technology infrastructure components in communication with said project management system to allow said subcontractors to accept bids by said suppliers, said wholesalers, or said product manufacturers.

7. The computer-implemented project management system for multi-stage bidding on construction projects of claim 1 wherein said technology infrastructure components in communication with said project management system enable said bidders to post a bid bond or performance bond for said construction project.

8. The computer-implemented project management system for multi-stage bidding on construction projects of claim 1 wherein said competitive range of bids is defined by an upper limit which is the owner's budget for the construction project and a lower limit which is an amount that would put said owner at risk.

9. The computer-implemented project management system for multi-stage bidding on construction projects of claim 1 wherein said technology infrastructure components include a dashboard which permits at least said owner to review and compare said bids.

10. The computer-implemented project management system for multi-stage bidding on construction projects of claim 1 wherein said input device in communication with said project management system enables said bidders to submit a cost breakdown sheet or bid supporting documents sheet.

11. The computer-implemented project management system for multi-stage bidding on construction projects of claim 1 wherein said technology infrastructure components in communication with said project management system enable said winning bidder to submit change orders to said contract and allow at least said subcontractor to bid on said change orders.

12. The computer-implemented project management system for multi-stage bidding on construction projects of claim 6 wherein said technology infrastructure components in communication with said project management system enable said winning bidder to submit change orders to said contract and allow at least said subcontractor to bid on said change orders.

13. The computer-implemented project management system for multi-stage bidding on construction projects of claim 1 wherein said group of low bidders are the bidders within an established percentage of the highest of the qualified low bidders.

14. The computer-implemented project management system for multi-stage bidding on construction projects of claim 1 wherein said technology infrastructure components in communication with said project management system enable a plurality of separate and distinct construction projects to receive bid by said bidders, said owners are the only users of said computer-implemented management system for multi-stage bidding on construction projects that can add new bidders, edit the profiles of existing bidders, delete bidders and enable a hierarchy for viewing the bids and qualifications of the bidders.

15. A computer readable medium having stored thereon instructions for conducting a multi-stage bidding auction on construction projects comprising:

a first set of instructions when executed by a processor causes said processor to receive, store and exchange information;

a second set of instructions when executed by a processor causes said processor to coordinate bids between owners, architects, developers, general contractors, subcontractors, suppliers, wholesalers and product manufacturers on at least one of a plurality of construction projects utilizing information stored in said technology infrastructure;

a third set of instructions when executed by a processor causes said processor to provide entry into said project-management system and validating a bidder's credentials, said bidders including said general contractors, said subcontractors said suppliers, said wholesalers and said product manufacturers;

a fourth set of instructions when executed by a processor causes said processor to access said construction projects, planning locations and register bidders to bid on said construction projects;

a fifth set of instructions when executed by a processor causes said processor to provide information relative to a type of contract associated with said construction projects;

a sixth set of instructions when executed by a processor causes said processor to provide a optional pre-bid stage to determine if said bidders are within a range established by said owner and disqualifying said bidders that are not within said competitive range;

a seventh set of instructions when executed by a processor causes said processor to provide a multi-stage bidding process, including posting of a low bid for every stage, communicating the low bid to each of said qualified bidders at each said stage of said auction process, establishing a break period between each said stage for a predetermined period of time;

an eighth set of instructions when executed by a processor causes said processor to sort, accept and reject bids for said construction project;

a ninth set of instructions when executed by a processor causes said processor to post a low bid and provide a comprehensive project report to said owner and said developer for their evaluation of said low bid compared to parameters set by said owner;

a tenth set of instructions when executed by a processor causes said processor to allow said owner to establish a group of low bidders;

an eleventh set of instructions when executed by a processor causes said processor to communicate with said group of low bidders and allow said group to proceed to a next stage of bidding;

a twelfth set of instructions when executed by a processor causes said processor to communicate the winning low bid to said owner and said developer of said construction project for evaluation; and a thirteenth set of instructions when executed by a processor causes said processor to communicate the winning low bid to said group of low bidders.

* * * * *